United States Patent [19]
Brereton et al.

[11] 4,339,797
[45] Jul. 13, 1982

[54] MICROCONTROLLER WITH AUXILIARY REGISTER FOR DUPLICATING STORAGE OF DATA IN ONE MEMORY LOCATION

[75] Inventors: David A. Brereton; Buddy F. Stansbury, both of San Jose, Calif.

[73] Assignee: International Business Machines Corporation, Armonk, N.Y.

[21] Appl. No.: 133,995

[22] Filed: Mar. 26, 1980

Related U.S. Application Data

[62] Division of Ser. No. 921,147, Jun. 30, 1978.

[51] Int. Cl.³ .............................................. G06F 3/00
[52] U.S. Cl. .................................................... 364/200
[58] Field of Search ... 364/200 MS File, 900 MS File

[56] References Cited

U.S. PATENT DOCUMENTS 3,404,378  10/1968  Threadgold et al. ............... 364/200

Primary Examiner—Raulfe B. Zache
Attorney, Agent, or Firm—R. E. Cummins

[57] ABSTRACT

A microcontroller is disclosed which executes all instructions in a fixed period machine cycle. A storage device is provided for storing data which is involved in the execution of instructions that are stored in a different memory device, such as a read only memory device. Specific locations in the data storage device are selected during execution of instructions by combining one partial storage address from two separate groups of partial storage address generators. One location "00" in the storage device is addressed automatically when no partial storage address generators are selected. An auxiliary register having a load control input terminal and the write input to the storage device are connected to a common source of data so that in response to certain instructions, the same data is entered into location "00" of the storage device and the auxiliary register from the data source during one fixed period machine cycle. A data path is also provided from the output of the auxiliary register to permit the auxiliary register to function as a partial storage address generator, and the path also extends through an ALU unit connected to the input of the data source to permit the original contents of the auxiliary register to be incremented during execution of certain other instructions.

6 Claims, 66 Drawing Figures

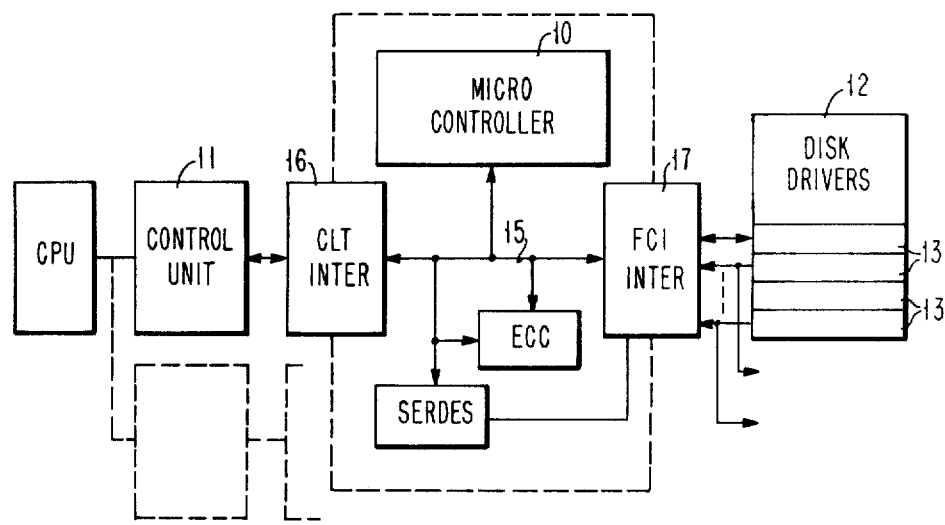
FIG.1
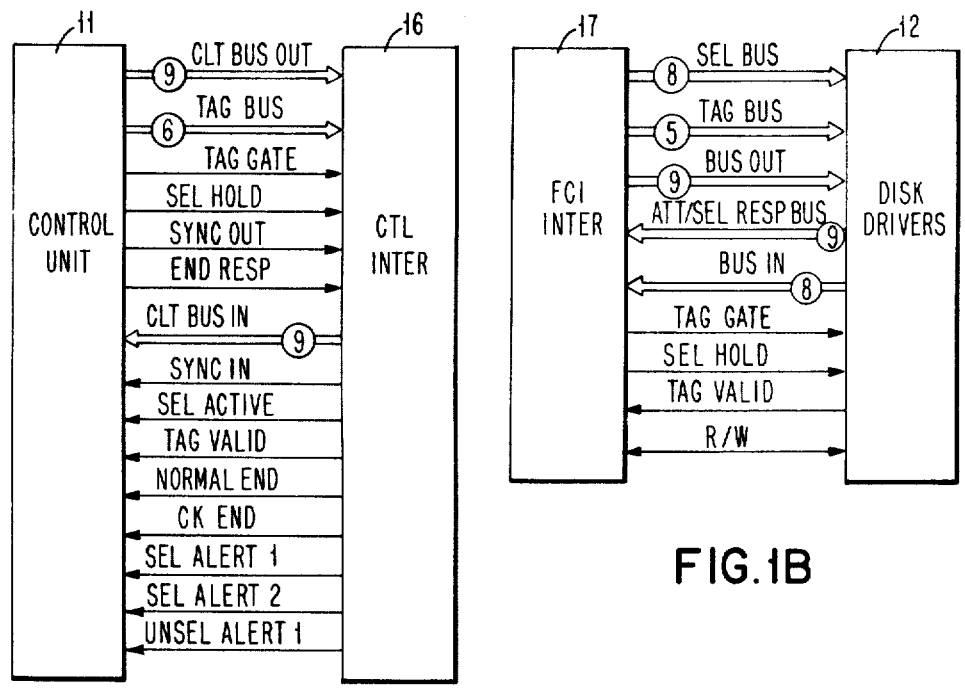
FIG.1A
FIG.1B

INSTRUCTION SET

| INSTRUCTION \ I.R. BIT | MNEM | 0 1 2 | 3 | 4 | 5 | 6 | 7 | 8 | 9 | 1 0 | 1 1 | 1 2 | 1 3 | 1 4 | 1 5 |
|---|---|---|---|---|---|---|---|---|---|---|---|---|---|---|---|
| BRANCH | BR | 000 | colspan="13" | BRANCH ADDRESS |
| BRANCH ON BIT | BOB | 001 | 0 | W | colspan="3" | I | colspan="4" | BIT | colspan="4" | RA |
| BRANCH ON CONDITION | BOC | 001 | 1 | W | colspan="3" | COND | colspan="8" | BR ADDRESS |
| FETCH IMMEDIATE | FIM | 010 | colspan="5" | RA | 0 | B | colspan="6" | ADDRESS |
| STORE IMMEDIATE | SIM | 010 | colspan="5" | RA | 1 | B | colspan="6" | BUFFER ADDR. |
| REGISTER IMMEDIATE | RIM | 011 | colspan="5" | CONST. | H | L | colspan="3" | ALU | colspan="4" | RA |
| RIM AND | ANDI | 011 | | | | | | | | 0 | 0 | 0 | | | |
| OR | ORI | 011 | | | | | | | | 0 | 0 | 1 | | | |
| EXCLUSIVE OR | XORI | 011 | | | | | | | | 0 | 1 | 0 | | | |
| ADD + CARRY | ACI | 011 | | | | | | | | 0 | 1 | 1 | | | |
| (RESERVED) | | 011 | | | | | | | | 1 | 0 | 0 | | | |
| COMPARE | CI | 011 | | | | | | | | 1 | 0 | 1 | * | | |
| ADD W/O CARRY | AI | 011 | | | | | | | | 1 | 1 | 0 | | | |
| (Reserved) | | 011 | | | | | | | | 1 | 1 | 1 | | | |
| REGISTER TO REGISTER | RR | 100 | colspan="5" | RA | colspan="3" | ALU | colspan="4" | RB |
| AND | ANDR | 100 | | | | | | | | 0 | 0 | 0 | | | |
| OR | ORR | 100 | | | | | | | | 0 | 0 | 1 | | | |
| EXCLUSIVE OR | XORR | 100 | | | | | | | | 0 | 1 | 0 | | | |
| ADD + CARRY | ACR | 100 | | | | | | | | 0 | 1 | 1 | | | |
| (RESERVED) | | 100 | | | | | | | | 1 | 0 | 0 | | | |
| COMPARE | CR | 100 | | | | | | | | 1 | 0 | 1 | * | | |
| ADD W/O C | AR | 100 | | | | | | | | 1 | 1 | 0 | | | |
| MOVE | MR | 100 | colspan="5" | DEST. | 1 | 1 | 1 | colspan="4" | SOURCE |
| LOAD REG IMMEDIATE | LRI | 101 | colspan="5" | RA | colspan="8" | DATA |
| EXECUTE IMMEDIATE | EXI | 110 | colspan="5" | PAGE | 0 | 0 | 0 | colspan="4" | RA |
| EXECUTE INDIRECT | EID | 110 | colspan="5" | PAGE | 0 | 0 | 1 | colspan="4" | RA |
| FETCH INDIRECT | FID | 110 | 0 | Y | 0 | 0 | 0 | 0 | 1 | 0 | colspan="4" | RA |
| STORE INDIRECT | SID | 110 | 1 | Y | 0 | 0 | 0 | 0 | 1 | 0 | colspan="4" | RA |
| SET MASK | STM | 110 | | | 0 | 0 | 1 | 0 | 1 | 0 | colspan="4" | RA |
| RESTORE A.R. | RAR | 110 | | | 0 | 1 | 1 | 0 | 1 | 0 | colspan="3" | | RP |
| SET MACHINE LVL | SML | 110 | | | 1 | 0 | 0 | 0 | 1 | 0 | colspan="3" | LEVEL | RP |
| BRANCH ON REG | BOR | 110 | colspan="5" | PAGE | 1 | 0 | 0 | colspan="4" | RA |
| BRANCH ON REG IND | BORI | 110 | colspan="5" | PAGE | 1 | 1 | 0 | colspan="4" | RA |
| BRANCH ON REG/LINK | BORL | 110 | colspan="5" | PAGE | 1 | 1 | 1 | colspan="4" | RA |
| BRANCH AND LINK | BAL | 111 | colspan="7" | BRANCH ADDRESS | colspan="6" | |

W = 0; Off, False  
W = 1; On, True  
X = Don't Care  
* = RA not updated

B = 0; Select Buffer  
B = 1; Select Stack  
Y = 0 = Increment  
Y = 1 = No increment

FIG. 4

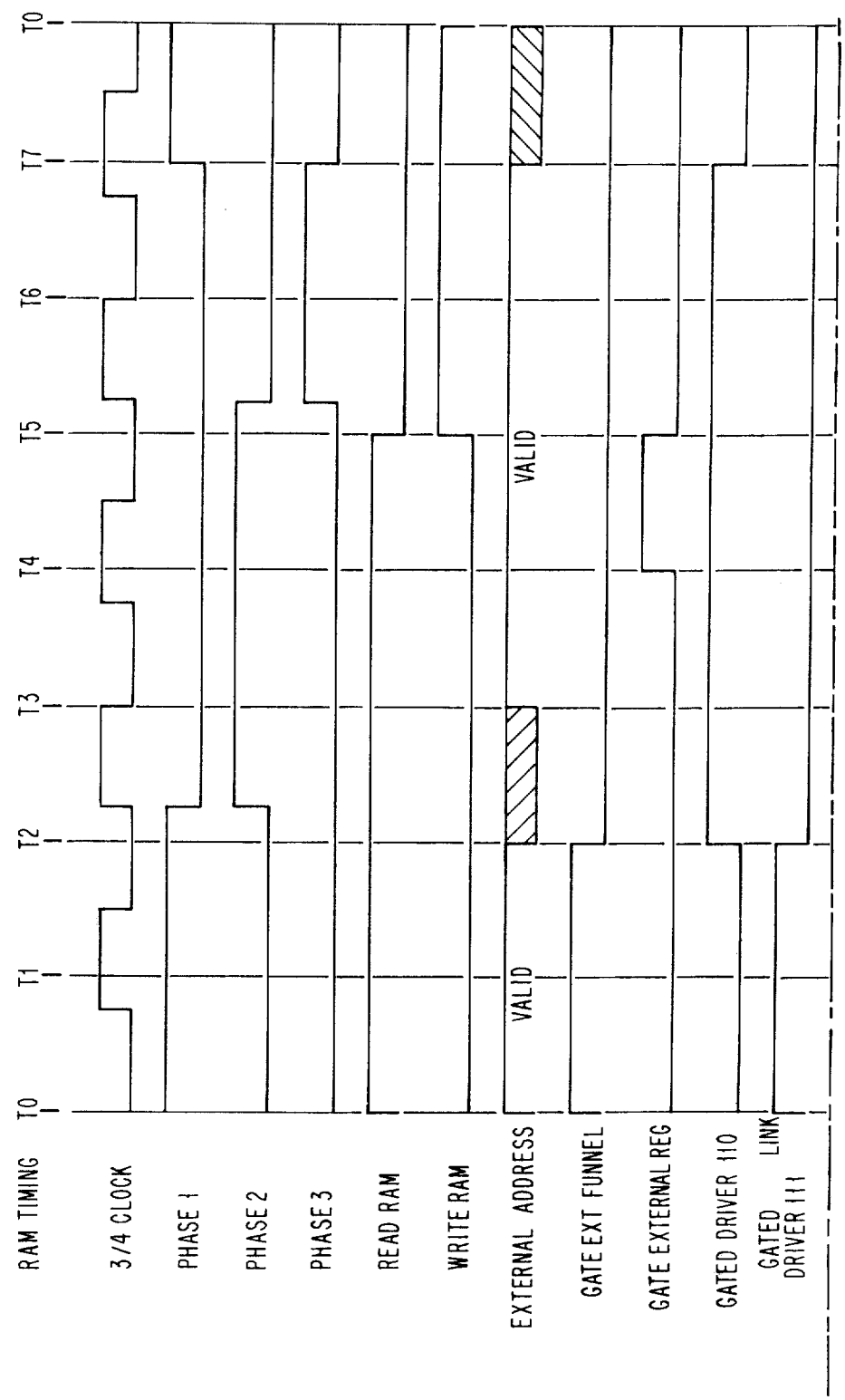

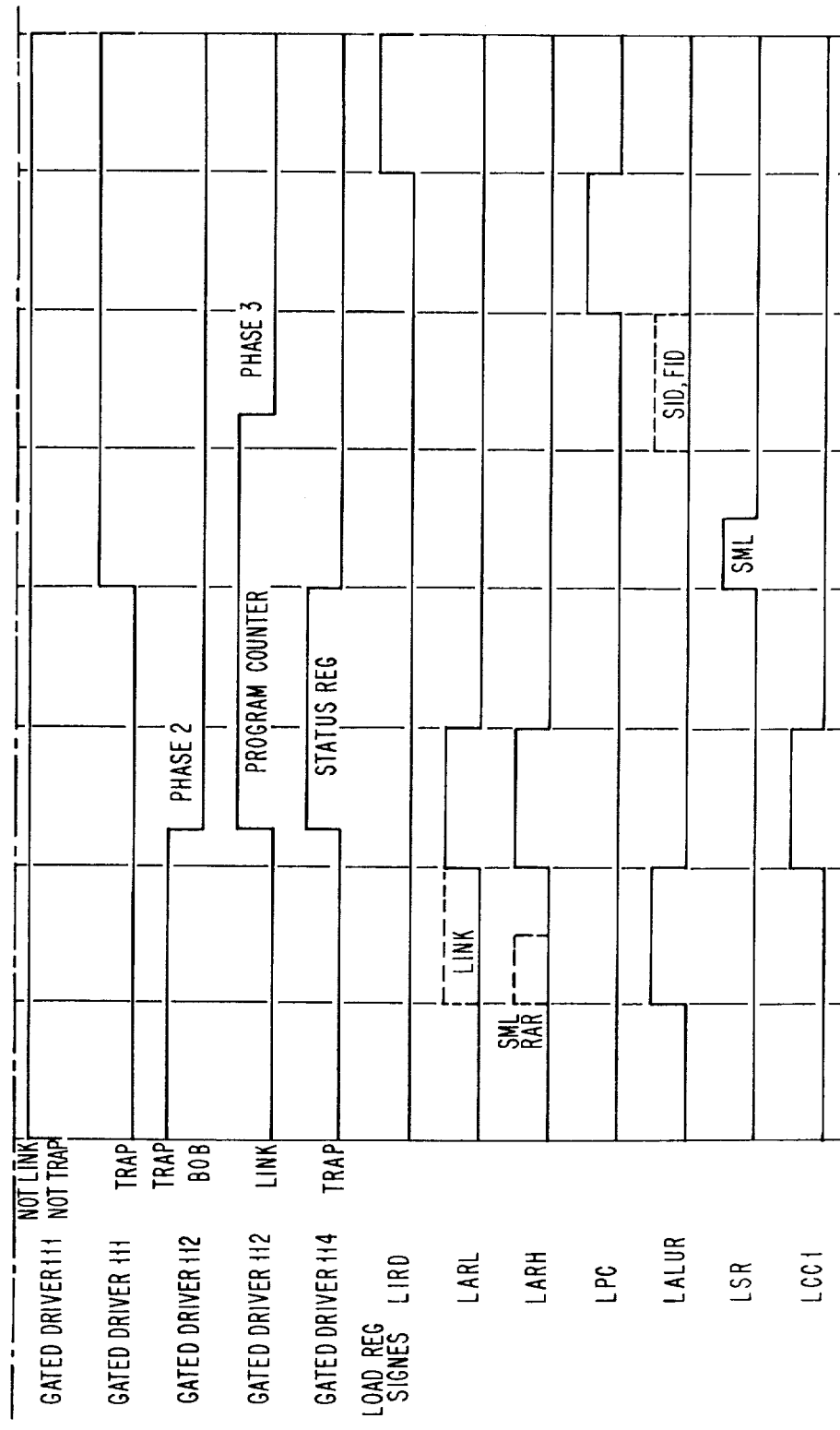

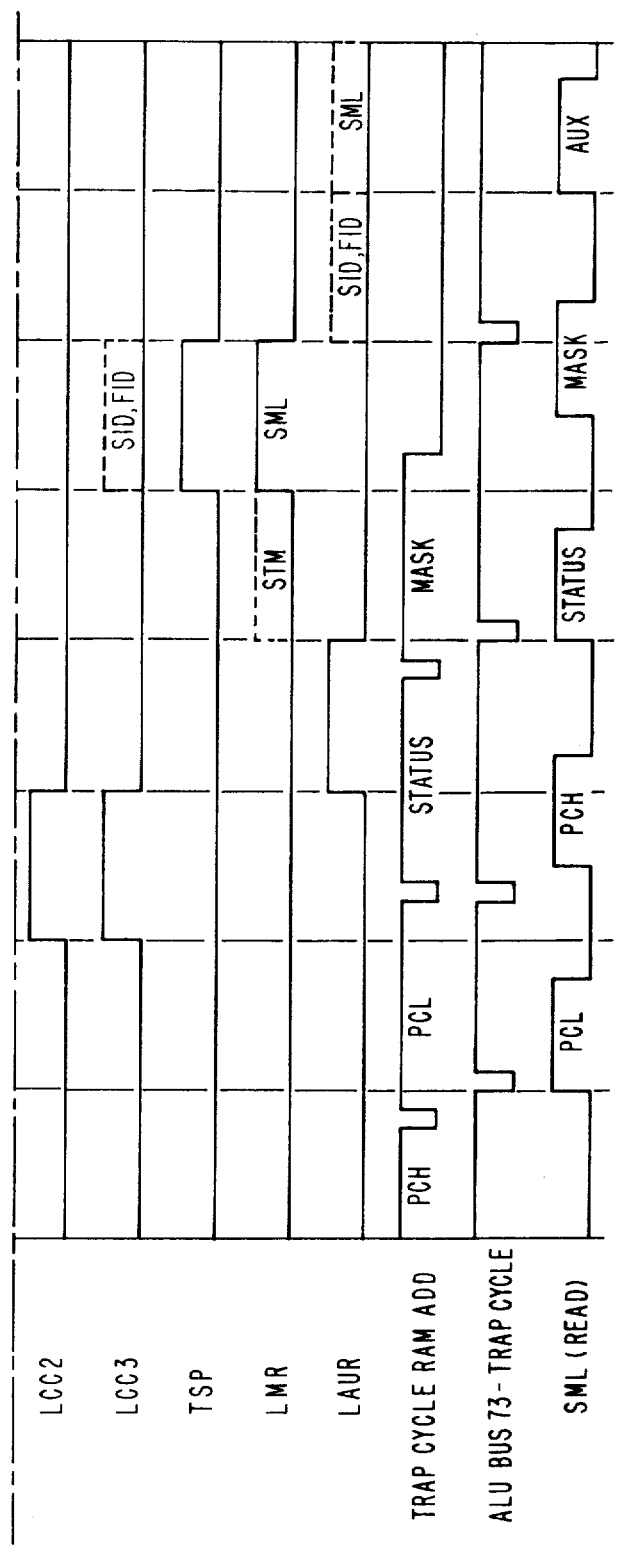

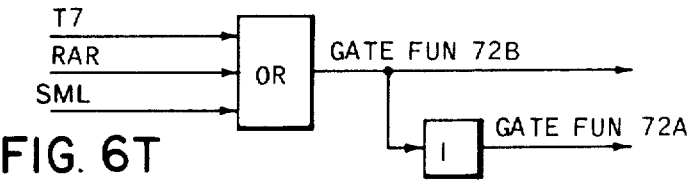
FIG. 6T
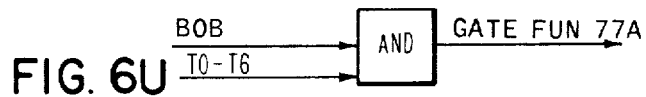
FIG. 6U
FIG. 6V
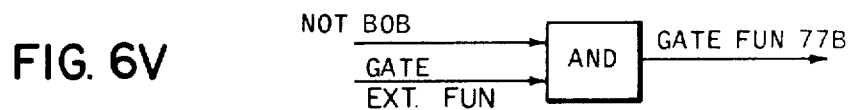
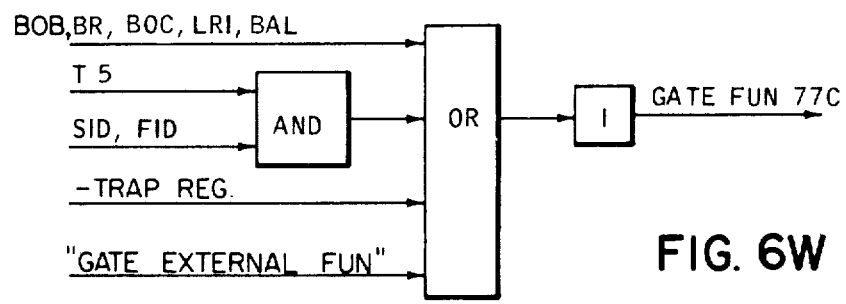
FIG. 6W
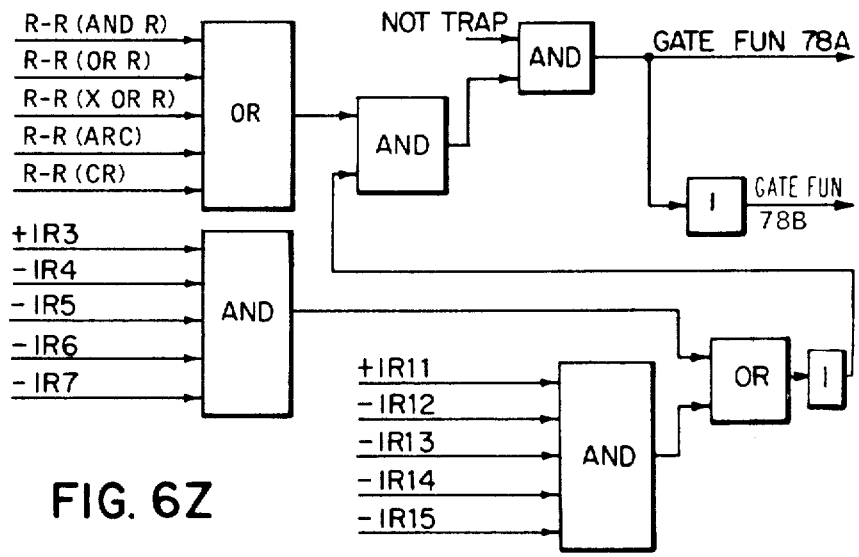
FIG. 6Z

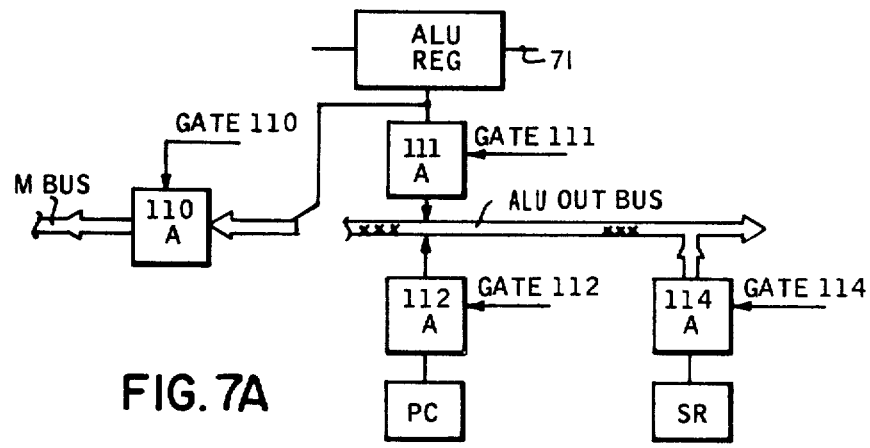
FIG. 7A
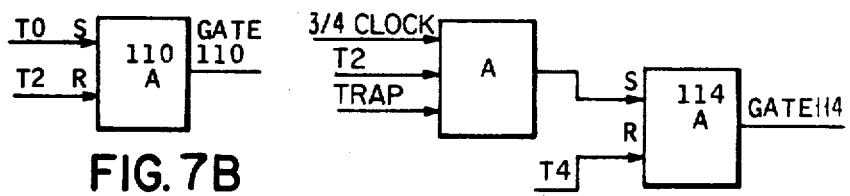
FIG. 7B
FIG. 7E
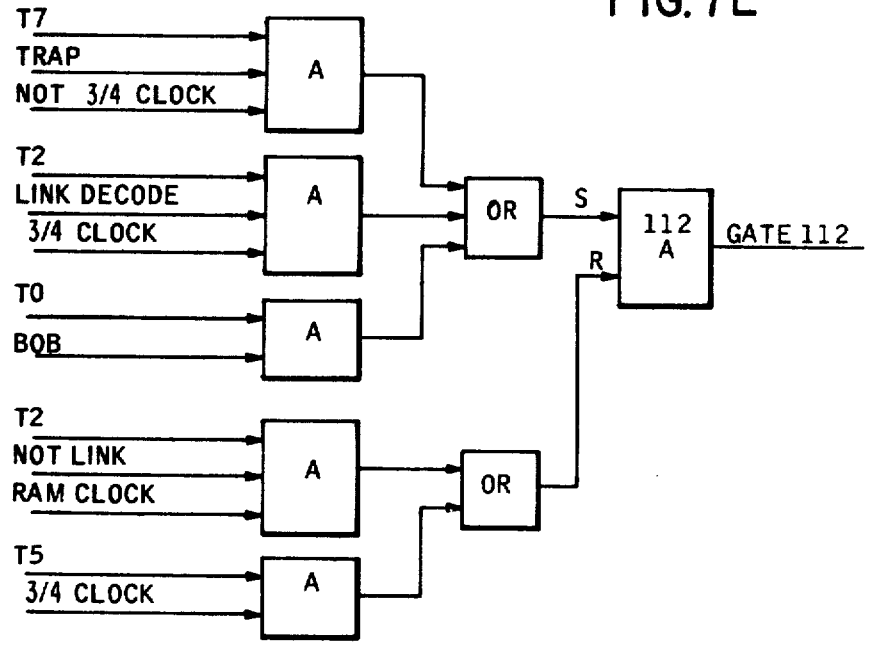
FIG. 7D

SUB SYSTEM C

SUB SYSTEM C

MICROCONTROLLER WITH AUXILIARY REGISTER FOR DUPLICATING STORAGE OF DATA IN ONE MEMORY LOCATION

This is a division, of application Ser. No. 921,147 filed June 30, 1978.

DESCRIPTION

1. Techinical Field

This invention relates in general to microcontrollers and specifically to microcontrollers for controlling the transfer of data between a control unit connected to a central processing unit of the data processing system and a plurality of storage units.

2. Related Applications

The following applications are related to the present application:

1. Ser. No. 921,146, filed June 39, 1978, directed to a system for controlling a serial read-write channel which employs the microcontroller of the present inventin.

2. Ser. No. 921,150, filed June 30, 1978, directed to a system for calculating the propagation delay of interface cables interconnecting a control unit and a controller.

3. U.S. Pat. No. 4,185,269, issued Jan. 22, 1980, directed to a system for generating error correcting check bytes under the control of the microcontroller of the present invention for data to be recorded on one of the devices being controlled by the microcontroller.

BACKGROUND ART

The throughput of a data processing system is to a large extent dependent on the system's ability to transfer data between peripheral storage devices and the central processing unit (CPU). The transfer path between a given storage device and the CPU usually involves a channel, a control unit and a controller. The control unit is generally a separate unit which is connected to a channel via a standard interface. The storage devices, i.e., disk files are generally arranged in a string consisting of a disk file controller and a group, usually 6 or 8, of disk files which are connected to the controller via a control interface. The controller in turn is connected to the control unit through another interface. An example of one such arrangement is the IBM 3830 Mod II control unit which connects to a System/360 or 370 central procssing unit through a block multiplexor channel. The 3830 Mod II is used to connect one or more strings of disk storage devices, such as the Models 3330, 3340 or 3350 disk files, to the system.

The string consists of an A box comprising a controller and a disk drive. The controller is connected to the control unit by a standard IBM interface referred to as CTL interface and to the drives by another standard interface referred to as the file control interface or simply FCI.

The overall function of the controller is to interpret and execute orders or commands issued by the storage control unit. Execution of these orders involves controlling both interfaces, controlling the track format, clocking and serializing the data during a transfer of data to the file and deserializing the data during a transfer of data from the file, checking the integrity of the transferred data through appropriate error correcting hardware, furnishing to the control unit the status of the controller and each of the attached devices when requested and diagnostic evaluation of the system when an error occurs.

File controllers have been implemented using large scale integration circuit technology and on a cost basis appear very favorable provided there are never any changes or additions to the initial functions. It has been recognized however, that each time a change such as the addition of a new function, has to be made, one or more of the large scale integrated modules has to be redesigned. This process is expensive in both time and money and, therefore, increases the overall cost.

The obvious solution to the problem of inflexibility of LSI combinatorial logic is a microprocessor. The microprocessor, once it is designed, can be readily and rapidly changed to accommodate new functions by merely changing the microprogram and thus avoid the constraints of the LSI process.

However, when it becomes necessary to maintain a high data transfer rate between the controlled device and the unit issuing the commands, it becomes readily apparent that any microprocessor cannot be used. At data transfer rates in the range of 1.75 megabytes/second, commands must be decoded and responses generated by the controller within nanoseconds. Prior art microprocessors are either too expensive or too slow relative to combinatorial logic to cope effectively with these increased data transfer rates.

There is, therefore, a need for an improved lower cost controller which can interpret macro orders from the control unit at a speed which matches the data transfer rate, and control both interfaces such that a minimum of time is lost in establishing a connection between a selected file and the control unit, has the flexibility to work with a number of devices attached to the interfaces and can be rapidly synchronized with a disk file having a high data transfer rate.

BRIEF DESCRIPTION OF THE DRAWINGS

FIG. 1 is a block diagram of a data processing system illustrating the overall function of the controller.

FIG. 1A shows the details of the Control Interface of FIG. 1.

FIG. 1B shows the details of the File Interface of FIG. 1.

FIGS. 2A and 2B are interrelated.

FIG. 4 is a table illustrating the instruction set of the microcontroller.

FIGS. 5A–5C is a timing diagram of various signals used by the microcontroller.

FIG. 7A illustrates the various gated drivers and their connection to busses.

FIGS. 7B–7E illustrate the logic circuitry for generating the gated driver control signals.

Figure 2A:
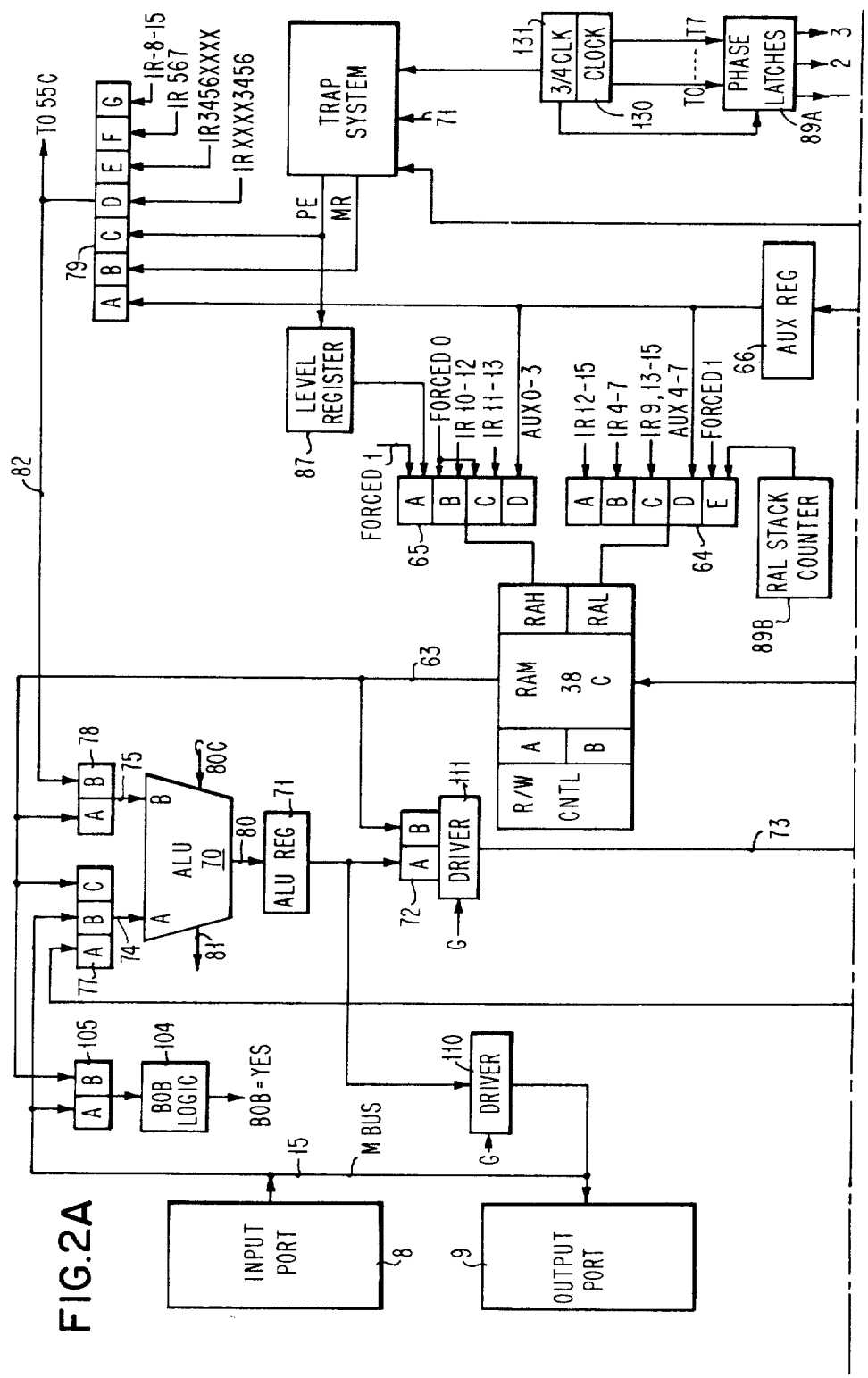
FIGS. 2A and 2B are block diagrams showing the overall data flow of the controller of the present invention.

Briefly, the microcontroller shown in FIG. 1 brings together the flexibility, speed, data storage, responsiveness, I/O capability, and synchronization required to control a group of high performance files.

The flexibility is provided in the 30 instructions shown in FIG. 4 which execute in one machine cycle. This instruction set has been selected to provide those functions most often used in a controller application as well as special instructions to provide a given function within a minimum of controller time (one machine cycle). A brief summary of these instructions is as follows:

| | |
|---|---|
| A | 4 Branch Instructions including Bit or Condition testing and subrouting branching (BOB, BOC, BR, BAL) |
| B | 4 Local Storage Instructions with direct and indirect addressing (with auto incrementing) (FIM, SIM, FID, SID) |
| C | 6 Register Immediate Instructions half byte ALU ops internal or external (RIM) |
| D | 7 Register to Register Instructions full byte ALU ops internal or external (RR) |
| E | 1 Load Register Immediate Instruction (LRI) |
| F | 2 Execute Instructions immediate and indirect (EXI, EXID) |
| G | 3 Branch on Register Instructions immediate, indirect and link (BOR, BORI, BORL) |
| H | 1 Set Mask Instruction (STM) |
| I | 1 Restore Instruction from link 1, 2 or stack registers (RAR) |
| J | 1 Set Machine Level Instruction |

The speed is demonstrated in the fast execution cycle which is in the range of 500 nanoseconds when used with low cost read only storage.

The overall efficiency and throughout are achieved over many instructions, because each instruction requires only one cycle, and through extensive use or direct addressing of both internal and external interfaces.

The microcontroller responsiveness is provided by the trap system which includes a full priority encoder and trap cycle hardware as well as a mask register which can selectively enable/disable any or all of the eight traps. This allows the microcontroller to respond within one machine cycle to external trap signals. The trap interrupt levels provide the microcode with the capability to dedicate a large group of registers to specific functions and interfaces without losing time in selecting different registers, i.e., no address paging. The trap levels correspond to the eight levels that the controller operates on.

The large local store of 256 bytes provides more than sufficient internal registers for each machine level as well as a temporary data buffer. In addition, a program "stack" area is provided which holds eight registers for each level. Two registers are reserved for the status and mask registers, four registers are for a push-pop stack for neste link functions, and two registers are for storing ROS address storage when a trap is taken. A significant function of the controller instruction set and direct addressing architecture is that all of these registers, program stacks, and data buffer areas are immediately available to all external I/O interfaces.

This means that the controller still has direct addressing to all external I/O interfaces while operating on any machine level. One instruction is provided which allows the microcode to force any machine level at any time.

The I/O link between all external interfaces and the microcontroller is provided by the input and output ports. The input port includes a plurality of input units such as "funnels" or bus multiplexers where output signals from the control unit and drives are brought into the controller. The output port includes a plurality of output units for the controller to supply input signals to the control unit and to the drive. Each of the units of the ports are addressable by one or more of the instructions.

To maximize the number of unique units which are directly addressable, input units and output units are given the same address and that address is utilized for two different units. The microcontroller distinguishes them by the fact that all inputs to the controller are "gated in" during the input phase of the machine cycle, and all external registers are loaded during the output phase of the machine cycle.

Another significant feature of the input port architecture is that input "and or" gates (funnels) require less hardware than the normal "bidirectional I/O register" used in other arrangements and therfore the input port is less expensive.

The external address structure provides for 16 different external addresses, 0 through 15. This allows for 16 input unit and 16 output unit registers for a total of 32×8 (256 lines) unique interface lines.

The synchronization capability is a major contributor to the overall efficiency and data throughput of the microcontroller. Because it is designed to function at a variable speed, the machine cycle can be synchronized with the file data byte rate. This eliminates all deskewing between the data and therefore minimizes any time that is normally lost in deskewing the data and control signals. It is not necessary to "pad" functions and timing to allow for the wide tolerances normally encountered between different devices.

DISCLOSURE OF INVENTON

As shown in FIG. 1, the microcontroller 10 functions to control the transfer of information between control unit 11 and a string 12 of disk drives 13. Control unit 11 is connected to the controller through a control interface CTL 16. String 12 is connected to the controller 10 through a file control interface FCI 17.

As shown in FIG. 1A, the control interface is a set of lines used to connect the storage control unit 11 to one or more controllers. The signal lines from the storage control unit to the input port of the controller comprise the following:

CTL Bus Out—The CTL bus out consists of nine lines for one byte of data and parity. Bus out transmits command information and tag modifiers when Tag Gate is present and information to be recorded on a disk drive when "Sync Out" is present.

CTL Tag Bus—The CTL Tab Bus consists of six lines for five bits and a parity bit of control information.

CTL Tag Gate—CTL Tag Gat is a single line employed to gate Bus Out and Tag Bus.

CTL Select Hold—CTL Select Hold is a single line which is made active and remains active when a drive is selected. It remains active until an End Signal is received from a drive after the last operaton on the drive is performed and the End Signal is acknowledged.

Sync Out—Sync Out is a single line which validates and gates data on Bus Out during a data transfer operation.

End Response—End Response is a single line used by the Control Unit to acknowledge to the controller the receipt of a Normal End or Check End from the controller.

The signal lines from the controller output port to the Storage Control Unit are as follows:

CTL Bus In—The CTL Bus In consists of nine lines for one byte of data and parity. Bus In transmits data from a disk to the Storage Control Unit during read operations with the use of Sync In for gating. Bus In is also used to transfer information to the Storage Control Unit when Normal End, Check In, or Tag Valid are active.

CTL Sync In—Sync In is a single line which is used during transfer of data of the Control Unit to validate and gate Bus In. Sync In is used to request a byte of data from the Control Unit.

Select Active—Select Active is a single line which becomes active after a successful selection sequence and remains active to indicate proper selection as long as Select Hold is active.

CTL Tag Valid—CTL Tag Valid is a single line which rises in response to Tag Gate from the Control Unit to indicae reception of the Tag Decode by the Controller.

Normal End—Normal End is a single line used to indicate to the Control Unit that the normal ending point of an operation has been reached.

Check End—Check End is a single line used to indicate that an abnormal ending condition exists. The abnormal condition is defined by the byte of data that exists on Bus In.

Alert Lines—Alert Lines is a series of three lines, two selected and one unselected. Select Alert 1 is used to indicate an error condition in the selected controller or drive. Select Alert 2 is used to indicate a busy condition. Unselected Alert 1 is used to indicate to the Control Unit that a polling sequence is required by the Control Unit.

The FCI interface 12 as shown in FIG. 1B consists of five control busses and four miscellaneous control and data lines. The FCI interface 12 can accommodate eight separate drives. All interface lines to and from a drive are multiplexed so that all signals issued by the controller are received by all drives. Similarly, like signals from different drives are "OR'd" together for transmission to the controller on a common line. All gating signals on the interface are under the control of the microcontroller. Reference pulses from the drives and read/write data are carried on a balanced bidirectional read/write data cable.

The FCI interface consists of the following busses and lines:

Select Bus—Select Bus consists of eight lines each of which is used to select a different drive, plus two unique lines for the operator to select a given drive or drives manually. Only one of these lines can be active at any given time. Select Bus is connected to a unit of the output port.

Device Tag Bus—Device Tag Bus consists of five signal lines plus parity. The data on the five lines are used to perform a specific function in the selected drive, such as sense a given register, set a given register, initiate a seek operation or set a given trigger, depending on the data on the Drive Bus Out. Device Tag Bus is connected to a unit of the output port.

Device Bus Out—Device Bus Out consists of nine lines for one byte of data and parity. The interpretation of the one byte is controlled by the Device Tag Bus, as mentioned above. Device Bus Out is connected to a unit of the output port.

Attention/Select Response Bus—This bus consists of nine lines for carrying attention or select information from the drive to the input port of the controller. The attention signals are presented according to the drive address. The select/response signal represents the address of the drive which has been selected.

Device Bus In—Device Bus In consists of eight data lines and one line for parity which carries sense and status information from the selected drive to a unit of the input port of the controller.

Tag Gate—This is a single line from the output port of the controller to the selected drive to gate both the Tag Bus and Device Bus Out.

Select Hold—Select Hold is a single line from the output port of the controller to the drive whose function is to maintain selection once it is established.

Tag Valid—Tag Valid is a single line from the selected drive to the input port of the controller to indicate that a Tag Gate signal has been received and that the Device Tag Bus and Bus Out parity are correct.

The overall function of the microcontroller as shown in FIG. 1, is basically to control the transfer of data to and from the files by taking the sequence of commands which have been generated by the control unit in response to receiving a series of Channel Command Words (CCW's) from the CPU channel and convert these to a series of orders for the drives. In addition, the controller receives status and control data from the drive and converts this data when necessary to suitable data to be supplied to the control unit.

The read/write channel between the drives and the controller and on to the control unit has the capability of transferring data at the rate of about 1.85 megabytes per second. The microcontroller must, therefore, be fast, flexible and quite responsive to both the orders from the control unit and status information from the drives so as not to interfere with the potential overall system performance obtainable by a 1.85 megabyte data transfer rate. A system for controlling the serial read/write channel is disclosed in copending application Ser. No. 921,146, filed June 30, 1978.

Figure 2B:
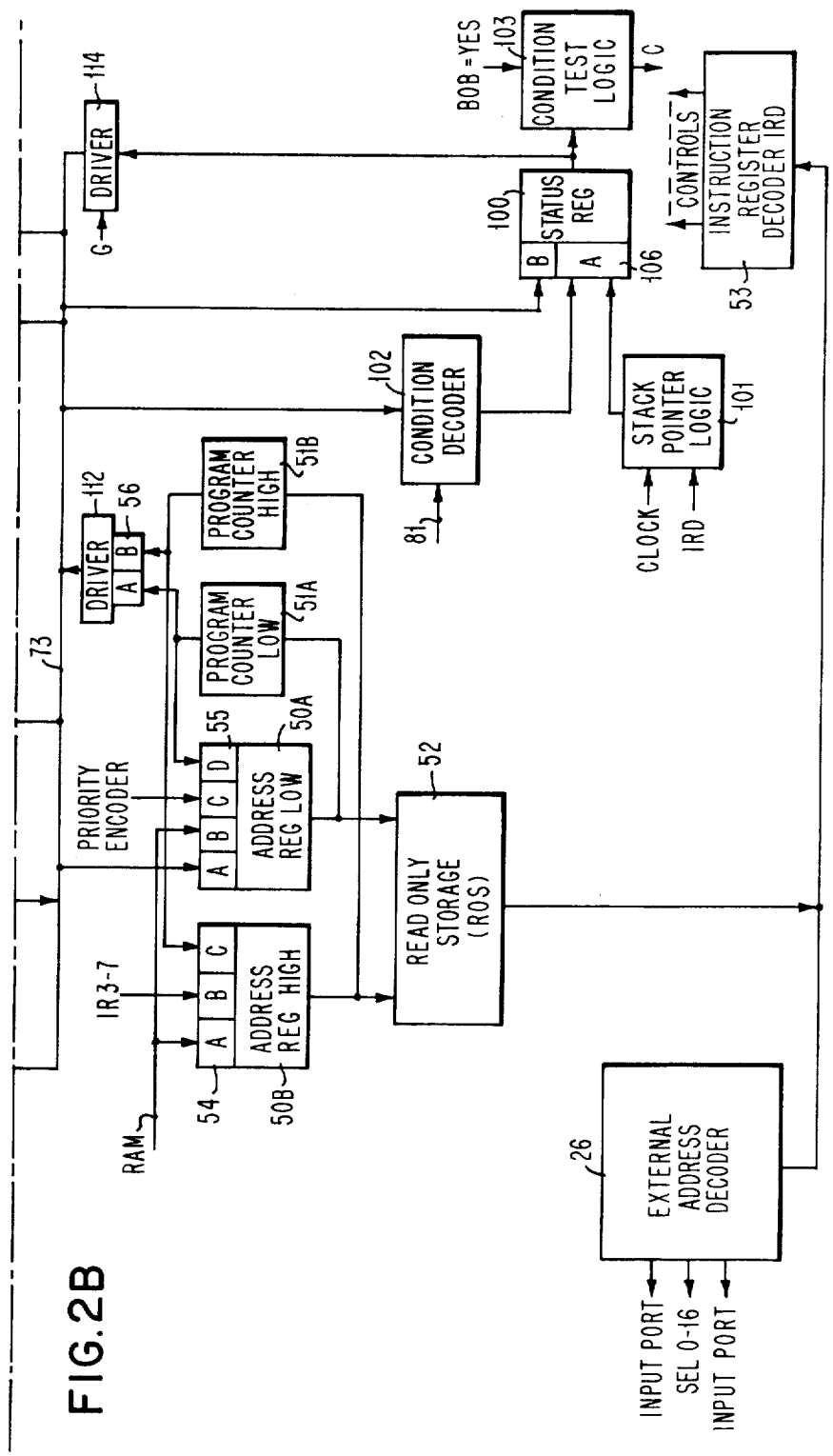
Figure 2C:
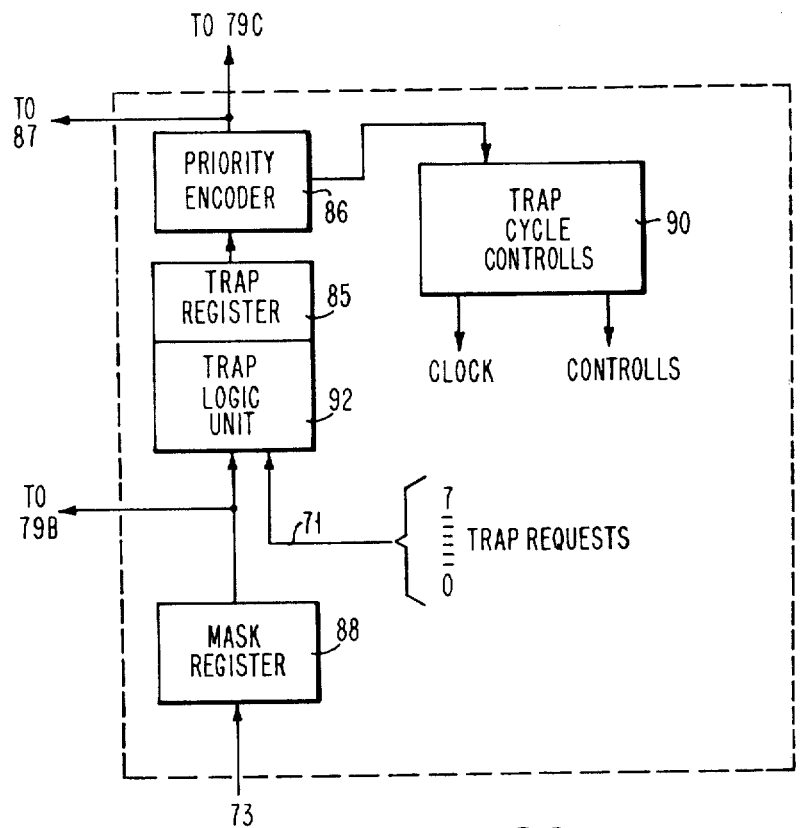
FIG. 2C is a diagram showing the trap section of FIG. 2A in detail.
Figure 2D:
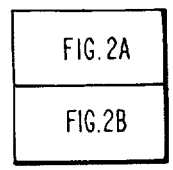
FIG. 2D shows how

FIGS. 2A and 2B show the overall data flow of the controller. The details of the trap system are shown in FIG. 2C.

Figure 3:
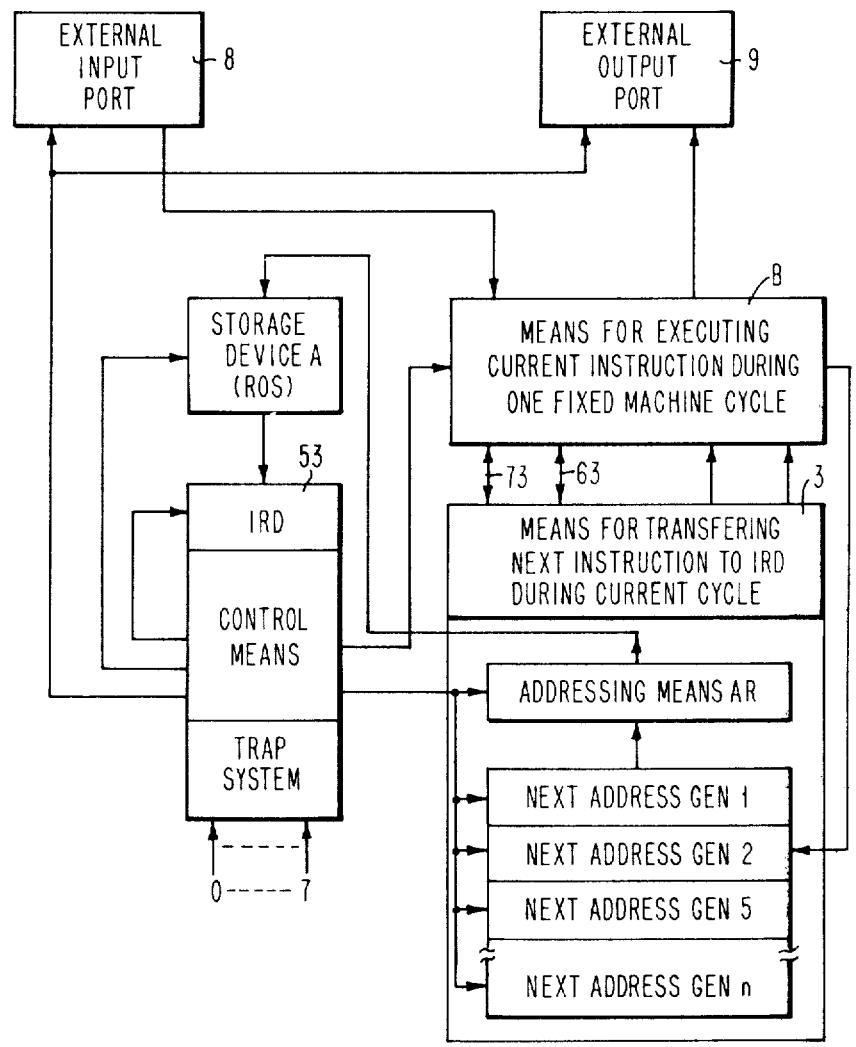
FIG. 3 illustrates the controller shown in FIGS. 2A and 2B as three interrelated subsystems.

The microcontroller shown in FIGS. 2A and 2B comprises three major subsystems which are interrelated as shown in FIG. 3 so that the instruction stored in a storage unit can be read out and executed to achieve the overall function of the control of the data transfer between control unit 11 and the string 12 of disk drives on a dynamic basis.

The architecture of the microcontroller will first be described in relation to FIG. 3 which shows the major subsystems B, C and D, and a storage device A.

The function of device A is to store a plurality of microinstructions at individually addressable storage locations. Three different types of instructions are stored in device A, unconditional branch type of instructions, conditinal branch type of instructions, and non-branch type of instructions. Each type includes a predefined plurality of different instructions. Device A is shown as a read only storage device, but other devices known in the art may be employed. The first subsystem B is referred to as the Instruction execution subsystem, and the second subsystem C is referred to as the Next Instruction Fetch subsystem. As shown in FIG. 3, subsystem C includes means AR for addressing storage device A and a plurality of next address generators NAG 1 through NAG n. Subsystems B and C are controlled by a third subsystem D which includes the instruction register decoder IRD and control means CM. Subsystem D is referred to as the Control usbsystem and is responsive to one current instruction transferred from device A by subsystem C during the previous machine cycle to the instruction register decoder for generating the appropriate control signals to control the operation and interaction of the subsystems B and C to execute the current instruction and fetch the next instruction from source A during the current machine cycle. Control subsystem D also includes the trap system which is discussed in detail later in this specification.

The various components of the controller will now be described in connection with FIG. 2A and 2B and related to the FIG. 3 subsystems. This divisional application is directed to the features of the microcontroller shown in FIGS. 2A-2C which involve the interrelationships of the ALU register 72, driver 111, bus 73, RAM 38 and auxiliary register 66, the RAM addressing circuit and the control of the above elements during the execution of certain instructions which cause a byte of data stored in ALU register 71 to be placed in location "00" of RAM and in the auxiliary register automatically during a fixed period machine cycle of the microcontroller. Additional features include the data pathing and control from the output of the auxiliary register to the RAM addressing circuitry and to the ALU register 71 through funnel 79A, bus 82, funnel 78, ALU 70 to the input of the ALU register 71. These latter features are employed during the execution of the Fetch Indirect and Increment (FID) and Store Indirect and Increment (SID) instructions, which function to transfer the contents of the auxiliary register through the ALU to add one and return the incremented value back to the auxiliary register during the latter portion of the fixed period machine cycle in which the FID and SID instructions are executed.

Input Port 8

Figure 2E:
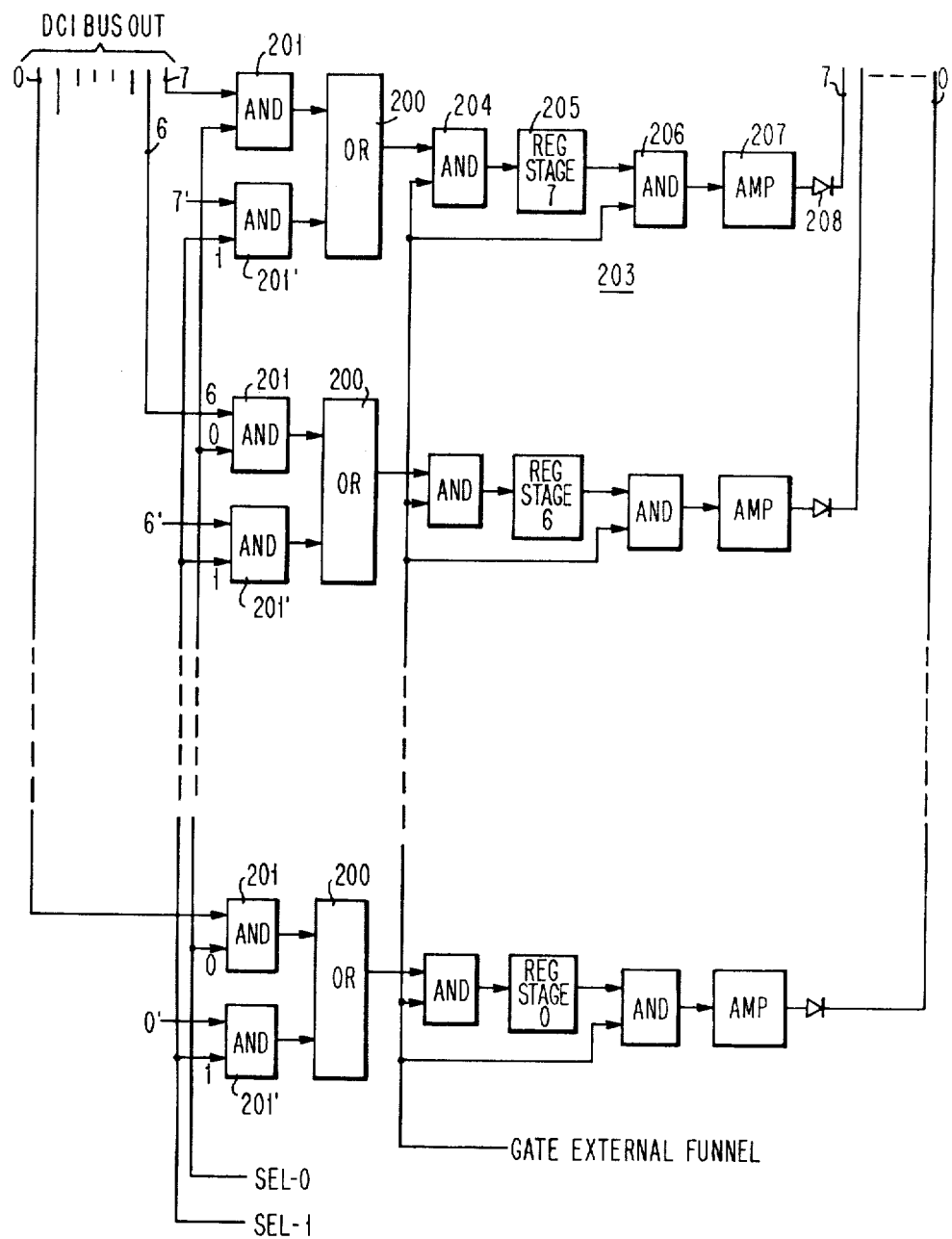
FIG. 2E shows the input port of FIG. 2A in more detail.

The input port 8 comprises a plurality of input funnels or bus multiplexers which function to selectively transfer the data on an input bus from one or more of the files or the control unit to the microdata input bus 15 connected to one input of the ALU. FIG. 2E shows a pair of input funnels and the gated drives for connecting the output funnel to bus 15.

A funnel consists basically of a plurality of input OR gates 200, one for each line of the busses to be multiplexed. As shown in FIG. 2E, eight plural input OR gates 200 are used to connect DCI Bus Out lines 0-7 corresponding lines of the bus 15, one line being associated with each OR gate 200. Each line is connected to the OR gate 200 through a two-input AND gate 201. The other input being a single address line labelled "Select 0". A second group of similar AND gates 201 are used to connect the lines 0-7 of a second interface bus to each OR gate 200. The second input to each of these AND gates is a different address line, "Select 1". The input port 8 has sixteen groups of eight AND gates, each group of eight being individually selectable by the external address decoder 26. The output of the eight OR gates 200 are transferred to bus 15 by eight similar gate drivers 203. Each gated driver 203 consists of an AND gate 204, a binary stage 205, a second AND gate 206, an amplifier 207, and a diode 208 for isolating all the loads from the bus 15. The function of the amplifier and the diode can be combined in one transistor amplifier circuit, as is well known in the art. The second input to AND gates 204 and 206 is a gate funnel signal supplied from the control subsystem D. The input port, as described, can handle 128 external input lines and transfer the data on an addressed group of eight of these lines selectively to bus 15 at times selected by the control subsystem. As shown in FIG. 2, gated driver 110 is connected to bus 15 as is the output port 9, making bus 15 a bidirectional data bus. Gated driver 110 and the input port drivers can, therefore, never be on during the same period of a machine cycle.

Output Port 9

The output port 9 is not shown in detail but consists of sixteen registers, each with eight stages. The output of each register is adapted to be connected to an external interface which might include one of the input funnels. Each register input is provided with a three input AND gate for each stage, one input being connected to the corresponding line of bus 15, the second input to each AND gate being a select or address line, and the third input to each AND gate of each register being a load external register signal from the control subsystem. Since the registers and funnels are operated at different times, one select line addresses a funnel-register pair.

As will be explained later, the control subsystem can change external addresses during a machine cycle.

ROS 52

As shown in FIG. 2B, the ROS unit 52 corresponds to device A of FIG. 3 and consists of 16,384 individually addressable 16 bit (plus two parity bits, not shown) storage locations, each of which stores one of the 30 16 bit microinstructions which are discussed in detail later. The output of the ROS unit is applied to the instruction register bus 58 which consists of sixteen lines. Lines 3-7 and 11-15 of this bus are connected to external address decoder 26, and lines 0 through 15 to the instruction register decoder (IRD) 53.

A storage location in ROS is selected by a 14 bit address which is supplied to ROS from addressing means AR of subsystem C.

Address Register 50

As shown in FIG. 2A, A, the addressing means AR of subsystem C is instruction address register 50, comprising two units, Address Register Low (ARL) 50A and Address Register High (ARH) 50B. Address register low is an eight-stage register and supplies the eight low order bits 6-13 of the 14 bit address to the ROS unit 52. Address register high is a six-stage register and supplies the six high order bits 0-5 of the 14 bit address to ROS unit 52.

The inputs to ARL 50A are supplied from the output funnel 55 while inputs to ARH 50B are supplied from the output of funnel 54.

Funnel 55

Funnel 55 comprises four separate AND/OR logical units 55A-D. Unit 55A is an eight-stage unit which is connected to the ALU out bus 73 and functions to transfer partial addresses generated by subsystem B to subsystem C. Unit 55B is an eight-stage unit for receiving one byte of data directly from RAM 38 and is part of one of the NAG units of subsystem C. Unit 55C is a three-stage unit for receiving bits 0-2 from the ALU B bus 82 and is associated with the trap NAG unit. Unit 55D is an eight-stage unit for receiving an eight bit byte from the program counter low 51A which is part of the NAG unit 1.

The output of units 55A-D are connected to the appropriate inputs of ARL 50A.

Funnel 54

Funnel 54 comprises three separate AND/OR logical units 54A-C. Unit 54A consists of six stages for receiving six bits (2-7) directly from the RAM 38 and with unit 55B, forms part of the NAG unit. Unit 54B is a five-stage unit whose inputs are connected to the control means CM to receive bits 3-7 from instruction decoder 53. Unit 54C comprises a six-stage unit whose inputs are connected to the output of the program counter high 51B which is part of NAG unit 2 of subsystem C.

Program Counter 51

The program Counter (PC) 51 comprises a Program Countr Low (PCL) section 51A and a Program Counter High (PCH) section 51B. The program counter comprises a fourteen-stage settable counter whose function is to generate the next sequential address to be transferred to the address register 50. The PCL section 51A consists of eight stages whose inputs are connected to the output of ARL 50A so that PCL can be updated by ARL when signalled by the control subsystem at T6. PCL 51A has an increment input line 57 for advancing the counter one unit at T2 time. The PCH high section 51B consists of six stages whose inputs are connected to the output of the address register high section 50B so that PCH can also be updated at T6. The outputs of the program counter 51 are connected to the address register 50 through funnels 54 and 55 as previously mentioned and to the ALU out bus through funnels 56A and B and gated driver 112.

Funnel 56A

Funnel 56A comprises eight AND/OR units for connecting PCL 51A to the ALU output bus 73.

Funnel 56B

Funnel 56B consists of six AND/OR units for connecting PCH 51B to ALU output bus lines 2-7.

Gated Driver 112

Gated driver 112 drives the ALU output bus 73 to transfer the address of the instruction currently being executed to subsystem B. The portion of the ALU output bus 73 connected to funnel 77A is active when driver 112 is gated. This occurs during an output phase of a machine cycle when a link type instruction is being executed. Funnel 56A, 56B and gated driver 112 are part of subsystem B.

Instruction Register Decoder 53

The instruction register decoder 53 comprises a 16 bit register for receiving an instruction readout from ROS unit 52, and suitable decoding circuitry to provide the appropriate control signals such as an op decode, an ALU operation decode, a given bit line decode, or an address signal. It is part of control subsystem D of FIG. 3.

RAM 38

Random Access Memory (RAM) 38 is provided with 256 individually addressable storage locations each of which stores an eight bit byte. RAM 38 is provided with suitable addressing circuitry 60 to be discussed in detail later, and suitable read/write control circuitry 61 to permit an eight byte of data to be stored in an addressed location or to be read from an addressed location. Input data is supplied to RAM 38 on RAM input data bus 62 which is connected to the ALU out bus 73. Output data from RAM 38 appears on RAM output data bus 63 which is fed to several funnels.

The address of a RAM location is eight bits and is supplied from the outputs of funnels 64 and 65. Funnel 64 provides the four RAM address low order bits 4-7 (RAL) while funnel 65 provides the four RAM address high order bits 0-3 (RAH). Funnel 64 consists of five separate AND/OR logical units 64A-E. Units 65B and C and units 64A, B and C are connected to the control subsystem and are supplied selectively with signals from the IRD unit 53, as shown.

Funnel 64

Unit 64A is connected to lines 12-15 of the instruction register (IR) bus 58 and to RAM address lines 4-7. Units 64B is connected to lines 4-7 of the IR bus 58. Funnel 64C connects lines 9, 13-15 of the IR bus to RAM address lines 4-7. Funnel 64D is connected to lines 4-7 of the auxiliary register 66. Unit 64E connects the RAL counter 89B lines 0-2, to RAL lines 5-7 with address line 4 being forced always to a 1 through funnel 64E.

Funnel 65

Funnel 65 is for the RAM high order portion of the address. Funnel 65A connects lines 1-3 of the level register 87 to RAM address lines 1, 2 and 3. RAM address line 0 is maintained at a zero value except during the execution of specific instructions. Funnel 65B supplies IR signals 10, 11 and 12 to RAH lines 1, 2, and 3 while bit 0 is forced to a 1 by 65B. Funnel 65C supplies IR signals 11, 12, and 13 to RAH lines 1, 2 and 3 with RAH line 0 being forced to a 1.

Funnel 65D connects the output lines 0-3 of the auxiliary register 66 to RAH lines 0-3.

The 256 individually addressable storage locations of the RAM 38 are logically divided into three separate sections. The data buffer section 38A consists of 64 bytes or 64 general purpose registers. The program stack section 38B consists of 64 bytes or 64 registers. These latter 64 registers are logically grouped into eight levels with eight registers per level. Each of the eight registers of a level are assigned a specific function as follows:

| Register 0 | PCH Trap |

| | |
|---|---|
| 1 | PCL Trap |
| 2 | PCH Link 1 |
| 3 | PCL Link 1 |
| 4 | PCH Link 2 |
| 5 | PCL Link 2 |
| 6 | Status Register |
| 7 | Mask Register |

The general function of these registers are indicated by their respective titles and is to temporarily store the value of certain other registers, e.g., the program counter, mask register and status register, when certain instructions are being executed.

Section 38C of RAM 38 consists of 128 addressable storage locations. Section 38C storage locations are divided into levels 0-7 corresponding to the eight levels of machine operation 42. Each of the eight levels, therefore, consist of 16 eight bit registers. The 16 registers at a given level are general purpose registers which are directly addressable by a subset of the instructions shown in FIG. 4. All of the above units associated with RAM addressing are part of subsystem B.

RAM Read-Write

The storing of data into RAM 38 from bus 73 (writing) and the retrieval of data from RAM 38 (reading) are discussed in connection with the ¾ clock and the various instructions.

ALU 70

The ALU 70 is conventional and is, therefore, shown in block form. The unit 70 has two 8 bit inputs—the A input 74 and the B input 75, each of which is eight lines. The output 80 of unit 70 is connected to the input of the ALU register 71 by the eight line output 80. Carry out line 81 is also provided from unit 70.

The ALU is capable of performing the following logical operations: AND, OR, XOR, ADD+CARRY, COMPARE, ADD WITHOUT CARRY and MOVE. The particular operations to be performed are under the control of the ALU control bus 80C which is supplied with signals from the control subsystem D of FIG. 3.

ALU Reg. 71

The ALU register 71 is an eight-stage register whose inputs are connected to ALU output 80 and whose outputs are connected to funnel 72. ALU register 71 is provided with a load input line connected to subsystem D.

Funnel 72

Funnel 72 comprises two separate AND/OR logical units 72A and 72B. The output of ALU register 71 is connected to the ALU out bus 73 through funnel 72A and gated driver 111. Funnel 72B connects the output data bus 63 of RAM 38 to the ALU out bus 73 through gated driver 111 as was described earlier. The contents of the ALU register 71 can be transferred to the addressing means AR of subsystem C through funnel 72A gated driver 111 and funnel 55A.

Funnel 77

Funnel 77 comprises three separate AND/OR logical units, 77A-C. Unit 77A connects the ALU output bus 73 to the ALU A input 74, unit 77B connects the input port data bus 15 to the ALU A input 74 and unit 77C connects the RAM output data bus 63 to the ALU A input 74.

Funnel 78

Funnel 78 comprises two separate AND/OR logical units, 78A and 78B. Unit 78A connects the RAM output data bus 63 to the ALU B input 75 while unit 78B connects the output of another funnel 79 to the ALU B input 75.

Funnel 79

Funnel 79 comprises seven separate AND/OR logical units, 79A-G. Unit 79A connects the 8 bit output of the auxiliary register 66 to ALU B bus 82. Unit 79B connects the 8 bit output of the mask register 88 of the trap system to ALU B bus 82. Unit 79C connects the three line output of the priority encoder of the trap system to lines 0-2 of the ALU B bus 82, while units 79D-G connect selected lines from instruction register decoder 52 to selected lines of the ALU B bus 82.

Funnel 79D connects lines 3-6 of the IR bus 58 to lines 4-7 of the ALU B bus 82. The other four inputs to funnel 79D, which connect to lines 0-3 of the ALU B bus 82, are supplied from a common line which supplies an all 0's input or an all 1's input depending on the particular logic function being performed by the ALU. This signal is referred to as ALU OP constant, and is shown by XXXX in FIG. 2A. Funnel 79D is used during half byte ALU operations. Depending on the ALU operation, the ALU OP constant is selected so that the remaining half byte being supplied to the B input to the ALU appears unchanged at the output.

Funnel 79E connects lines 3-6 of the IR bus 58 to lines 0-3 of the ALU B bus 82. The other four inputs represented by XXXX to funnel 79E are again an ALU OP constant which is supplied to lines 4-7 of the ALU B bus 82. The pattern is selected by the control subsystem so as not to change bits 4-7 of the A input during the logic operation being performed in the ALU on bits 0-3. A simple latch (not shown) may be used to supply the appropriate all "1's" or all "0's" pattern for funnels 79D and 79E.

Funnel 79F connects lines 5-7 of the IR bus 58 to lines 5-7 of the ALU B bus 82.

Funnel 79G connects lines 8-15 of the IR bus 58 to lines 0-7 of the ALU B bus 82.

Status Register 100

Status register 100 is a four-stage register, each stage of which is associated with the status of a different condition. The stages are assigned as follows:

| Stage 0 | CC1 | Condition Code 1 |
|---|---|---|
| 1 | CC2 | Condition Code 2 |
| 2 | CC3 | Condition Code 3 |
| 7 | Stack Pointer | |

The inputs to the status register 100 is from funnel 106 which comprises two AND/OR logical units, 106A and 106B. Funnel 106A is a four stage unit which has one line connected to the output of the stack pointer logic 101 and three lines connected to condition decoder 102. Funnel 106B is a four-stage unit whose input is connected to lines 0-2 and 7 of the ALU out bus 73.

The output of the status register 100 is connected to the ALU out bus 73 through gated driver 114 and to the condition test logic unit 103.

Condition Decoder 102

The Condition Decode logic unit 102 has its input connected to the ALU output bus 73. In addition, the carry signal from the ALU 70 is supplied to the decoder unit 102. The decoder unit 102 functions to provide three separate output signals:

| Line 0 | ALU Bus = all zeros |
|---|---|
| Line 1 | ALU Bus ≠ to all zeros |
| Line 2 | A carry signal. |

The first two signals are a result of a sampling of all eight bits of the ALU bus 73. The last signal is supplied to the condition decoder 102 from the ALU carry line 81 of ALU 70.

Condition Test Logic Unit 103

The condition test logic unit 103 receives its input from the status register 100 and the output from the BOB logic unit 104. The output of 103 is used to select the correct address for the conditional branch instructions.

BOB Unit 104

The branch on bit logic unit 104, as shown in FIG. 2A, is supplied from funnel 105 which comprises two AND/OR logic units 105A and 105B. The input to funnel 105A is from input data bus 15, while the input to funnel 105B is from the RAM output bus 63. The BOB logic unit samples the data on either the input data bus 15 or the RAM data bus 63 when a branch on bit instruction is being executed.

Level Register 87

Level register 87 is a three-stage register whose output is connected to funnel 65A to provide the high order portion of the RAM address. Level register 87 is set from either the priority encoder of the trap system or from the instruction register decoder during execution of the SML instruction.

Trap System

The last part of the control system is shown in FIG. 2C and is referred to as the trap system. The function of the trap system is to interrupt the normal processing of instructions and direct the controller to a new predetermined sequence in response to some event occurring in the devices between which data is being transferred or the occurrence of some event in the microcontroller.

These events are each assigned a priority, and events with like priorities are OR'd together so as to generate a trap request signal. As shown in FIG. 2C, the trap system is arranged to accept up to eight levels of priorities.

The trap system interrupts the microcontroller at the end of an instruction cycle. If a trap request signal is provided which has a priority higher than the current level at which the machine is operating, the trap system then causes subsystems B and C to perform certain functions during the trap cycle which has a period corresponding to the normal machine cycle. The first function is to generate the address of the next instruction so that the next instruction can be read out of ROS into IRD 52 and processed during the next machine cycle.

The second function is to transfer the contents of certain registers which define the condition of the microcontroller at the point of interruption into RAM in the event that it is necessary to return to the point of interruption and this return can be achieved through programming the return rather than returning to the beginning of the subroutine and executing all the instructions over again up to the point of interruption. The microprogrammer is, therefore, given the option of converting the trap request to a full interrupt, depending on what instruction or series of instructions are placed at the location in ROS which is addressed by the trap request signal. In the present arrangement, the address in ROS for the eight different priorities are assigned so it is possible to execute a series of four instructions sequentially before running into the next level. This permits the control system to operate in two modes. The first is to place only instructions at these addresses which execute quick trap type of instructions; the second is to place at these addresses a series of instructions which set up an audit trail in the event the trap is going to be converted to an interrupt. If desired, the microprogrammer may use the second mode immediately following the first mode at each level.

The last function of the trap system during the trap cycle is to update the level register of subsystem B to the corresponding priority of the trap request being honored. The trap system must be rearmed before it will honor another trap request signal.

With reference to FIG. 2C, the trap system comprises a mask register 88, the trap register 85, the trap logic unit 92, the cycle controls 90, and the priority encoder logic 86.

Mask Register 88

The mask register 88 is an eight-stage unit whose input is connected to the ALU output bus 73 of subsystem B and whose output is connected to the trap logic unit 92. Mask register 88 also has a load signal input to which the load mask register LMR load signal is applied to transfer the contents of the ALU output bus 73 into the register.

Trap Logic Unit 92

The trap logic unit 92 comprises a group of logic circuits for receiving the trap request signals 0-7 representing the occurrence of predefined events and the output of the mask register. The logic unit 92 provides an input to the trap register 85 for all active trap request signals which match the corresponding bit in the mask register.

Priority Encoder 86

The priority encoder 86 functions to select the trap request signal having the highest priority from all trap request signals allowed by mask register 88 and convert that signal to a three bit binary pattern on its output which is supplied to the input of level register 87 at the end of the hardware cycle and to the ROS addressing means through funnel 79C at the beginning of the trap cycle, as previously described.

Trap Cycle Controls 90

The last portion of the trap system includes the trap cycle controls which provide a time sequence of control signals to the portion of the control subsystem and the other subsystems B and C to initiate the trap cycle.

The foregoing description of the controller shown in FIGS. 2A, 2B and 2C has been directed primarily to an explanation of the functional units, the interconnection of these units within each section and the interaction of the units in different sections in order to provide a general understanding of the various potential data flow paths which exist between these various units. It should be understood that various control lines and timing signals have not been shown in FIG. 2 in order to simplify the description. These will be described in connection with a description of the control subsystem D of FIG. 3.

Table I below summarizes the functions of all the internal funnels and lists the figures which illustrate the logic circuitry for generating the gate signals. The logic circuitry is part of the control subsystem.

TABLE I

| Funnel | Units | Input | Output | FIG. 6 |
|---|---|---|---|---|
| 54A | 6 | RAM Output Bus | ARH | A |
| 54B | 5 | IR Bus 3–7 | ARH | B |
| 54C | 6 | PCH | ARH | C |
| 55A | 8 | ALU Output Bus | ARL | D |
| 55B | 8 | RAM Output Bus | ARL | E |
| 55C | 3 | ALU B Bus 0–2 | ARL | F |
| 55D | 8 | PCL | ARL | G |
| 56A | 8 | PCL | ALU Output Bus | H |
| 56B | 6 | PCH | ALU Output Bus | H |
| 64A | 4 | IR Bus 12–15 | RAL 4–7 | I-J |
| 64B | 4 | IR Bus 4–7 | RAL 4–7 | K |
| 64C | 4 | IR Bus 9,13–15 | RAL 4–7 | L-M |
| 64D | 4 | Aux. Reg. 4–7 | RAL 4–7 | N |
| 64E | 3 | RAL Counter 0–3 | RAL 5–7 | O |
|  | 1 | K = 1 | RAL 4 |  |
| 65A | 3 | Level Reg. 1–3 | 8 | 1-3 |
|  | 1 | K = 0 | RAH 0 |  |
| 65B | 3 | IR Bus 10–12 | RAH 1–3 | Q |
|  | 1 | K = 1 | RAH 0 |  |
| 65C | 3 | IR Bus 11–13 | RAH 1–3 | R |
|  | 1 | K = 1 | RAH 0 |  |
| 65D | 4 | Aux. Reg. 0–3 | RAH 0–3 | S |
| 72A | 8 | ALU Register | ALU Output Bus | T |
| 72B | 8 | RAM Output Bus | ALU Output Bus | T |
| 77A | 8 | ALU Output Bus | ALU A Input | V |
| 77B | 8 | M-Bus | ALU A Input | V |
| 77C | 8 | RAM Output Bus | ALU A Input | W |
| 78A | 8 | RAM Output Bus | ALU B Input | Z |
| 78B | 8 | ALU B Bus | ALU B Input | Z |
| 79A | 8 | Aux. Reg. | ALU B Bus | AA |
| 79B | 8 | Mask Reg. | ALU B Bus | BB |
| 79C | 3 | Priority Enc. | ALU B Bus 0–2 | CC |
|  | 1 |  |  |  |
| 79D | 4 | IR Bus 3–6 | ALU B Bus 4–7 | DD |
|  | 4 | ALU Op K | ALU B Bus 0–3 |  |
| 79E | 4 | IR Bus 3–6 | ALU B Bus 0–3 | DD |
|  | 4 | ALU OP K | ALU B Bus 4–7 |  |
| 79F | 3 | IR Bus 5–7 | ALU B Bus 5–7 | EE |
|  | 1 |  | ALU B Bus |  |
| 79G 8 IR Bus 8–15 | ALU B Bus 0–7 | FF |  |  |
| 105A | 8 | M-Bus | BOB Logic | GG |
| 105B | 8 | RAM Output Bus | BOB Logic | GG |
| 106A | 1 | Stack Pointer | Status Reg. 7 | HH |
|  | 3 | Condition Decode 1,2,3 | Status Reg. 0,1,2, |  |
| 106B | 4 | ALU Out Bus 0–2, 7 | Status Reg. 0–2 | HH |

The control subsystem D signals of the microcontroller will now be discussed in detail.

As shown in FIG. 5, the basic machine cycle of the microcontroller shown in FIG. 2 comprises eight time periods, T0-T7. All timing and control signals are referenced to one or more of these time periods. The signals depicted in the drawing are idealized waveforms. In practice, each signal has a finite rise and fall time which is not illustrated. For reference purposes, it can be assumed that each T period is 60 nanoseconds and hence one machine cycle is 480 nanoseconds. Signals T0-T7 are generated from an eight stage bit ring driven by a suitable variable frequency oscillator clock 130, shown in FIG. 2A, which is either associated with one of the external devices or synchronized by some suitable source.

In addition, a ¾ clock 131 is also used for control of the RAM unit 50. The ¾ clock has a 45 nanosecond pulse or 90 second period whose function will be explained in detail later in the specification. The clocks 130 and 131 are shown in FIG. 2A and the clock signals in FIG. 5.

Phase 1, 2 and 3 Timing Signals

Each of the phase 1, 2 and 3 timing signals shown in FIG. 5 is generated by one of the three phase latches which are arranged in a ring designated 89A in FIG. 2A. Each of these latches is supplied with the appropriate set and reset pulses developed from the ¾ clock signal and the T0-T7 signals.

The phase 1 timing signal begins at the start of T7 and ends at the beginning of phase 2. The phase 2 timing signal begins during T2 when the ¾ clock signal goes positive and ends at the beginning of phase 3. The phase 3 timing signal begins during T5 when the ¾ clock goes positive and ends at the beginning of phase 1 or T7.

RAM Timing

The control signals for the RAM 38 involves the ¾ clock, a read/write signal and the address signals. Since the RAM storage is either a source or destination of data, the read/write signal is the control line which determines its use and is supplied by control subsystem D. The RAM is addressed at T0 regardless of the instruction presently being executed except for the "Set Machine Level" instruction and one portion of the trap operation. The output data on a read cycle therefore appears on the RAM output data bus 63 and at the input to funnels 75B, 74C and 72B from the beginning of T0 to the end of T5. On a write cycle, data appearing on the input bus 62 from T5 to the end of T7 is entered into the memory. The read/write control timing for the Set Machine Level instruction and the trap operation is different and will be discussed in detail later on in the specification when describing the operation of the SML instruction.

Port Control Signals

The first control signal for the input and output ports is the address signal generated by the port address decoder 26. "Address Signals 0-15" are generated by decoding bits 3–6 or 11–14 into one of 16 lines for any instruction which might involve an external funnel/register pair as a source or destination of data. A given address line forms one input control signal to the one funnel and one register as shown in FIG. 2E. A second control signal referred to as "select input or output port", corresponds to bit 7 or bit 15 of the appropriate instruction and is used to select either the addressed funnel or addressed register.

The third control signal applied to a funnel is the gate external funnel signal which places the data at the input to the funnel onto the micro data bus 15 at the correct time. This "Gate External Funnel" signal is shown in FIG. 4 and is active from the beginning of T0 to the end of T1.

The third control signal applied to the output port external register is also a timing signal which places the contents of the micro data bus into the selected register at the correct time. As shown in FIG. 4, this "Gate External Register" signal is active during T4.

Control subsystem D includes the logic for generating the gate signals for all the internal funnels shown in FIGS. 2A and 2B. The logic for each of these funnels will now be described in connection with FIGS. 6A to 6HH. These signals are not shown in FIG. 5 but are discussed in the description of each instruction later in the specification.

Funnel 54A

Figure 6A:
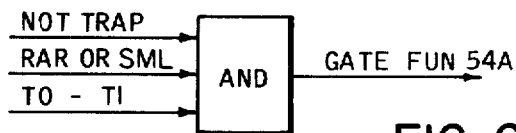
FIGS. 6A–6HH each illustrate the logic circuitry for generating a gate funnel control signal.

Funnel 54A connects the RAM data bus 63 ARH 50B. The control signal gate funnel 54A is generated as shown in FIG. 6A by ANDing together a "not trap" signal, a signal indicating that either an RAR or SIL instruction is being executed, and a signal indicating that it is either T0 or T1 time.

Funnel 54B

Figure 6B:
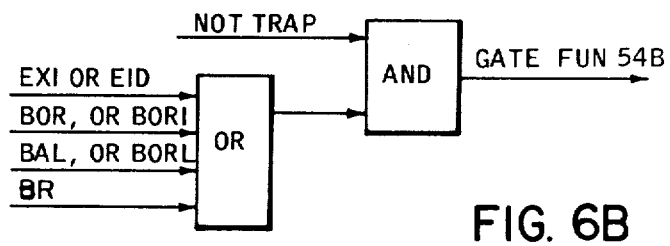

Funnel 54B connects bits 3-7 of the instruction data bus 58 to ARH 50A. The gate funnel 54B signal is generated as shown in FIG. 6B by ANDing together a "not trap" signal and a signal indicating that one of the following instructions are being executed: EXI, EID, BOR, BORI, BORL, BAL, or BR. ARH 50A stage 0 is not changed.

Funnel 54C

Figure 6C:
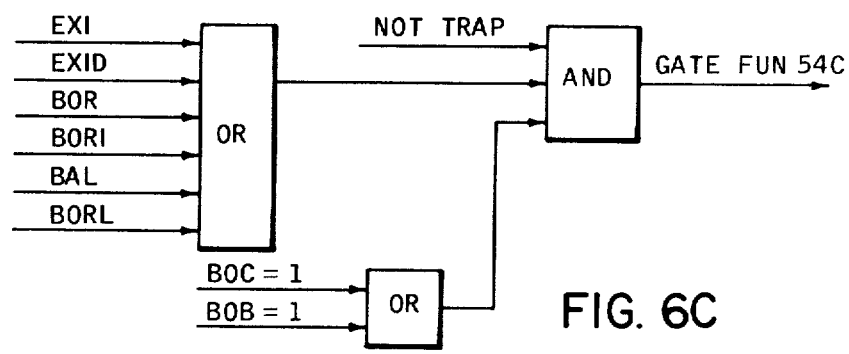

Funnel 54C connects the output of the program counter high 51B to ARL 50A. The gate funnel 54C is generated as shown in FIG. 6C by ANDing together a "not trap" signal with the signal indicating that any of the following instructions are being executed: EXI, EXID, BOR, BORI, BR, BAL, or BORL, and the branch on condition or bit is positive.

Funnel 55A

Figure 6D:
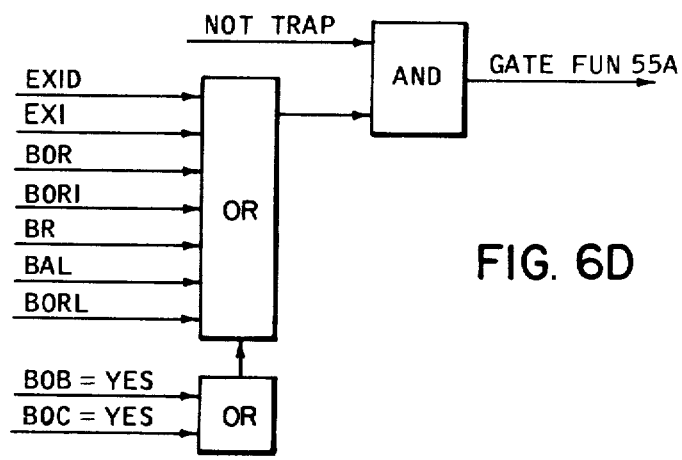

Funnel 55A connects the ALU out bus 73 to ARL 50A. The gate 55A signal is generated as shown in FIG. 6D by a "not trap" signal and by a decode of any of the following instructions: EXI, EID, BOR, BORI, BR, BAL, BORL, BOB=YES, or BOC=YES.

Funnel 55B

Figure 6E:
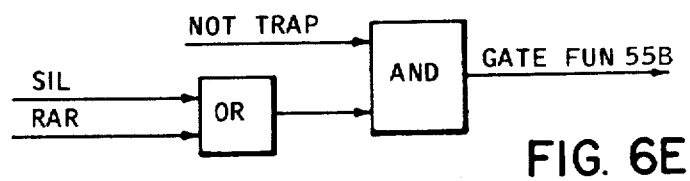

Funnel 55B connects RAM output bus 63 to ARL 50A. The gate funnel 55B signal is generated, as shown in FIG. 6E, by ANDing a "not trap" signal with a signal indicating that an RAR or SIL instruction is being executed.

Funnel 55C

Figure 6F:

Funnel 55C connects the ALU B bus bits 012 to ARL 50A. The gate signal for 55C is a "trap" signal generated, as shown in FIG. 6F, by the trap request latch.

Funnel 55D

Figure 6G:
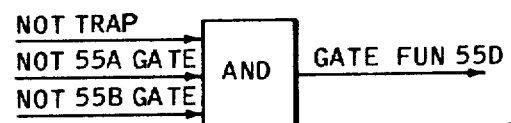

Funnel 55D connects the output of the Program Counter Low 51A to ARL 50A. The gate signal funnel 55D is generated, as shown in FIG. 6G, by ANDing a "not trap" signal, the inverted gate funnel 55A signal and the inverted gate funnel 55B signal.

Funnel 56A

Figure 6H:
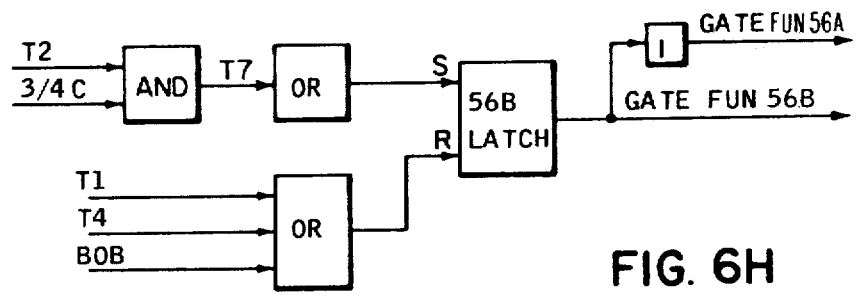

Funnel 56A connects the program counter low 51A to the ALU out bus 73. The gate funnel 56B signal is generated, as shown in FIG. 6H, by inverting the gate funnel 56B.

Funnel 56B

Funnel 56B connects the Program Counter High 51B to the ALU output bus 73. The gate funnel 56B signal is generated as shown in FIG. 6H, from the output of a latch which is set at T7 time or at T2 time and a ¾ clock and reset at T1 or T4 or a decode of a BOB instruction.

Funnel 64A

Figure 6I:
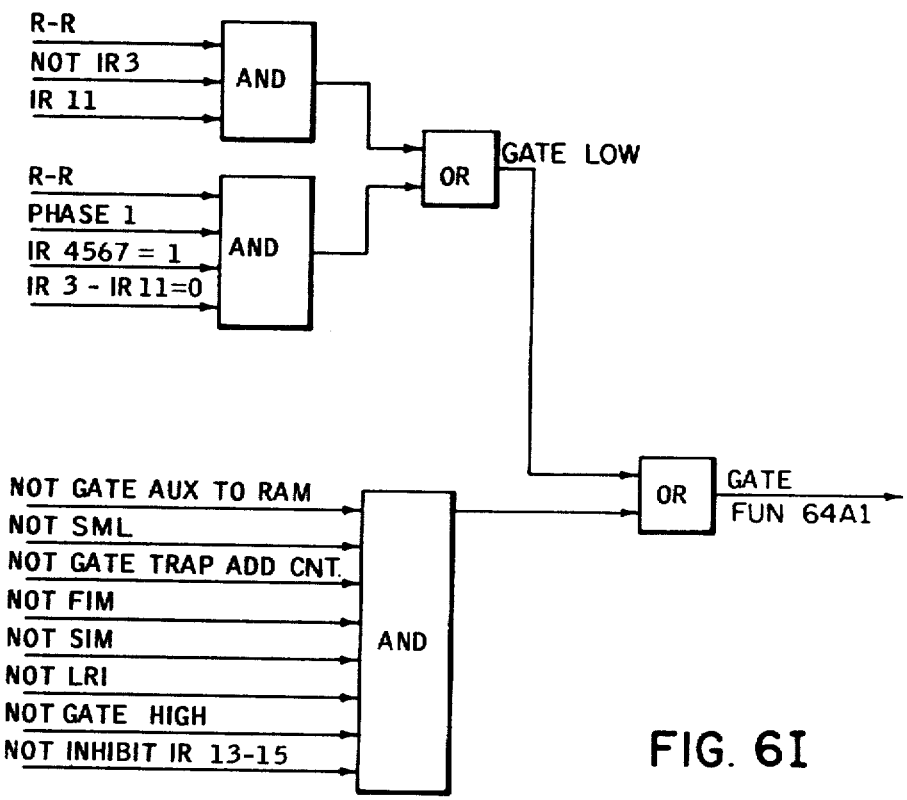

Funnel 64A connecting lines 12-15 of the instruction data bus 58 to RAM address lines 4-7 is controlled by two gating signals, gate funnel 64A-1 and A-2. The gate funnel 64A-1 signal is generated, as shown in FIG. 6I, by either a gate low signal GI or the combination of the following signals: NOT GATE AUXILIARY TO RAM, NOT SIL DECODE, NOT GATE TRAP ADDRESS COUNTER TO RAM, NOT FIM OR SIM, NOT LRI, NOT GATE HIGH, NOT INHIBIT LINES 13-15.

Figure 6J:
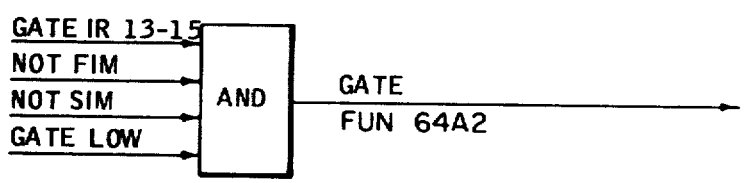

The gate funnel 64A-2 signal is generated, as shown in FIG. 6J, by ANDing the following signals: GATE IR 13-15 TO ARL 5-7, NOT FIM AND NOT SIM, or a gate low signal.

The gate low signal is generated, as shown in FIG. 6I, from ORing two separate groups of signals. The first group of signals which are ANDed are R to R decode, a NOT IR3 decode, and a positive IR11 decode. The second group of signals which are ANDed are an R-R decode, a phase 1 timing signal, a positive decode of IR 4, 5, 6 and 7, a NOT IR 3 and a NOT IR11. This signal is used to control other funnels also.

Funnel 64B

Figure 6K:
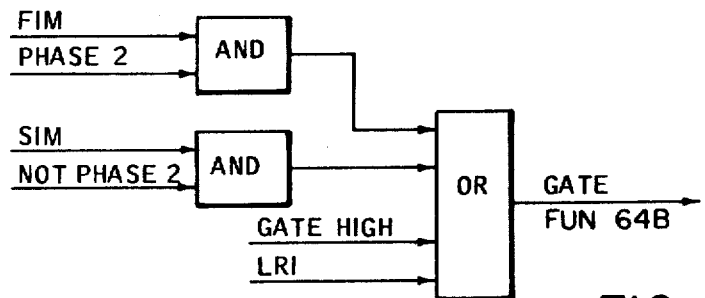

Funnel 64B connecting lines 4-7 of the IR bus to lines 4-7 of the RAM address is controlled by a gate funnel 64B signal. This signal is generated, as shown in FIG. 6K, by one of four signals, an FIM decode and a phase 2 timing signal or an SIM decode and a not phase 2 timing signal or a gate high signal to be described, or an LRID decode.

Funnel 64C

Figure 6M:
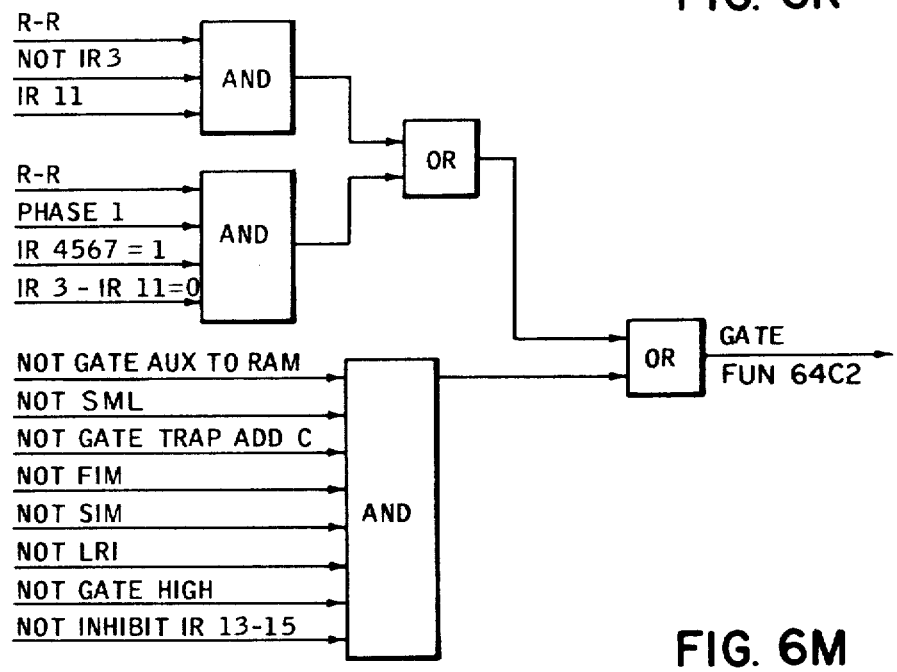
Figure 6L:
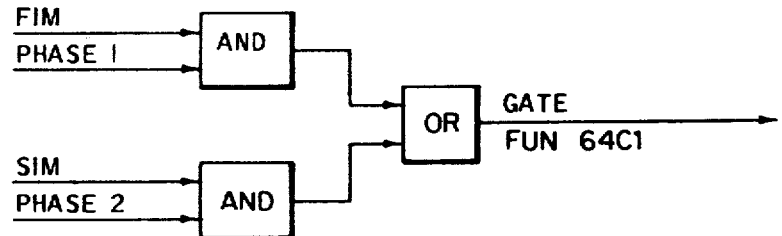

Funnel 64C connecting lines 9, 13-15 of the IR bus to lines 4-7 of the RAM address is controlled by two gate signals, gate funnel 64C-1 and gate funnel 64C-2. Gate funnel 64C-1 is generated, as shown in FIG. 6L, by either an FIM decode and a phase 1 timing signal or an SIM decode and a phase 2 timing signal. Gate funnel 64C-2 is generated, as shown in FIG. 6M, by the gate high signal.

The gate high is also used in the control of subsequent funnels. The gate high signal is generated from one of three separate groups of signals which are ANDed together. The first group of signals is an R-R decode, an IR 3 and a NOT IR 11. The second group of signals is an R-R instruction, an IR 3, an IR 11 and a NOT IR 4, 5, 6 and 7 equal to NOT 0. The third group of signals which are ANDed together are an R-R decode, an IR 4, 5, 6 and 7, an IR 3 and an IR 11 and the NOT phase 1 signal.

Funnel 64D

Figure 6N:
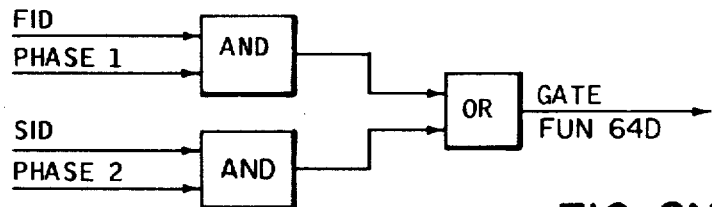
Figure 6O:
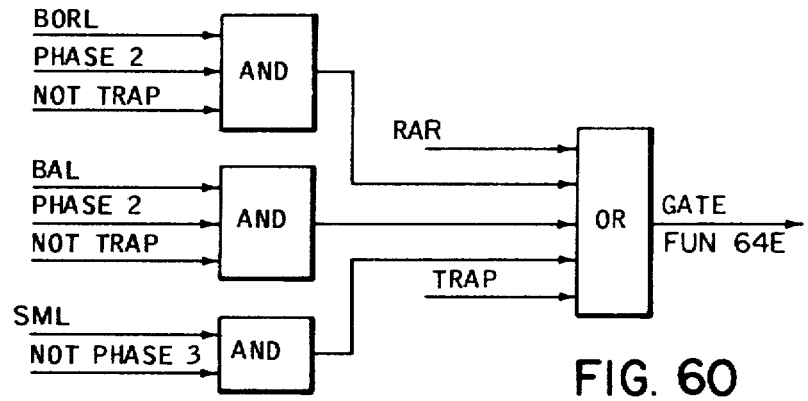

Funnel 64D connecting the output lines 4-7 of the auxiliary register to RAM address lines 4-7 is controlled by a gate funnel 64D signal. The gate funnel 64D signal is generated, as shown in FIG. 6N, by a phase 1 timing signal ANDed with an FID decode or a phase 2 timing signal ANDed with an SID decode.

Funnel 64E

Funnel 64E connecting the RAL address counter lines 5-7 to the RAM address lines 4-7 is controlled by a gate funnel 64E signal. This signal is generated as shown in FIG. 60, by either a RAR decode, a BORL decode ANDed with a phase 2 timing signal and a NOT trap signal, or a BAL decode, a phase 2 timing signal and a NOT trap signal, or an SIL decode and a NOT phase 3 timing signal or by a positive trap signal. Line 4 of the RAM address lines is always forced to a 1 by a gate funnel 64E signal.

Funnel 65A

Figure 6P:
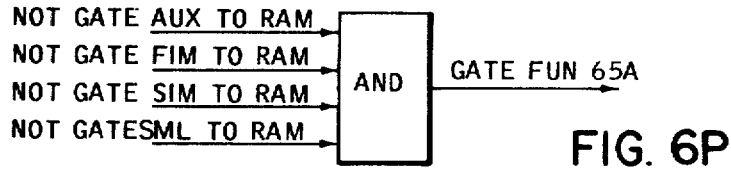

Funnel 65A connecting the level register to RAH is controlled by a gate funnel 65A signal. This signal is generated, as shown in FIG. 6P, by ANDing a NOT gate auxiliary to RAM with a NOT gate FIM or SIM to RAM and a NOT gate SIL to RAM signal.

Funnel 65B

Figure 6Q:
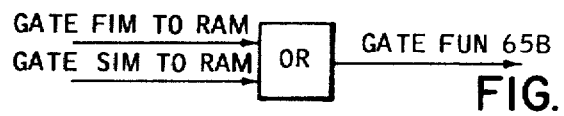

Funnel 65B connecting IR bus line 10, 11, 12 to RAH is controlled by gate funnel 64B signal. This signal is generated, as shown in FIG. 6Q, from a gate FIM or SIM to RAM signal.

Funnel 65C

Figure 6R:
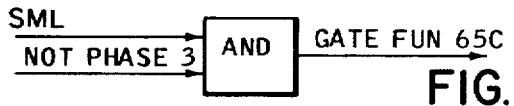

Funnel 65C connecting IR bus lines 11, 12, 13 to RAH is controlled by a gate funnel 65C signal. This signal is generated, as shown in FIG. 6R, by ANDing an SIL decode and a NOT phase 3 timing signal.

Funnel 65D

Figure 6S:
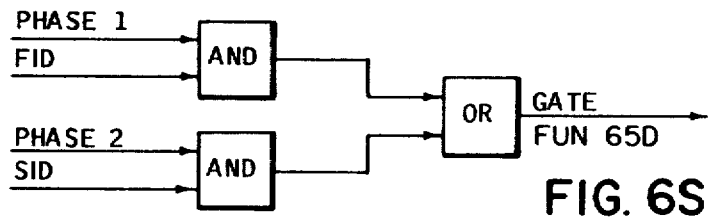
Figure 6A:
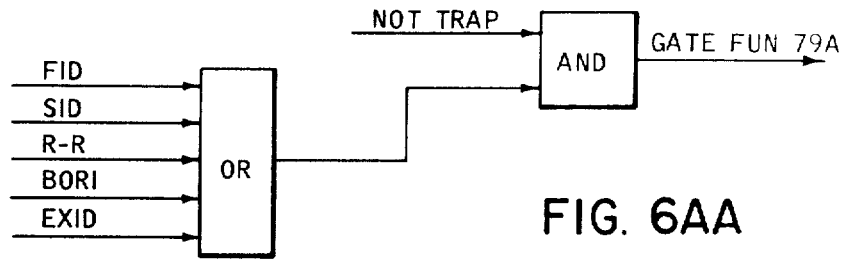
Figure 6B:
Figure 6C:
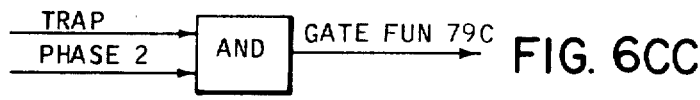
Figure 6D:
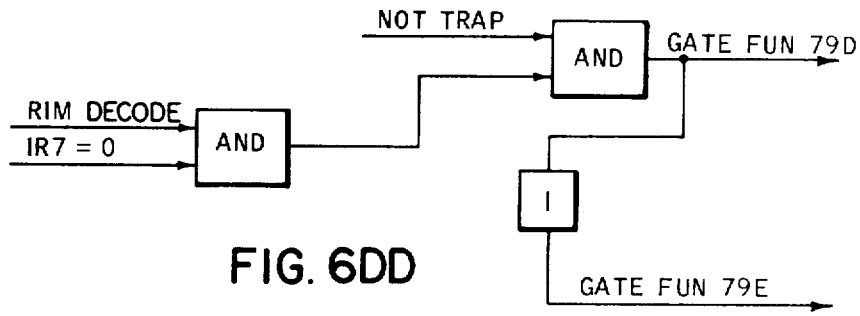
Figure 6E:
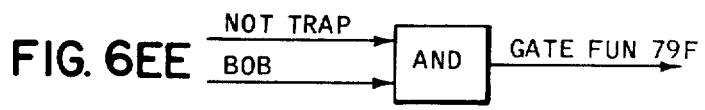
Figure 6F:
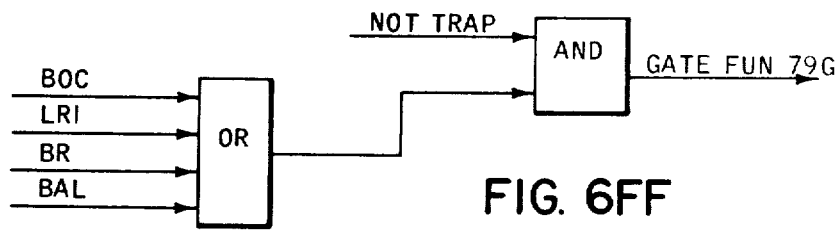
Figure 6G:
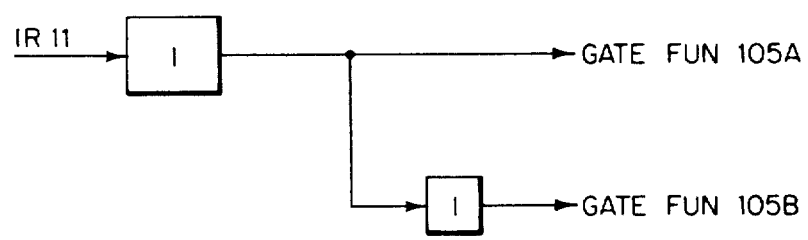
Figure 6H:
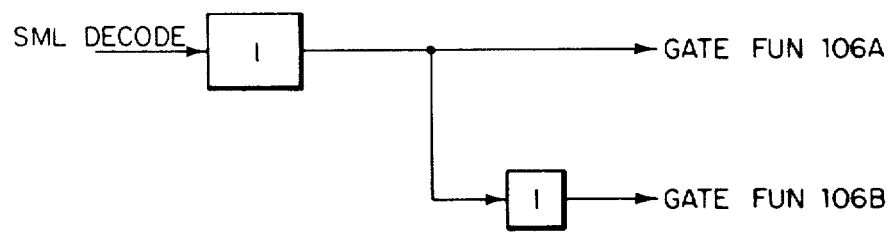

Funnel 65D connecting the auxiliary register bits 0-3 to RAH is controlled by gate funnel 65D signal which is the same as gate funnel 64D as shown in FIG. 6S.

The gate FIM or SIM signal to RAM, as shown in FIG. 6Q is generated by ANDing a phase 1 timing signal and an FIM decode or a phase 2 timing signal and a SIM decode. The gate SIL to RAM signal is generated by an SIL decode and a NOT phase 3 timing signal.

Funnel 72A

Funnel 72A connects the output of the ALU register to the ALU out bus 73. The control signal gate funnel 72A is generated, as shown in FIG. 6T, by inverting the gate funnel 72B signal.

Funnel 72B

Funnel 72B connects the RAM data bus 63 to the ALU out bus 73. The control signal gate funnel 72B is generated, as shown in FIG. 6T, by one of three signals which are OR'd together. These signals are a T7 timing pulse, a signal indicating that an RAR instruction is being executed or a signal indication that an SIL instruction is being executed.

Funnel 77A

Funnel 77A interconnects the ALU out bus 73 to the ALU A input 74. The control signal gate funnel 77A is developed, as shown in FIG. 6U, from the branch on bit op code 0010 shown in the table of FIG. 4, one line from decoder 53 signifying op code 0010 is connected to funnel 77A. This line is active for the period of T0-T6 when a branch on bit instruction is being executed.

Funnel 77B

Funnel 77B interconnects the bidirectional data bus 15 to the ALU A input 74. The control signal gate funnel 77B is generated, as shown in FIG. 6V, from a "Gate External Funnel" signal and a "NOT Branch on Bit" signal. The "Gate External Funnel" signal is generated from a timing signal, as shown in FIG. 5.

Funnel 77C

Funnel 77C interconnects the RAM output data bus 63 to the ALU A bus. The control signal gate funnel 77C is generated, as shown in FIG. 6W, by ORing together those outputs of decoder 53 corresponding to the respective op codes for the following instructions: Branch, Branch on Condition, Load Register Immediate, and Branch and Link, BOB with gate external funnel. The last input to the OR gate is a signal resulting from ANDing a T5 timing pulse with the decode for the store indirect or fetch indirect instructions. The output of the OR gate is inverted and used as the gate funnel 77C signal.

Funnel 78A

Funnel 78A connects the output data bus 63 from the RAM 38 to the ALU B input 75. The control signal gate funnel 78A is generated, as shown in FIG. 6Z, by any register to register instruction, op code 100 (except move bits 8-10 being equal to 110), where the auxiliary register is not used and "ANDing" this signal with a "not trap" signal. With reference to FIG. 4, if any of the following instructions, ANDR, ORR, XORR, ARC, or CR are being executed, the gate funnel 77 is generated provided a "trap" is not pending.

Funnel 78B

Funnel 78B connects the output of funnel 79 to the ALU B input 75. The control signal gate funnel 78B is, therefore, generated, as shown in FIG. 6Z, by inverting the control signal gate funnel 78A.

Funnel 79A

Funnel 79A connecting the Auxiliary Register 66 to the ALU B bus is controlled by a gate funnel 79A signal. This signal is generated, as shown in FIG. 6AA, by ANDing a "not trap" signal with any of the following instruction decodes: FID, SID, RR, BORI, or EXID.

Funnel 79B

Funnel 79B connecting the output of the mask register to the ALU B bus is controlled by gate funnel 79B signal. This signal is generated, as shown in FIG. 6BB, by ANDing a "trap" signal with a phase 1 timing signal.

Funnel 79C

Funnel 79C connecting three lines of the priority encoder 86 defining one of eight trap levels, to lines 0-3 of the ALU B bus is controlled by the gate funnel 79C signal. This signal is generated, as shown in FIG. 6CC, by ANDing a trap signal with a phase 2 timing signal.

Funnel 79D

Funnel 79D connects IR 3-6 to the ALU B bus. This signal gate funnel 79D is generated, as shown in FIG. 6DD, by ANDing a "not trap" signal with a RIM decode with bit 7 of the instruction equal to 0.

Funnel 79E

Funnel 79E is the inverted gate funnel 79D signal. Funnel 79E connects lines 3-6 of the IR bus to the ALU B bus.

Funnel 79F 79F connects lines 5-7 of the IR bus to lines 5-7 of the ALU B bus and is controlled by the signal gate funnel 79F. This signal is generated, as shown in FIG. 6EE, by ANDing a "not trap" signal with a BOB decode.

Funnel 79G

Funnel 79G connecting lines 8-15 of the IR bus to lines 0-7 of the ALU B bus is controlled by the gate funnel 79G signal. This signal is generated, as shown in FIG. 6FF, by ANDing a "not trap" signal with a decode of any of the following instructions: BOC, LRI, BR or BAL.

Funnel 105A

Funnel 105A connects the M Bus 15 to the BOB logic unit 104. The gate 105A signal is generated, as shown in FIG. 6GG, from a IR bit 11.

Funnel 105B

Funnel 105B connects the RAM output bus 63 to the BOB logic unit 104. The gate 105B signal is generated, as shown in FIG. 6GG, by inverting a gate 105A signal.

Funnel 106A

Funnel 106A connects one line from the Stack Pointer Logic 101 and three lines from the Condition Decoder 102 to the Status Register 100. The gate funnel 106A signal is a decode of an SIL instruction, as shown in FIG. 6HH.

Funnel 106B

Funnel 106B connecting lines 0-2 and 7 of the ALU bus to the Status Register 100 is controlled by gate funnel 106B signal which is the inverted gate funnel 106A signal, as shown in FIG. 6HH.

The logic for generating the gated driver control signals is also part of the control subsystem. FIGS. 7A through 7E illustrate the gated drivers for the ALU output bus 73 and bus 15 and the logic for generating the gate signals for drivers 110, 111, 112 and 114.

Gated Driver 110

The control signal for gated driver 110 which interconnects the ALU register 71 to the bus 15 as shown in FIG. 7B is generated by latch 110A. Latch 110A is set at the beginning of T0 and reset at the beginning of T2.

Gated Driver 111

Figure 7C:
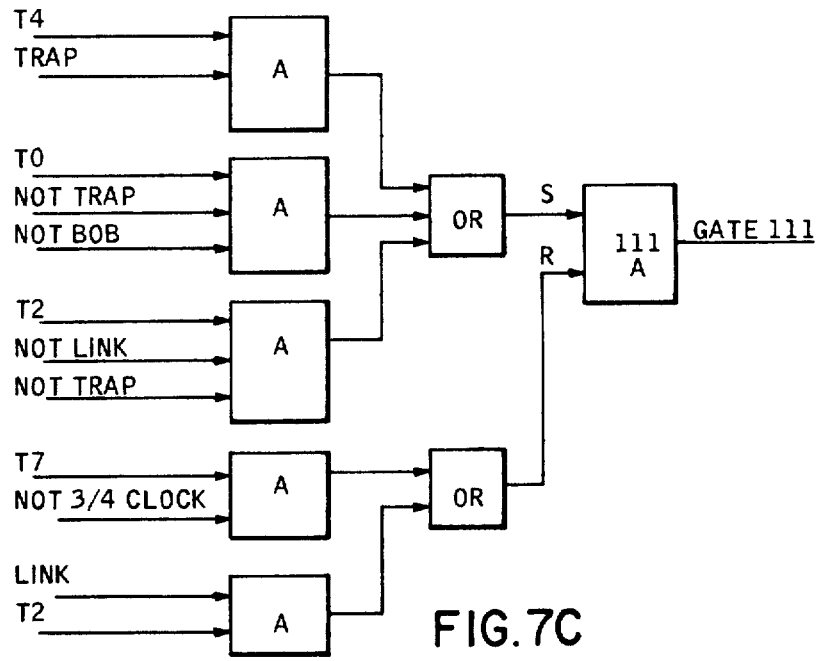

The control signal for gated driver 111 which connects the output of the ALU register 71 to the ALU out bus 73 as shown in FIG. 7C is generated by latch 111A. Latch 111A is set by either a T4 timing signal and a trap signal or a T0 timing signal, a not trap signal and a not BOB instruction decode signal, or T2 and not link and not trap. Latch 111A is reset by T7 and not $\frac{3}{4}$ clock, or T2 and link.

Gated Driver 112

The control signal for gated driver 112 connecting the program counter 51 to the ALU out bus 73 as shown in FIG. 7D is generated by latch 112A. Latch 112A is set by a T7 timing pulse, a trap signal and a not RAM clock signal or a T2 timing pulse, a link instruction decode and a RAM clock signal or a T0 timing pulse and a BOB decode. Latch 112A is reset by either a T2 timing signal, a not link instruction decode and a RAM clock, or a T5 timing pulse and a RAM clock signal.

Gated Driver 114

Gated driver 114 connecting the output of the status register 100 to the ALU out bus 73 as shown in FIG. 7E is controlled by a latch 114A. Set by RAM clock and T2 and trap reset by T4.

FIG. 5 illustrates the timing of these busses.

The logic for generating the various load register signals is also part of the control subsystem D.

Signal inputs to registers are gated into the register by specific load signals. The registers employ polarity hold latches which are set by the trailing edge of the load signal.

FIGS. 8A through 8K illustrate the logic for generating the specific load register signals. FIG. 5 shows the timing of these signals.

LIRD

The LIRD signal is supplied to the instruction register decoder 53 and is active for period T7. The LIRD signal is generated by ANDing a T7 signal from the bit ring counter with an appropriate control signal and functions to gate the contents of the instruction data bus into the instruction decoder 53 during T7 time. The logic is not shown in FIG. 8.

LARL

Figure 8A:
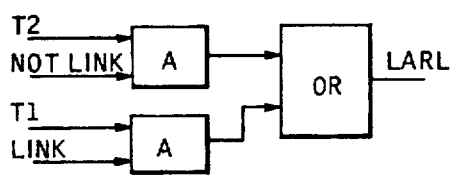
FIGS. 8A–8K illustrate the logic circuitry for generating the various load register signals.

The Load Address Register Low Signal controls the loading of the ARL 50A from funnel 55. The LARL signal as shown in FIG. 8A is generated by either a T2 timing signal and a "not link" instruction decode or a T1 timing signal and a link decode signal and a not trap signal. LARL is therefore active at either T1 or T2 only as shown in FIG. 5.

LARH

Figure 8B:
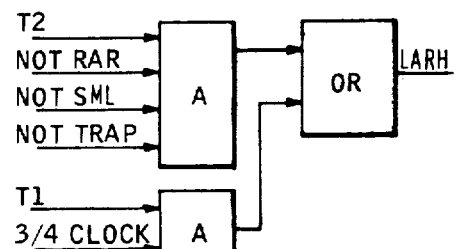

The Load Address Register High signal controls the loading of ARH 50B from funnel 54. The LARH signal as shown in FIG. 8B is generated by either of two signals. The first is a T2 timing pulse and a decode from a not RAR or SIL instruction and not trap. The second is a T1 timing signal, a $\frac{3}{4}$ clock signal and an RAR or SIL decode signal.

LPC

Figure 8C:
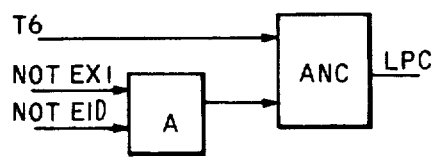

The Load Program Counter Signal loads the contents of the Address Register 50 into the Program Counter 51. The LPC signal as shown in FIG. 8C is generated from a T6 timing signal and a not EXI or EID decode.

LALUR

Figure 8D:
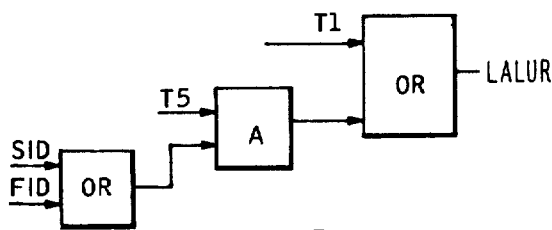

The Load ALU Register signal loads the output of the ALU 70 to the ALU Register 71. The LALUR signal as shown in FIG. 8D is generated by a T1 timing signal or a T5 timing signal and an SID or FID instruction decode.

LSR

Figure 8E:
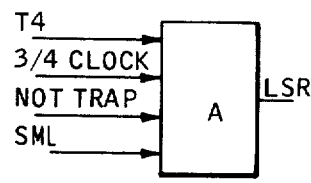

The Load Status Register signal loads the output of funnel 106B from the ALU out bus 73, lines 0-2 and 7 into the four stages of the Status Register. The LSR control signal as shown in FIG. 8E is generated by T4 timing signal, a ¾ clock signal, a not trap signal and an SIL decode. The four outputs of the funnel 106B are loaded in parallel into the Status Register 100 by LSR, whereas the four outputs of funnel 106A are each provided with their own load signal.

LCC1

Figure 8F:
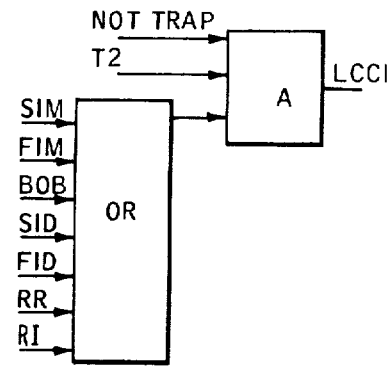

Stage 0 of Status Register 100 is loaded with the value of line 0 from the Condition Decoder 102 representing condition code 1 CC1 (ALU bus=all zero) by the LCC1 signal. The load condition code 1 signal as shown in FIG. 8F is generated by a T2 timing pulse and a decode of any of the following instructions: SIM, FIM, BOB, SID, FID, RR or RIM and not trap. For RI instructions, CC1 is updated by the results of the half byte of the ALU bus being equal to 0 that is selected by bit 7 of the instruction.

LCC2

Figure 8G:
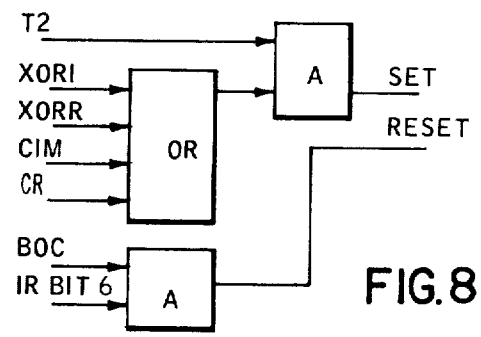

Stage one of the Status Register 100 is set when the value of line 1 from Condition Decoder 102 representing Condition Code 2 (ALU Bus≠to all zeros) is positive by the LCC2 signal. The Load Condition Code 2 signal as shown in FIG. 8G is generated by a T2 timing signal and a decode of the following instructions: XORI, XORR CIM, or CR. Stage 1 is reset only by a BOC decode specifying a test for CC2, i.e., bit six of the instruction is on.

LCC3

Figure 8H:
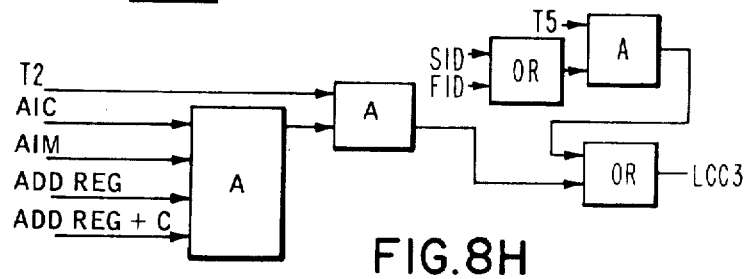

Stage two of the Status Register 100 is loaded from funnel 106A by the LCC3 signal. Stage two represents the carry signal from ALU 70. The load condition code 3 signal as shown in FIG. 8H is generated by a T2 timing signal and a decode of any of the following instructions: AIC, ARC, AIM, AR, or T5 and a decode of the instructions FID or SID.

TSP

Figure 8I:
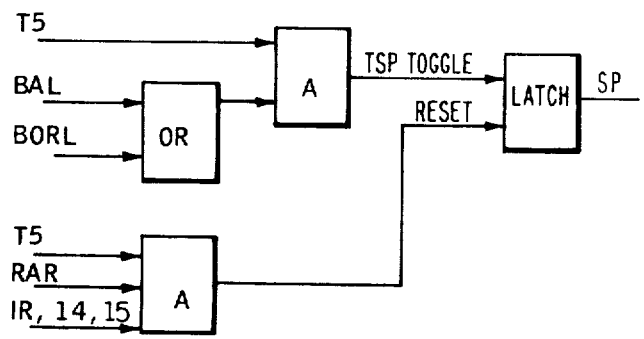

Stage four of the Status Register 100 functions as a trigger in response to a positive valued signal on the input to state four from funnel 106A. The Toggle Stack Pointer signal as shown in FIG. 8I is generated by a T5 timing signal and a BAL decode or a BORL decode, or an RAR decode when bits 14 and 15 of the RAR instruction are active and T5.

LMR

Figure 8J:
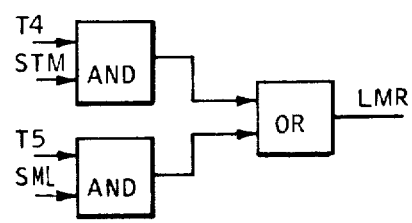

The Load Mask Register LMR signal loads the mask register 88 with the contents of the ALU out bus 73. The LMR signal as shown in FIG. 8J is generated by ANDing a T4 timing signal with an StM decode or a T5 timing signal with an SIL decode.

LAUR

Figure 8K:
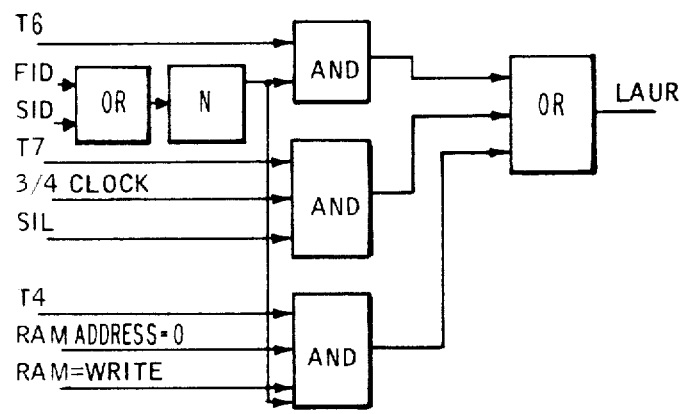

The Load Auxiliary Register LAUR signal loads the auxiliary register 66 with the contents of the ALU out bus 73. The LAUR signal as shown in FIG. 8K is generated by a T5 timing pulse and an FID or SID decode; a T7 timing pulse, a ¾ clock and a SIL; or a T4 timing pulse, a RAM address<0, a RAM write signal, and a not RID or SID signal.

LLR

The Load Level Register signal is generated by a T6 timing signal and an SML decode, and loads IRD 11-13 into the level register.

The Instruction Set

The function of each of the 30 separate instructions shown in FIG. 4 will now be described.

Individual Instructions

During an execution of an instruction, several different functions may occur. Each of these functions is generally common to a number of different instructions, so are described in detail at this point and merely referred to generally in the description of each instruction.

During the execution of certain instructions, it is necessary to set up address register high and address register low to fetch the next sequential instruction so that at T7 time of the current instruction cycle the output of ROS unit 52 can be loaded into the instruction register decoder 53. ARh and ARL are set up for the next instruction by transferring PCH and PCL to ARH and ARL through funnels 54C and 55D at T2 time. PCL is incremented by 1 at the beginning of T2. At T6 time, the program counter is updated by ARH and ARL so that at T2 time of the following instruction cycle ARH and ARL can again be updated from PCH and PCL plus 1, if the next sequential instruction is needed.

For certain instructions, for example the Execute Immediate and Execute Indirect instructions, the updating of the program counter at T6 is inhibited since the program counter reflects the address of the next instruction to be executed after the EXI or EID is executed.

Several instructions involve the addressing of an external funnel or an external register. This operation is the same for each of these instructions and was described in detail earlier. The operation, therefore, is referred to only generally in describing that portion of these instructions.

Several instructions involve the addressing of an internal register in RAM 38 through funnels 64 and 65 to either read data from the register or write data into the register. The read and write operations were discussed in detail in describing the overall operation of RAM 38, and hence, are not discussed in detail in each instruction.

Other operations which are common to two or more instructions, such as "link" will be described once in detail and then referred to generally in subsequent instructions.

---

1. BRANCH (BR)
A. INSTRUCTION FORMAT
    Bits 0-2          op code
    Bits 3-15        branch address

---

B. FUNCTIONAL DESCRIPTION

This instruction allows branching within 8K words of the control store. The branch address is represented by bits 3-15 of the BR instruction. The highest order bit located in stage O of ARH is not changed. Branching is, therefore, limited to the same 8K section of ROS where the branch instruction is stored.

Lines 3-7 from instruction decoder 53 are connected directly to funnel 54B which applies stages 1 through 5 of ARH with five of the six bits for ARH. The low order portion of the address is supplied from decoder 53 to ARL through funnel 79G, 78B, the ALU 70, ALU Reg. 71, funnel 72A, drive 111, ALU output bus 73 and funnel 55A.

C. CONTROL SIGNALS AND TIMING

| Control Signals | Timing | Function |
| --- | --- | --- |
| LIRD | T7 | IR bus loaded into IRD 53 |
| Gate Funnel 54B | T7+ | Connect IR 3-7 to ARH |
| LARH | T2 | ARH loaded from funnel 54B |
| Gate Funnel 79G | T7+ | Connect IR 8-15 to ALU B bus 82 |
| Gate Funnel 78B | T7+ | Connect 82 to ALU B input |
| LALUR | T1 | ALU Reg. loaded from ALU 70 |
| Gate Funnel 72A | T1-T7 | Connect ALU Reg. to driver 111 |
| Gate Driver 111 | T0+ | Connect funnel 72 to ALU out bus 73 |
| Gate Funnel 55A | T7+ | Connect ALU out bus 73 to ARL |
| LARL | T2 | ARL loaded from funnel 55 |

D. NEXT ADDRESS

Unconditional branch type of instruction. The next address is generated by executing the instruction.

E. STATUS REGISTER CHANGE

No change.

2. BRANCH ON BIT (BOB)

A. INSTRUCTION FORMAT

| Bits 0-2 | op code |
| --- | --- |
| Bit 3 | op code modifier |
| Bit 4 | 0=Off, False; 1=On, True |
| Bits 5-7 | increment |
| Bits 8-10 | bit position to be checked |
| Bits 11-15 | register to be checked |

B. FUNCTIONAL DESCRIPTION

The Branch on Bit instruction is a conditional branch instruction. Any bit of any internal or external register can be tested for an on (1) or off (0) condition. If the test is true, the branch is taken. If not true, the program counter is incremented by one and the next sequential instruction is taken. The branch address is the current program counter plus an increment of from 0-7 specified by bits 5-7 of the instruction.

Program counter high 51B is gated through funnel 54C and loaded into address register high 50B at T2 time.

The contents of the register specified by bits 11-15 are supplied to the Branch on Bit logic unit 104 along with bits 8-10 which specify the bit position to be checked. If bit 11 is a 0, an external funnel is indicated. This funnel is gated to the M bus and to the Branch On Bit Logic unit through funnel 105a. If bit 11 is a 1, an internal register is addressed and is gated through funnel 105B. If the value of the bit position defined by bits 8-10 matches the value of bit 4 of the instruction, the Branch On Bit logic unit indicates a BOB=YES signal. If the BOB logic is true, the address register low signal is loaded from the ALU register 71. If BOB logic is false, the address register low is loaded from program counter low through funnel 55D.

The branch address for ARL which comes from the ALU register 71 is generated by gating program counter low through funnel 56A and driver 112 onto the ALU out bus 73 through funnel 77A to the A input of the ALU. Bits 5-7 of the instruction register are gated through funnel 79F to ALU B bus 82 through funnel 78B to the B input of the ALU 70. The ALU is set to add the A and B inputs and the results are stored in the ALU register 71 at T1 time. An increment of 0 can be used as a one instruction wait loop.

C. CONTROL SIGNALS AND TIMING

| Control Signals | Timing | Function |
| --- | --- | --- |
| LIRD | T7 | IR bus loaded into IRD 53 |
| Gate Funnel 54C | T7+ | Connect PCH to ARH |
| Load ARH | T2 | ARH loaded from funnel 54C |
| If bit 11=1 | | |
| Gate Funnel 64A | T7+ | Connect IR 12-15 to RAH |
| Gate Funnel 65A | T7+ | Connect level Reg. to RAL |
| Gate Funnel 105B | T7+ | Connect 63 to BOB logic 104 |
| Read RAM | T0 | Read out addressed Reg. |
| Set BOB Unit | T0 | Load Branch on Bit logic unit |
| If bit 11=0 | | |
| Gate External Funnel | T0 | Load M bus from funnel |
| Gate Funnel 105A | T7+ | Connect M bus to BOB logic 104 |
| Set BOB Unit | T1 | Load BOB unit |
| Gate Funnel 56A | T7+ | Connect PCL to 112 |
| Gate Driver 112 | T7+ | Connect funnel 56 to ALU out bus |
| Gate Funnel 77A | T7+ | Connect 73 to ALU A |
| Gate Funnel 79F | T7+ | Connect IR 5-7 to ALU B bus 82 |
| Gate Funnel 78B | T7+ | Connect 82 to ALU B |
| LALUR | T1 | ALU Reg. loaded from ALU 70 |
| Gate Funnel 72A | T7+ | Connect ALU Reg. to driver 111 |
| Gate Driver 111 | T7+ | Connect funnel 72 to ALU out bus 73 |
| If BOB=YES | | |
| Gate Funnel 55A | T2 | Connect ALU out bus 73 to ARL |
| If BOB=NO | | |
| Gate Funnel 55D | T2 | Connect RAM out bus 63 to ARL |
| LARL | T2 | ARL loaded from funnel 55 |

D. NEXT ADDRESS

Conditional branch type of instruction. The next address is generated either by executing instruction or by transferring program counter to address register.

E. STATUS REGISTER CHANGE

No change.

3. BRANCH ON CONDITION (BOC)

A. INSTRUCTION FORMAT

| Bits 0-2 | op code |
| --- | --- |
| Bit 3 | op code modifier |
| Bit 4 | 0=Off, False; 1=On, True |
| Bits 5-7 | specified conditions |
| Bits 8-15 | branch address |

B. FUNCTIONAL DESCRIPTION

The Branch on Condition instruction is a conditional branch instruction. Bits 5-7 of the instruction signify a reference to condition code CC1, CC2 or CC3. The condition code is matched against the condition code in status register 100. If bit 4 is a 1, then the selected condition codes will be tested for a 1. If any condition code is on, then Branch on Condition will equal YES and will be set to a true value. If bit 4 is a 0, then the specified conditions will be tested for a 0 and if any condition code is a 0, the Branch on Condition will be set to equal true. If the Branch on Condition is true, the branch address is generated and used for the next instruction. If false, the program counter is used for the next address.

The program counter high 51B is gated through funnel 54C and loaded into ARH 50B at T2 time. The branch address defined by bits 8–15 is transferred to the ALU register 71 through funnel 79G, ALU B bus 82, funnel 78B and ALU register 71. If the Branch on Condition is true, the output of the ALU register is transferred to ARL through gate 72A, driver 111, ALU output bus 73 and funnel 55A. If the Branch on Condition is false, program counter low is transferred to ARL through funnel 55D. If bit 6 of the instruction is on, then condition code 2 is reset at the end of the instruction.

C. CONTROL SIGNALS AND TIMING

| Control Signals | Timing | Function |
|---|---|---|
| LIRD | T7 | IR bus loaded into IRD 53 |
| Gate Funnel 54C | T7+ | Connect PCH to ARH |
| LARH | T2 | ARH loaded from funnel 54 |
| Gate Funnel 79G | T7+ | Connect IR 8–15 to ALU B bus 82 |
| Gate Funnel 78B | T7+ | Connect 82 to ALU B |
| LALUR | T1 | ALU Reg. loaded from ALU 70 |
| If BOC=True | | |
| Gate Funnel 72A | T7+ | Connect ALU Reg. to driver 111 |
| Gate Driver 111 | T7+ | Connect funnel 72 to ALU out bus 73 |
| Gate Funnel 55A | T7+ | Connect ALU out bus 73 to ARL |
| If BOC=False | | |
| Gate Funnel 55D | T7+ | Connect PCL to ARL |
| LARL | T2 | ARL loaded from funnel 55 |

D. NEXT ADDRESS

Conditional branch type of instruction. The next address is generated either by executing instruction or by transferring program counter to address register.

E. STATUS REGISTER CHANGE

CC2 reset at T5.

4. FETCH IMMEDIATE (FIM)

A. INSTRUCTION FORMAT

| Bits 0–2 | op code |
|---|---|
| Bits 3–7 | destination register |
| Bit 8 | op code modifier; 0=Fetch |
| Bit 9 | buffer or stack (0=buffer) |
| Bits 10–15 | address of the source register |

B. FUNCTIONAL DESCRIPTION

The function of this instruction is to transfer a byte of data from any position in the local store or program stack to any internal or external register.

The data path extends from RAM 38 through RAM output bus 63, funnel 77C to the ALU register 71. If the destination is an internal register, the path is from the ALU register 71 through funnel 72A, driver 111, ALU output bus 73 to the input of RAM 38. If the destination is an external register, the path extends from the ALU register 71 through driver 110, the M bus 15 to the selected external register.

The source register in RAM 38 is addressed through funnel 64C and 65B. Funnel 64C supplies IR bits 9, 13, 14 and 15 to RAH while funnel 65B supplies IR bits 10, 11 and 12 to RAL. If the destination register defined by IR 3-7 is external, i.e., bit 3 is equal to a 0, the external register is addressed as previously described by decoder 26.

If the destination register is an internal register, i.e., bit 3 is a 1, then funnel 64B supplies bits 4–7 to RAH while funnel 65A supplies the output of the level register to RAL.

C. CONTROL SIGNALS AND TIMING

| Control Signals | Timing | Function |
|---|---|---|
| LIRD | T7 | IR bus loaded into IRD 53 |
| Gate Funnel 64C | T7+ | Connect IR 9, 13-15 to RAH |
| Gate Funnel 65B | T7+ | Connect IR 10, 11, 12 to RAL |
| Gate Funnel 77C | T7+ | Connect 63 to ALU A |
| Read RAM | T0 | Read out addressed Reg. |
| LALUR | T1 | ALU Reg. loaded from ALU 70 |
| If bit 3=1 | | |
| Gate Funnel 72A | T1 | Connect ALU Reg. to driver 111 |
| Gate Driver 111 | T1 | Connect funnel 72 to ALU out bus 73 |
| Gate Funnel 64B | T1 | Connect IR 4–7 to RAH |
| Gate Funnel 65A | T1 | Connect level Reg. to RAL |
| Write RAM | T3 | Write into addressed Reg. |
| If bit 3=0 | | |
| Gate Driver 110 | T2 | Connect ALUR 71 to M bus |
| Load External Register | T4 | External register loaded from M bus |

D. NEXT ADDRESS

Non-branch type of instruction. The next sequential address is generated by program counter and transferred to address register.

E. STATUS REGISTER CHANGE

CC1 changed at T2.

5. STORE IMMEDIATE (SIM)

A. INSTRUCTION FORMAT

| Bits 0–2 | op code |
|---|---|
| Bit 3 | internal or external |
| Bits 4–8 | source register |
| Bit 9 | buffer or stack |
| Bits 10–15 | destination register |

B. FUNCTIONAL DESCRIPTION

The function of this instruction is to transfer the contents of a specified source register, either internal or external, to an internal buffer or stack register whose address is defined by bits 9-15. Bit 3 determines if the source register is either internal or external. The data path from an external register to RAM is through M bus 15, funnel 77B, ALU register 71, funnel 72A, driver 111 and ALU bus 73. The data path from an internal register back to RAM is RAM output bus 63, funnel 77C, ALU register 71, funnel 72A, driver 111 and ALU bus 73. An external register is addressed in a conventional manner. The internal register is addressed through funnel 64B and 65A. Funnel 64B supplies IR bits 4-7 to RAH while funnel 65A supplies the output of level register to RAL from the level register. The destination register in RAM 38 is addressed through funnel 64C and 65B. Funnel 64C supplies bits 9, 13, 14 and 15 to RAH while funnel 65B supplies bits 10, 11 and 12 to RAL.

C. CONTROL SIGNALS AND TIMING

| Control Signals | Timing | Function |
|---|---|---|
| LIRD<br>If bit 3=0 | T7 | IR bus loaded into IRD 53 |
| Gate External Funnel | T0-T1 | Load M bus from funnel |
| Gate Funnel 77B | T0-T1 | Connect M bus to ALU A |
| LALUR<br>If bit 3=1 | T1 | ALU Reg. loaded from ALU 70 |
| Gate Funnel 77C | T0 | Connect 63 to ALU A |
| Gate Funnel 64B | Phase 1 | Connect IR 4-7 to RAH |
| Gate Funnel 65A | T0 | Connect level Reg. to RAL |
| Read RAM | T0 | Read out addressed Reg. |
| LALUR | T1 | ALU Reg. loaded from ALU 70 |
| Gate Funnel 72A | T7+ | Connect ALU Reg. to driver 111 |
| Gate Driver 111 | T7+ | Connect funnel 72 to ALU out bus 73 |
| Gate Funnel 64C | Phase 2 | Connect IR 9, 13-15 to RAH |
| Gate Funnel 65B | Phase 2 | Connect IR 10, 11, 12 to RAL |
| Write RAM | T3 | Write into addressed Reg. |

D. NEXT ADDRESS

Non-branch type of instruction. The next sequential address is generated by program counter and transferred to address register.

E. STATUS REGISTER CHANGE

CC1 changed at T2

6. REGISTER IMMEDIATE (RIM)

A. INSTRUCTION FORMAT

| Bits 0-2 | op code |
|---|---|
| Bits 3-6 | constant |
| Bit 7 | H/L half byte |
| Bits 8-10 | ALU op code |
| Bit 11 | external or internal register |
| Bits 12-15 | register address |

B. FUNCTIONAL DESCRIPTION

The function of this instruction is to perform one of six different logical operations defined by bits 8-10 involving a 4 bit constant defined by bits 3-6 and the high or low half byte determined by bit 7 of an 8 bit byte stored in a register whose address is defined by bits 11-15. If bit 11 is a 0, the data path is from the external register to the ALU through M bus 15 and funnel 77B. If bit 11 is a 1, the data path from RAM extends from bus 63 through funnel 77C. The other input to the ALU is from funnel 79E if bit 7 is a 1, and from funnel 79D if bit 7 is a 0. Both of these funnels are supplied with the half byte of data defined by IR 3-6. Funnel 79D is supplied with the low half byte and funnel 79E with the upper half byte. The data from funnel 79E is supplied to ALU B bus 82 to funnel 78B and the ALU B input.

The ALU performs the defined logical function and the results are loaded into the ALU register 71. The ALU register is transferred to the source register through either 72A and driver 111, or through driver 110, M bus 15 to the external register. The external register is addressed in a conventional manner. The internal register is addressed through funnel 64A and 65A. Funnel 64A supplies IR 12-15 to RAH and funnel 65A supplies the output of the level register to RAL. Both external registers must have the same address if one is a source and the other a destination.

C. CONTROL SIGNALS AND TIMING

| Control Signals | Timing | Function |
|---|---|---|
| LIRD<br>If bit 7=1 | T7 | IR bus loaded into IRD 53 |
| Gate Funnel 79E | T7+ | Connect IR 3-6 to ALU B bus 82 4-7 |
| If bit 7=0 | | |
| Gate Funnel 79D | T7+ | Connect IR 3-6 to ALU B bus 82 0-3 |
| Gate Funnel 78B<br>If bit 11=0 | T7+ | Connect 82 to ALU B |
| Gate Funnel 77B | T0-T1 | Connect M bus to ALU A |
| Gate External Funnel<br>If bit 11=1 | T0 | Load M bus from funnel |
| Gate Funnel 77C | T0 | Connect 63 to ALU A |
| Gate Funnel 65A | T7+ | Connect level Reg. to RAL |
| Gate Funnel 64A | T7+ | Connect IR 12-15 to RAH |
| Read RAM | T0 | Read out addressed Reg. |
| LALUR | T1 | ALU Reg. loaded from ALU 70 |
| Gate Funnel 72A | T0+ | Connect ALU Reg. to driver 111 |
| Gate Driver 111 | T0+ | Connect funnel 72 to ALU out bus 73 |
| Gate Funnel 65A | T7+ | Connect level Reg. to RAL |
| Gate Funnel 64A | T7+ | Connect IR 12-15 to RAH |
| Write RAM | T4+ | Write into addressed Reg. |

D. NEXT ADDRESS

Non-branch type of instruction. The next sequential address is generated by program counter and transferred to address register.

E. STATUS REGISTER CHANGE

The condition codes 1-3 are set in accordance with the following table:

| | Register Immediate | | | | | | |
|---|---|---|---|---|---|---|---|
| INST | ALU OP | Cin | M | S0-S3 | CC1 | CC2 | CC3 |
| AND IMM | AND | 0 | 1 | 0111 | Set | | |
| OR IMM | OR | 0 | 1 | 1101 | Set | | |
| XOR IMM | XOR | 0 | 1 | 1001 | Set | Set | |
| ADD+C IMM | ADD | CC3 | 0 | 1001 | Set | | Set |
| COMPARE IMM | XOR | 0 | 1 | 1001 | Set | Set | |
| ADD IMM | ADD | 0 | 0 | 1001 | Set | | Set |

7. REGISTER TO REGISTER (RR-MR)

A. INSTRUCTION FORMAT

| Bit 0-2 | op code |
|---|---|
| Bit 3 | internal/external |
| Bits 4-7 | destination register (operand A) |
| Bits 8-10 | op code modifier |
| Bit 11 | internal/external |
| Bits 12-15 | source register (operand B) |

B. FUNCTIONAL DESCRIPTION

The function of the Register to Register Move instruction is merely to move the contents of one register to another register. In a Register to Register Move operation, four different data paths are possible since the source register may be either internal or external and the destination register may be either internal or external.

If the source register defined by bits 11-15 is internal, data is placed on RAM output bus 63 and supplied to funnel 77C and loaded into the ALU register 71 at T1 time. If the source register is external, data from the selected funnel is placed on M bus 15 and gated through funnel 77B and loaded into the ALU register at T1 time. If the destination register is internal, the data is transferred from the ALU register 71 through funnel 72A, driver 111, ALU output bus 73 to the input of RAM 38. If the destination register is external, the data is transferred from the ALU register 71 through driver 110 to the M bus 15 to the selected register.

Addressing of the external funnel and/or register is conventional through decoder 26.

Addressing of an internal source register is through funnel 65A and funnel 64A. The funnel 65A supplies the level register to RAL, while funnel 64A supplies IR 12-15 to RAH. Addressing of an internal destination register is through funnel 64B which is supplied with IR 4-7 and sets RAH. Level register 87 is supplied to funnel 65A to set RAL.

C. CONTROL SIGNALS AND TIMING

| Control Signals | Timing | Function |
| --- | --- | --- |
| LIRD | T7 | IR bus loaded into IRD 53 |
| Source is Internal | | |
| Gate Funnel 77C | T7+ | Connect 63 to ALU A |
| Gate Funnel 65A | T7+ | Connect level Reg. to RAL |
| Gate Funnel 64A | T7+ | Connect IR 12-15 to RAH |
| Read RAM | T0 | Read out addressed Reg. |
| LALUR | T1 | ALU Reg. loaded from ALU 70 |
| Source is External | | |
| Gate Funnel 77B | T7+ | Connect M bus to ALU A |
| Gate External Funnel | T0-T1 | Load M bus from funnel |
| LALUR | T1 | ALU Reg. loaded from ALU 70 |
| Destination is Internal | | |
| Gate Funnel 72A | T7+ | Connect ALU Reg. to driver 111 |
| Gate Driver 111 | T0 | Connect funnel 72 to ALU out bus 73 |
| Gate Funnel 65A | T2+ | Connect level Reg. to RAL |
| Gate Funnel 64B | T2+ | Connect IR 4-7 to RAH |
| Write RAM | T4+ | Write into addressed Reg. |
| Destination is External | | |
| Gate Driver 110 | T7+ | Connect ALU Reg. to M bus |
| Load External Register | T4 | Register loaded from M Bus |

REGISTER TO REGISTER INSTRUCTION OTHER THAN MOVE (RR)

A. INSTRUCTION FORMAT

| Bits 0-2 | op code |
| --- | --- |
| Bit 3 | internal/external |
| Bits 4-7 | destination register |
| Bits 8-10 | op code modifier |
| Bit 11 | internal/external |
| Bits 12-15 | source register |

B. FUNCTIONAL DESCRIPTION

The function of the Register to Register Instruction Other Than Move is to perform a specified ALU operation on the data in the two registers whose addresses are defined by bits 3-7 and 10-15 of the instruction. The result of the ALU operation (except for COMPARE) is stored in the register defined by bits 3-7. This register is defined as the destination register. Bits 10-15 define the source register RS. One register must be an internal register and the other an external register, or both registers can be the same. The auxiliary register can be either an internal or external register for the instruction so that an external register and the auxiliary register can be involved, or an internal register and the auxiliary register can be involved in the operation. The following is a chart of the six possible destination and source register combinations:

| Destination Register | Source Register |
| --- | --- |
| External | Internal |
| Internal | External |
| External | Auxiliary |
| Auxiliary | External |
| Internal | Auxiliary |
| Auxiliary | Internal |
| Internal | Internal (same address) |

The contents of both registers are supplied to the ALU, operated on, and stored in the ALU register 71. The ALU register is then transferred to the destination register. The data path from the external register to the ALU is the same regardless of whether it is a source or destination. This path extends from the external funnel specified by the address to the M bus 15 through funnel 77B to the A input of the ALU 70.

The data path from the internal register to the ALU is the same regardless of whether it is a source or destination. This path extends from RAM output bus 63 through funnel 78A to the B input of ALU 70. This path is used when the other register is an external register. When the other register is the auxiliary register, the data path is from RAM output bus 63 through funnel 77C to the A input of the ALU 70. The data path from the auxiliary register to the ALU is through funnel 79A, ALU bus 82, funnel 78B to the B input of the ALU. The data path from the ALU register 71 to the destination register is as follows: if the destination register is an external register, the path is through driver 110, the M bus, to the selected external register. If the destination register is an internal register, the path is through funnel 72A, driver 111, ALU output bus 73 to the write input of RAM 38. If the destination register is the auxiliary register, then the auxiliary register 66 and RAM 38 location 00 are supplied from the ALU output bus 73.

Addressing of the external register and funnel is through decoder 26. Addressing of the RAM is through funnels 65A and 64A where the auxiliary register is the source register, and through funnel 65A and 64B where an internal register is the destination register. The ALU register 71 is loaded at T1 time with the results of the ALU operation. The external register is loaded at T4 time.

D. NEXT ADDRESS

Non-branch type of instruction. The next sequential address is generated by program counter and transferred to address register.

E. STATUS REGISTER CHANGE

The following chart indicates what occurs with the condition codes CC1 through CC3 for the various ALU ops for an R to R instruction which is not a move:

| INST | Register to Register | | | | | | |
|---|---|---|---|---|---|---|---|
| | ALU OP | C-IN | M | S0-S3 | CC1 | CC2 | CC3 |
| AND REG | AND | 0 | 1 | 0111 | Set | | |
| OR REG | OR | 0 | 1 | 1101 | Set | | |
| XOR REG | XOR | 0 | 1 | 1001 | Set | Set | |
| ADD+C REG | ADD | CC3 | 0 | 1001 | Set | | Set |
| COMPARE REG | ADD | 0 | 1 | 1001 | Set | Set | |
| ADD REG | ADD | 0 | 0 | 1001 | Set | | Set |
| MOVE | PASS A | 0 | 1 | 1111 | Set | | |

8. LOAD REGISTER IMMEDIATE (LRI)

A. INSTRUCTION FORMAT

| Bits 0-2 | op code |
|---|---|
| Bit 3 | internal or external register |
| Bits 4-7 | register address |
| Bits 8-15 | data constant |

B. FUNCTIONAL DESCRIPTION

The function of this instruction is to load an 8 bit constant specified by bits 8-15 to either an internal register or an external register whose address is specified by bits 3-7.

Since there is one data source and two potential destinations, two potential data paths and two potential addresses are involved. Bit 3 of the instruction determines which data path is selected and which address is involved. If bit 3 is equal to a 0 indicating an external register, the data path extends from the instruction decoder 53, lines 8-15 through funnel 79G ALU Bus 82, funnel 78B to ALU Reg 71. The ALU Reg is loaded at T1 time. From ALU Reg 71 the path extends through drivers 110 to Bus 15 to the selected external register. The external register is loaded at T4 time.

The address of the external register is supplied from instruction decoder 53 to external register address decoder 26 which selects the appropriate register.

C. CONTROL SIGNALS AND TIMING

| Control Signals | Timing | Function |
|---|---|---|
| LIRD | T7 | IR bus loaded into IRD 53 |
| Gate Funnel 79G | T7+ | Connect IR 8-15 to ALU B bus 82 |
| Gate Funnel 78B | T7+ | Connect 82 to ALU B |
| LALUR | T1 | ALU Reg. loaded from ALU 70 |
| Gate Driver 110 | T7+ | Connect ALU Reg. to M bus |
| Gate External Register | T4 | Register loaded from M bus |

If bit 3 is equal to a 1, the data path is the same to the ALU register. However, from the ALU register 71, the data path to the internal register is through funnel 72A Drivers 111, ALU output Bus 73 to the input of RAM 38. The RAM address specified by bits 4-7 is supplied from IR decoder 53, lines 4-7 to funnel 64B for RAM address high. The four low order address bits for RAL are supplied from level register 87 through funnel 65A.

The following control signals occur at the times indicated to cause the appropriate action. The sequence is the same to the point that the ALU register 71 is loaded. From then on the sequence differs as follows:

| Control Signals | Timing | Function |
|---|---|---|
| LALUR | T1 | ALU Reg. loaded from ALU 70 |
| Gate Funnel 72A | T1 | Connect ALU Reg. to driver 111 |
| Gate Driver 111 | T1 | Connect funnel 72 to ALU out bus 73 |
| Gate Funnel 64B | T7+ | Connect IR 4-7 to RAH |
| Gate Funnel 65A | T7+ | Connect level Reg. to RAL |
| Write RAM | T4 | Write into addressed Reg. |

D. NEXT ADDRESS

Non-branch type of instruction. The next sequential address is generated by program counter and transferred to address register.

E. STATUS REGISTER CHANGE

No change.

9. EXECUTE IMMEDIATE (EXI)

A. INSTRUCTION FORMAT

| Bits 0-2 | op code |
|---|---|
| Bits 3-7 | page address |
| Bits 8-10 | op code modifier |
| Bits 11-15 | register address |

B. FUNCTIONAL DESCRIPTION

The function of this instruction is to branch unconditionally to an instruction stored in an address determined by the page address bits 3-7 and the contents of the register whose address is specified by bits 11-15. It will execute the instruction at this address and will then return to the next sequential instruction. Bits 3-7 determine four of the five address register high bits while the eight address register low bits are determined by the contents of the addressed register, the high order bit 0 of the address register high is not changed.

The first data path extends from IR decoder 53, lines 3-7 to address register high, lines 1-5. This path involves only funnel 54B.

The second path which is established to ARL 50A originates at either an external funnel or an internal register. If bit 11 is a 1, the register is internal. If bit 11 is 0, the source is an external funnel. The path from an external funnel to ARL 50A is through the M Bus 15, GATE 77B, ALU REG 71, funnel 72A, driver 111, ALU out Bus 73 and funnel 55A. The path from an internal register to ARL 50A is from the RAM output data Bus 63, funnel 77C, to ALU REG 71. From ALU REG 71 to ARL 50A the path is the same as for the external register.

If bit 11 is a 0, the external register address is supplied from the external register address decoder 26 which is connected to IRD 53 which then selects the correct external register. If bit 11 is a 1, the internal register address is generated through funnel 64A from level register 86 to RAL 60A.

C. CONTROL SIGNALS AND TIMING

| Control Signals | Timing | Function |
|---|---|---|
| LIRD | T7 | IR bus loaded into IRD 53 |
| Gate Funnel 54B | T7+ | Connect IR 3-7 to ARH |
| LARH | T2 | ARH loaded from funnel 54 |

-continued

| Control Signals | Timing | Function |
|---|---|---|
| If bit 11=0 | | |
| Gate External Funnel | T0 | Load Reg. from M bus |
| Gate Funnel 77B | T7+ | Connect M bus to ALU A |
| LALUR | T1 | ALU Reg. loaded from ALU 70 |
| Gate Funnel 72A | T7+ | Connect ALU Reg. to driver 111 |
| Gate Driver 111 | T7+ | Connect funnel 72 to ALU out bus 73 |
| Gate Funnel 55A | T7+ | Connect ALU out bus 73 to ARL |
| LARL | T2 | ARL loaded from funnel 55 |
| If bit 11=1 | | |
| Gate Funnel 64A | T7+ | Connect IR 12-15 to RAH |
| Gate Funnel 65A | T7+ | Connect level Reg. to RAL |
| Read RAM | T0 | Read out addressed Reg. |
| Gate Funnel 77C | T7+ | Connect 63 to ALU A |
| LALUR | T1 | ALU Reg. loaded from ALU 70 |
| Gate Funnel 72A | T7+ | Connect ALU Reg. to driver 111 |
| Gate Driver 111 | T7+ | Connect funnel 72 to ALU out bus 73 |
| Gate Funnel 55A | T1 | Connect ALU out bus 73 to ARL |
| LARL | T2 | ARL loaded from funnel 55 |

D. NEXT ADDRESS

The address register-program counter interaction is inhibited during this instruction so that the program counter can hold the address of the next instruction to be executed after the execute cycle is finished. This provides an automatic link back to the instruction following the original Execute instruction. Consecutive Execute instructions are legal and will operate. However, a conditional Branch instruction which is successful, or any successful branch, will destroy the function of the auto link operation.

E. STATUS REGISTER CHANGE

No change.

10. EXECUTE INDIRECT (EID)

A. INSTRUCTION FORMAT

| Bits 0-2 | op code |
|---|---|
| Bits 3-7 | page address |
| Bits 8-10 | op code modifier |
| Bits 11-15 | register address |

B. FUNCTIONAL DESCRIPTION

The function of the EID instruction is the same as the Execute Immediate instruction. The difference is that the low order address of 8 bits is obtained by adding the value in the register specified by bits 11-15 to the contents of the auxiliary register. This permits generating a variable displacement number.

The data path and the controls for loading ARH are the same as described in connection with the EXI instruction.

The data path and controls for generating the ARL input are different up to the point that the ALU register 71 is loaded. From that point on, they are identical to the EXI instruction. Initially, the instruction sets the ALU to an ADD function mode. The data path from the auxiliary register to the input 75 of the ALU involves Gates 79A and 78B. The data paths to the ALU input 74 depends on whether bit 11 is a 1 or 0. If bit 11 is a 1, the data source is an internal register and the path involves the RAM output Bus 63 and funnel 77C to the ALU register input 71. If bit 11 is a 0, the data source is an external register and the path includes the M Bus 15 and funnel 77B.

C. CONTROL SIGNALS AND TIMING

| Control Signals | Timing | Function |
|---|---|---|
| LIRD | T7 | IR bus loaded into IRD 53 |
| Gate Auxiliary Reg. | T0 | Connect aux. reg. to funnel 79A |
| Gate Funnel 79A | T7+ | Connect AUX Reg. to ALU B bus 82 |
| Gate Funnel 78B | T7+ | Connect 82 to ALU B |
| LALUR | T1 | ALU Reg. loaded from ALU 70 |
| If bit 11=1 | | |
| Gate Funnel 64A | T7+ | Connect IR 12-15 to RAH |
| Gate Funnel 65A | T7+ | Connect Level Reg. to RAL |
| Read RAM | T0 | Read out addressed Reg. |
| Gate Funnel 77C | T7+ | Connect 63 to ALU A |
| If bit 11=0 | | |
| Gate External Funnel | T0 | Connect funnel to M bus |
| Gate Funnel 77B | T7+ | Connect M bus to ALU A |
| LALUR | T1 | ALU Reg. loaded from ALU 70 |

The internal page address and external register address are generated as described for the EXI instruction.

D. NEXT ADDRESS

Non-branch type of instruction. The next sequential address is generated by program counter and transferred to address register.

E. STATUS REGISTER CHANGE

No change.

11. FETCH INDIRECT AND INCREMENT (FID)

A. INSTRUCTION FORMAT

| Bits 0-2 | op code |
|---|---|
| Bit 3, 5-10 | fetch op code modifier |
| Bit 4 | increment control |
| Bits 11-15 | register address destination |

B. FUNCTIONAL DESCRIPTION

The function of the Fetch Indirect and Increment instruction is to transfer a byte of data from a RAM storage location defined by the contents of the auxiliary register to either an internal or external register whose address is defined by IR bits 11-15 and then selectively increment the value of the auxiliary register by 1. The increment can be inhibited by making bit 4 a 1.

The data path from the internal register defined by the auxiliary register is from the RAM output bus 63, funnel 77C to the ALU register 71. If bit 11 is a 1, the destination register is internal so that the data path continues from ALU register 71 through funnel 72A, driver 111, and ALU output bus 73 to the input of RAM 38. If the destination has been specified as internal register 0, the auxiliary register is not updated with the contents of the ALU register 71. If bit 11 is a 0, the destination register is external and the data path extends from the ALU register 71 through driver 110, M bus 15 to the selected external register. The above operation is completed at T4 time. The value of the auxiliary register 66 is supplied to ALU 70 through funnel 79A, ALU B bus 82 and funnel 78B. If bit 4 is a 0, the ALU adds 1 to this value and stores the result in ALU register 71 at T5 time. The updated value is then transferred to register 00 of the RAM at the correct level and to the auxiliary register 66 at T6 time. The path from the ALU register 71 extends through funnel 72A, driver 111 and the ALU out bus 73.

The initial RAM address defined by the contents of the auxiliary register 66 is established through funnels 64D and 65D which are connected to the output of the auxiliary register 66. The address of the external destination register is established by decoder 26 and is conventional, as previously described. The address of the internal destination register is generated through funnels 64A and 65A. Funnel 64A is supplied with IR bits 12-15 while funnel 65A is supplied with the current level from level register 87.

The auxiliary register address 00 is generated for RAL by not selecting any of the funnels 64, while the current level is gated through funnel 65A from the level register 87.

C. CONTROL SIGNALS AND TIMING

| Control Signals | Timing | Function |
| --- | --- | --- |
| LIRD | T7 | IR bus loaded into IRD 53 |
| Gate Funnel 77C | T7+ | Connect 63 to ALU A |
| Gate Funnel 64D | T7+ | Connect AUX Reg. 4-7 to RAH |
| Gate Funnel 65D | T7+ | Connect AUX Reg. 0-4 to RAL |
| Read RAM | T0 | Read out addressd Reg. |
| LALUR | T1 | ALU Reg. loaded from ALU 70 |
| If bit 11=1 | | |
| Gate Funnel 72A | T7+ | Connect ALU Reg. to driver 111 |
| Gate Driver 111 | T7+ | Connect funnel 72 to ALU out bus 73 |
| Gate Funnel 64A | T7+ | Connect IR 12-15 to RAH |
| Gate Funnel 65A | T1 | Connect level Reg. to RAL |
| Write RAM | T4 | Write into addressed Reg. |
| If bit 11=0 | | |
| Gate Driver 110 | T7+ | Connect ALU Reg. to M bus |
| Load External Register | T4 | Register loaded from M bus |
| Gate Funnel 79A | T7+ | Connect AUX Reg. to ALU B bus 82 |
| Gate Funnel 78B | T7+ | Connect 82 to ALU B |
| LALUR | T5 | ALU Reg. loaded from ALU 70 |
| Gate Funnel 72A | T5 | Connect ALU Reg. to driver 111 |
| Gate Driver 111 | T5 | Connect funnel 72 to ALU out bus 73 |
| Gate Funnel 65A | T5 | Connect level Reg. to RAL |
| Write RAM | T6 | Write into addressed Reg. |
| LAUX | T6 | Load auxiliary register 66 |

D. NEXT ADDRESS

Non-branch type of instruction. The next sequential address is generated by program counter and transferred to address register.

E. STATUS REGISTER CHANGE

No change.

12. STORE INDIRECT AND INCREMENT (SID)

A. INSTRUCTION FORMAT

| Bits 0-2 | op code |
| --- | --- |
| Bit 3 | store = 1 |
| Bit 4 | 1 = increment |
| Bits 5-10 | op code |
| Bits 11-15 | register address, source |

B. FUNCTIONAL DESCRIPTION

The function of the Store Indirect and Increment instruction is to transfer a byte of data from either an internal or external register whose address is defined by IR bits 11-15 to an internal register whose address is defined by the contents of the auxiliary register 66, and then selectively increment the contents of the auxiliary register by 1. The increment can be inhibited by making bit 4 a 1.

The data path from an external funnel to the ALU register 71 is through M bus 15 and funnel 77B. This path is used where bit 11 of the instruction is 0. Where bit 11 of the instruction is a 1, the path from the internal register is from RAM 38 through funnel 77C. The ALU register 71 is loaded at T1 time. The internal register is addressed through funnels 64A and 65A.

After the ALU register 71 is loaded, the RAH and RAL addresses are set with the value of the auxiliary register through funnels 65D and 64D. Data is gated from ALU register 71 through funnel 72A, driver 111 to the input of RAM where it is written at T4 time. During the SID instruction, the auxiliary register 66 is not updated at T4 time since it is the address source for RAM.

The incrementing of the auxiliary register is achieved as described in connection with the FID instruction.

C. CONTROL SIGNALS AND TIMING

| Control Signals | Timing | Function |
| --- | --- | --- |
| LIRD | T7 | IR bus loaded into IRD 53 |
| If bit 11=0 | | |
| Gate External Funnel | T0 | Connect funnel to M bus |
| Gate Funnel 77B | T7+ | Connect M bus to ALU A |
| If bit 11=1 | | |
| Gate Funnel 77C | T7+ | Connect 63 to ALU A |
| Gate Funnel 64A | T7+ | Connect IR 12-15 to RAH |
| Gate Funnel 65A | T7+ | Connect level Reg. to RAL |
| Read RAM | T0 | Read out addressed Reg. |
| LALUR | T1 | ALU Reg. loaded from ALU 70 |
| Gate Funnel 64D | T2 | Connect AUX Reg. 4-7 |
| Gate Funnel 65D | T2 | Connect AUX Reg. 0-4 to RAL |
| Gate Funnel 72A | T2 | Connect ALU Reg. to driver 111 |
| Gate Driver 111 | T2 | Connect funnel 72 to ALU out bus 73 |
| Write RAM | T4 | Write into addressed Reg. |

D. NEXT ADDRESS

Non-branch type of instruction. The next sequential address is generated by program counter and transferred to address register.

E. STATUS REGISTER CHANGE

CC1 set at T2

13. SET MASK (STM)

A. INSTRUCTION FORMAT

| Bits 0-2 | op code |
| --- | --- |
| Bits 3-10 | op code modifier |
| Bit 11 | internal/external |
| Bits 12-15 | source |

B. FUNCTIONAL DESCRIPTION

The function of the STM instruction is to store an 8 bit byte of data in the mask register. Bit 11 of the instruction determines if the data comes from either an external funnel or an internal register.

If bit 11 is a 1, an internal register is involved and the data path extends from RAM 38, RAM Data Bus 63, funnel 77C, ALU 70 to the ALU Reg 71. From the ALU Reg 71, the path proceeds through funnel 72A, Gated Drivers 111, ALU output Bus 73 to the mask register.

If bit 11 is a 0, an external funnel is involved and the data path extends from the external funnel through the M Bus 15, funnel 77B, ALU 70 to ALU Reg 71. The path to the mask register from the ALU Reg 71 is identical to the bit 11=1 path described above.

C. CONTROL SIGNALS AND TIMING

| Control Signals | Timing | Function |
| --- | --- | --- |
| Gate Funnel 64A | T7+ | Connect IR 12-15 to RAH |
| Gate Funnel 65A | T7+ | Connect level Reg. to RAL |
| Read RAM | T0 | Read out addressed Reg. |
| Gate Funnel 77C | T7+ | connect 63 to ALU A |
| LALUR | T1 | ALU Reg. loaded from ALU 70 |
| Gate Funnel 72A | T1 | Connect ALU Reg. to driver 111 |
| Gate Driver 111 | T1 | Connect funnel 72 to ALU out bus 73 |
| LMR | T2 | Mask Reg. loaded from ALU out bus 73 |

If the data source is an external funnel, the following control signals are generated:

| Control Signals | Timing | Function |
| --- | --- | --- |
| Gate External Funnel | T0 | Connect funnel to M bus |
| Gate Funnel 77B | T7+ | Connect M bus to ALU A |
| LALUR | T1 | ALU Reg. loaded from ALU 70 |

From this point on, the data path is similar to the situation where the data source is an internal register.

The selected funnel is addressed from external register and funnel decoder 26. The internal register is addressed through funnel 64A connected to RAL 60A and the level register. Bits 12-15 of the instruction are gated through funnel 65A for the address register high. The Set Mask instruction also rearms the interrupt logic.

D. NEXT ADDRESS

Non-branch type of instruction. The next sequential address is generated by program counter and transferred to address register.

E. STATUS REGISTER CHANGE

No change.

14. RESTORE ADDRESS REGISTER (RAR)

A. INSTRUCTION FORMAT

| Bits 0-2 | op code |
| --- | --- |
| Bits 3-10 | op code modifier |
| Bits 11-13 | unused |
| Bits 14-15 | register pair |

B. FUNCTIONAL DESCRIPTION

The function of this instruction is to return to a point in the original program where an instruction involving a link operation occurred. The instruction operates to transfer two bytes of data representing PCH and PCL from RAM directly to ARH and ARL. The two bytes of data are stored in the program stack portion of RAM at the current level defined by level register 87.

The data path to ARH is from the local store through funnel 54A and to ARL through funnel 55B.

The program stack is addressed from level register 87 through funnel 65A and from interrupt counter 89B through funnel 64E.

C. CONTROL SIGNALS AND TIMING

| Control Signals | Timing | Function |
| --- | --- | --- |
| LIRD | T7 | IR bus loaded into IRD 53 |
| Gate Funnel 65A | T7+ | Connect level Reg. to RAL |
| Gate Funnel 64E | T7+ | Connect RAL Ctr. to RAH |
| Gate Funnel 54A | T7+ | Connect RAM out bus 63 to ARH |
| Read RAM | T0 | Read out Addressed Reg. |
| LARH | T0 | ARH loaded from funnel 54 |
| Gate Funnel 55B | T1 | Connect RAM out bus 63 to ARH |
| Read RAM | T1 | Read out addressed Reg. |
| LARL | T1 | ARL loaded from funnel 55 |

D. NEXT ADDRESS

Unconditional branch type of instruction. The next address is generated by executing the instruction.

E. STATUS REGISTER CHANGE

No change.

15. SET MACHINE LEVEL (SML)

A. INSTRUCTION FORMAT

| Bits 0-2 | op code |
| --- | --- |
| Bits 3-10 | op code modifier |
| Bits 11-13 | level |
| Bits 14-15 | register pair |

B. FUNCTIONAL DESCRIPTION

The function of the SML instruction is to switch the microprocessor operation from its current level to another level and restore machine status. Since the operating state of the microprocessor at any level is defined by the contents of the program counter, the status register, the mask register and the auxiliary register, the SML instruction causes this data which has been previously stored in the program stack to be returned to the appropriate registers.

The RAM address high is obtained from IR decoder lines 11, 12 and 13 through funnel 64C, the high order bit being forced to a one. The RAM address low is obtained from the program stack counter through funnel 65E. The RAM controls are set for read and five successive memory clock cycles are taken, starting at T0. The stack counter is incremented after each memory cycle to address the next byte to be transferred.

Register 0 of the program stack for the level specified by bits 11–13 contains the value of the program counter high and is transferred directly to ARH 51B through funnel 54A. Register 1 contains the value of the program counter low and is transferred to ARL 50A through funnel 55B. Register 6 contains the value of the status register which is transferred from the RAM output bus 63 through funnel 72B drivers 111, ALU output bus 73, funnel 106B to status register 100. Register 7 of the program stack contains the value of the mask register. The path to the mask register is the same as to the status register except for funnel 106B. The fifth and last byte of data read from RAM 38 is taken from location 00 of the data buffer at the same level and transferred to the auxiliary register 66 through funnel 72B, driver 111 and ALU output bus 63. The timings of the five successive transfers are shown in the time chart of FIG. 5.

C. CONTROL SIGNALS AND TIMING

| Control Signals | Timing | Function |
| --- | --- | --- |
| LIRD | T7 | IR bus loaded into IRD 53 |
| Gate Funnel 64C | T7+ | Connect IR 9, 13–15 to RAH |
| Gate Funnel 65E | T7+ | Connect stack counter to RAL |
| Read RAM Register 0 | T0 | Read out addressed reg. |
| Gate Funnel 54A | T0 | Connect RAM out bus 63 to ARH |
| Load ARH | T1 | ARH loaded from bus 63 |
| Increment stack counter | T1 | RAL address |
| Read RAM Reg. 1 | T1 | Read out addressed reg. |
| Gate Funnel 55B | T1 | Connect RAM out bus 63 to ARL |
| Load ARL | T2 | ARL loaded from 55B |
| Increment Stack Ctr. | T3 | RAL address |
| Read RAM Reg. 6 | T3 | Read out addressed reg. |
| Gate Funnel 72B | T3 | Connect 63 to driver 111 |
| Gate Driver 111 | T3 | Connect funnel 72 to ALU out bus 73 |
| Gate Funnel 106B | T3 | Connect bus 73 to SR |
| LSR | T3 | Status Reg. loaded from funnel 106 |
| Increment Stack Ctr. | T4 | RAL address |
| Read RAM Reg. 7 | T4 | Read out addressed reg. |
| Gate Funnel 72B | T4 | Connect 63 to driver 111 |
| Gate Driver 111 | T4 | Connect funnel 72 to ALU out bus 73 |
| LMR | T5 | Mask Reg. loaded from ALU out bus 73 |
| Set RAL to 0 | T6 | Funnels 64 & 65 closed |
| Read RAM 00 | T6 | Read out addressed reg. |
| Gate Funnel 72B | T6 | Connect 63 to driver 111 |
| Gate Driver 111 | T6 | Connect funnel 72 to ALU out bus 73 |
| LAUR | T7 | AUX Reg. loaded from ALU out bus 73 |

D. NEXT ADDRESS

Unconditional branch type of instruction. The next address is generated by executing the instruction.

E. STATUS REGISTER CHANGE

No change.

16. BRANCH ON REGISTER (BOR)

A. INSTRUCTION FORMAT

| | |
| --- | --- |
| Bits 0–2 | op code |
| Bits 3–7 | page address |
| Bits 8–10 | op code modifier |
| Bit 11 | internal/external address |
| Bits 12–15 | register address |

B. FUNCTIONAL DESCRIPTION

The function of the BOR instruction is to unconditionally branch to an instruction whose page address is defined by bits 3–7 of the instruction and whose low order address is defined by the contents of the internal or external register whose address is specified by bits 12–15.

Lines 3–7 of the instruction decoder 53 are connected to ARH 50B through funnel 54B. The path to ARL 50A is from an external register if IR 11 is a 0 and an internal register if IR 11 is a 1. The path from the external register is through the M bus funnel 77B, ALU register 71, funnel 72A, driver 111, ALU output bus 73 and funnel 55A. The path from the internal register is through the RAM output bus 63, funnel 77C, and ALU register 71. From ALU register 71 the path is the same as for the external register.

The external register address is obtained by supplying bits 12–15 to the external register address decoder 26, as previously described. The internal register address is obtained by supplying bits 12–15 to RAL through funnel 65A, as previously described. No condition codes are changed.

C. CONTROL SIGNALS AND TIMING

The control signals and the various operations for the Branch On Register instruction are identical to those shown for the Execute Immediate instruction. The only difference is that there is no auto link function because the address register is transferred to the program counter at T6 so that it is not possible to return to the original program at the point where the Branch On Register instruction is located.

D. NEXT ADDRESS

Unconditional branch type of instruction. The next address is generated by executing the instruction.

E. STATUS REGISTER CHANGE

No change.

17. BRANCH ON REGISTER INDIRECT (BORI)

A. INSTRUCTION FORMAT

| | |
| --- | --- |
| Bits 0–2 | op code |
| Bits 3–7 | page address |
| Bits 8–10 | op code modifier |
| Bits 11–15 | register address |

B. FUNCTIONAL DESCRIPTION

The function of this instruction is similar to the Execute Indirect instruction (EID). The BORI instruction is an unconditional branch instruction to an address made up from bits 3–7 which define the address register high and a low order address made up by adding the contents of the auxiliary register to the contents of the register whose address is specified by bits 11–15. The BORI instruction differs from the EID instruction in that there is no automatic link back to the next sequential instruction.

Lines 3–7 from the instruction decoder 53 are connected to ARH 50B through funnel 54A. The address register low is supplied with an 8 bit byte from ALU register 71 through funnel 72A, driver 111, ALU output bus 73 and funnel 55A. The 8 bit byte in ALU register 71 is obtained by transferring the contents of auxiliary register 66 through funnel 79A and 78B to the B input 75 of the ALU. The A input of the ALU is supplied from either an external funnel or an internal register depending on the value of bit 11. If bit 11 is a 0, an external funnel is addressed. The A input is through M bus 15 and funnel 77B. If bit 11 is a 1, an internal register is addressed and data to the A input is from RAM output bus 63 and funnel 77C. In either case, the ALU is set to the add mode with the results being stored in ALU register 71 and then transferred to ARL as previously described.

C. CONTROL SIGNALS AND TIMING

| Control Signals | Timing | Function |
|---|---|---|
| LIRD | T7 | IR bus loaded into IRD 53 |
| Gate Funnel 54B | T7+ | Connect IR 3-7 to ARH |
| LARH | T2 | ARH loaded from funnel 54 |
| Gate Funnel 79A | T7+ | Connect AUX Reg. to ALU B bus 82 |
| Gate Funnel 78B If IR 11 = 0 | T7+ | Connect 82 to ALU B |
| Gate Funnel 77B | T7+ | Connect M bus to ALU A |
| Gate External Funnel If IR 11 = 1 | T0 | Load M bus from funnel |
| Gate Funnel 64A | T7+ | Connect IR 12-15 to RAH |
| Gate Funnel 65A | T7+ | Connect level Reg. to RAL |
| Read RAM | T0 | Read out addressed Reg. |
| Gate Funnel 77C | T7+ | Connect 63 to ALU A |
| LALUR | T1 | ALU Reg. loaded from ALU 70 |
| Gate Funnel 72A | T2 | Connect ALU Reg. to driver 111 |
| Gate Driver 111 | T2 | Connect funnel 72 to ALU out bus 73 |
| Gate Funnel 55A | T2 | Connect ALU out bus 73 to ARL |
| LARL | T2 | ARL loaded from funnel 55 |

The addressing of either the external funnel or the internal register specified by bits 11–15 is the same as previously described in connection with the similar function for the EID instruction.

D. NEXT ADDRESS

Unconditional branch type of instruction. The next address is generated by executing the instruction.

E. STATUS REGISTER CHANGE

No change.

18. BRANCH ON REGISTER AND LINK (BORL)

A. INSTRUCTION FORMAT

| Bits 0-2 | op code |
|---|---|
| Bits 3-7 | page address |
| Bits 8-10 | op code modifier |
| Bits 11-15 | register address |

B. FUNCTIONAL DESCRIPTION

The BORL instruction is similar to the Branch Register (BOR) instruction and to the Execute Immediate instruction. The instructions differ functionally in the handling of the program counter. For example, in the Execute Immediate instruction, an auto link was provided in that the program counter reflected the next sequential address in the program and was not changed during execution of the instruction. In the Branch On Register instruction, there was no automatic link and the program counter was merely updated to reflect the address of the instruction following the branch address. In the BORL instruction, the contents of the program counter are stored away.

The link function of the instruction involves transferring the contents of the program counter to the program stack portion of RAM 38. The path from PCH to RAM 38 is through funnel 56B, driver 112, and ALU bus 73 to the input of RAM. The path from PCL to RAM 38 is through funnel 56A, driver 112, and ALU bus 73.

The RAM address RAH and RAL are generated by funnels 65A and 64E. Funnel 65A is supplied from the level register 87 while funnel 64E is supplied from the stack counter.

If the stack pointer is a 0, PCH is stored into location 2 and PCL into location 3. If the stack pointer is a 1, the PCH and PCL are stored into locations 4 and 5. The stack pointer is toggled at the end of the instruction.

The link portion of the instruction begins at T2 after ARH and ARL have been loaded with the new address.

C. CONTROL SIGNALS AND TIMING

| Control Signals | Timing | Function |
|---|---|---|
| Gate Funnel 56B | T2 | Connect PCH to 112 |
| Gate Driver 112 | T2 | Connect funnel 56 to ALU out bus |
| Gate Funnel 64E | T2 | Connect RAL Ctr. to RAH |
| Gate Funnel 65A | T2 | Connect level Reg. to RAL |
| Write RAM | T3 | Write into addressed Reg. |
| Gate Funnel 56A | T4 | Connect PCL to 112 |
| Gate Driver 112 | T4 | Connect funnel 56 to ALU out bus |
| Gate Funnel 64E | T4 | Connect RAL Ctr. to RAH |
| Write RAM | T4 | Write into addressed Reg. |
| Increment Stack Pointer | T6 | Stack pointer toggled |

D. NEXT ADDRESS

Unconditional branch type of instruction. The next address is generated by executing the instruction.

E. STATUS REGISTER CHANGE

No change.

19. BRANCH AND LINK (BAL)

A. INSTRUCTION FORMAT

| Bits 0-2 | op code |
|---|---|
| Bits 3-15 | branch address |

B. FUNCTIONAL DESCRIPTION

The function of the BAL instruction is similar to the Branch Instruction (BR). The difference is that the link function stores the value of the program counter in RAM so that a return to the original program at the point following the BAL instruction is possible.

The link portion of the program involves transferring the contents of the program counter to the program stack area of RAM. The data path from the program counter to RAM involves funnel 56A, driver 112, and ALU output bus 63 for PCL and funnel 56B, driver 112, and ALU output bus 63 for PCH. The RAM address RAL and RAH are provided through funnel 64E and 65A, as previously described.

C. CONTROL SIGNALS AND TIMING

| Control Signals | Timing | Function |
|---|---|---|
| LIRD | T7 | IR bus loaded into IRD 53 |
| Gate Funnel 54B | T7+ | Connect IR 3-7 to ARH |
| LARH | T2 | ARH loaded from funnel 54 |
| Gate Funnel 79G | T7+ | Connect IR 8-15 to ALU B bus 82 |
| Gate Funnel 78B | T7+ | Connect 82 to ALU B |
| LALUR | T1 | ALU Reg. loaded from ALU 70 |
| Gate Funnel 72A | T1-T7 | Connect ALU Reg. to driver 111 |
| Gate Driver 111 | T0+ | Connect funnel 72 to ALU out bus 73 |
| Gate Funnel 55A | T7+ | Connect ALU out bus 73 to ARL |
| LARL | T2 | ARL loaded from funnel 55 |
| Gate Funnel 56B | T2 | Connect PCH to 112 |
| Gate Driver 112 | T2 | Connect funnel 56 to ALU out bus |
| Gate Funnel 64E | T2 | Connect RAL Ctr. to RAH |
| Gate Funnel 65A | T2 | Connect level Reg. to RAL |
| Write RAM | T3 | Write into addressed Reg. |
| Gate Funnel 56A | T4 | Connect PCL to 112 |
| Gate Driver 112 | T4 | Connect funnel 56 to ALU out bus |
| Gate Funnel 64E | T4 | Connect RAL Ctr. to RAH |
| Write RAM | T4 | Write into addressed Reg. |
| Increment Stack Pointer | T6 | Stack pointer toggled |

D. NEXT ADDRESS

Unconditional branch type of instruction. The next address is generated by executing the instruction.

E. STATUS REGISTER CHANGE

No change.

The operation of the microcontroller shown in FIGS. 2A, 2B and 2C will now be described by examining the various interrelationships of the three subsystems as shown in FIG. 3 during different phases of a machine cycle. These interrelationships are changed depending on the current instruction being executed.

Input Phase

The input phase of the first subsystem is sometimes used for generating all or a portion of the address for the next instruction when it is executing certain types of branch instructions.

The instruction fetch subsystem is sometimes used to generate a portion of the address of the branch instructions and the complete address for other instructions during a time period corresponding to the input phase of the first subsystem. The operation of the microcontroller during the input phase of both subsystems when the next partial addresses are being generated will first be explained with relation to FIGS. 9 and 10.

Figure 9:
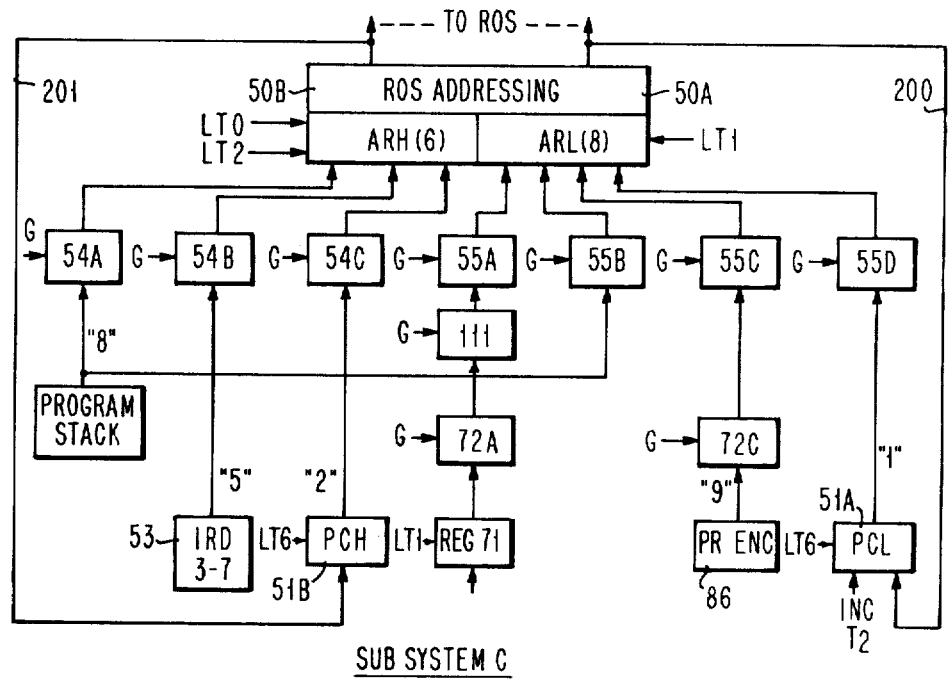
FIG. 9 illustrates the details of one of the subsystems during the input phase of the machine.
Figure 10:
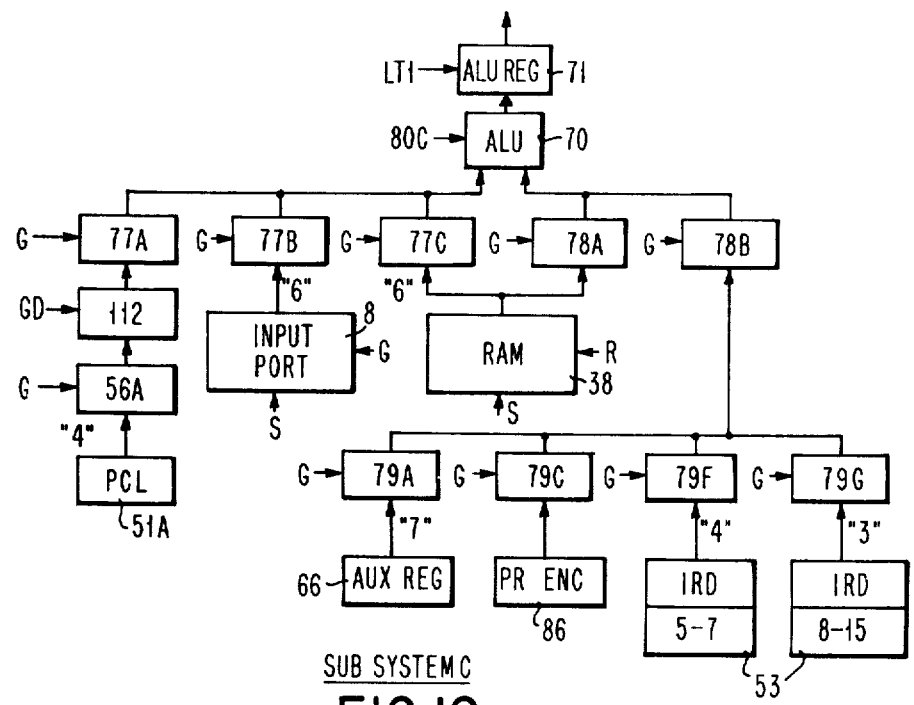
FIG. 10 illustrates the details of the other subsystem during the input phase of the machine.

FIG. 9 illustrates that portion of the microcontroller shown in FIGS. 2A and 2B that is included in subsystem C to generate the address of the next instruction during the input phase of the machine cycle. FIG. 10 illustrates that portion of subsystem B which is sometimes used during the input phase for address generation and includes the ALU register 71, the data sources for addresses which include the input port 8, the RAM 38, the auxiliary register 66, the priority encoder 86, and two separate sections from the instruction register decoder 53. The outputs of these latter four sources are available to the inputs of the funnel 79 and require no further control signals. The addressing of the input port and RAM was discussed in connection with the description of these units earlier. The following table illustrates the next partial address generators and the subsystems which are operating for each of the instructions which are executable by the microcontroller. The instructions are grouped into three types, non-branch instructions, conditional branch instructions, and unconditional branch instructions.

TABLE II

| INST | INST TYPE | ARH GEN | SUB-SYSTEM | ARL GEN | SUB-SYSTEM |
|---|---|---|---|---|---|
| FIM | NON BR | 2 | C | 1 | C |
| SIM | NON BR | 2 | C | 1 | C |
| RIM | NON BR | 2 | C | 1 | C |
| RR | NON BR | 2 | C | 1 | C |
| LRI | NON BR | 2 | C | 1 | C |
| FID | NON BR | 2 | C | 1 | C |
| SID | NON BR | 2 | C | 1 | C |
| STM | NON BR | 2 | C | 1 | C |
| BOB (F) | CON BR | 2 | C | 1 | C |
| BOC (F) | CON BR | 2 | C | 1 | C |
| BOC (T) | CON BR | 2 | C | 3 | B |
| BOB (T) | CON BR | 2 | C | 4 | B |
| BR | UNC BR | 5 | C | 3 | B |
| BAL | UNC BR | 5 | C | 3 | B |
| BOR | UNC BR | 5 | C | 6 | B |
| BORL | UNC BR | 5 | C | 6 | B |
| EXI | UNC BR | 5 | C | 6 | B |
| EXID | UNC BR | 5 | C | 7 | B |
| BORI | UNC BR | 5 | C | 7 | B |
| RAR | UNC BR | 8 | C | 8 | C |
| SML | UNC BR | 8 | C | 8 | C |

The generation of the next instruction address for the non-branch type of instruction will first be discussed in connection with FIG. 9 and is referred to as the next sequential address generator.

The Next Sequential Address Generator

The next sequential address generator operates in response to the non-branch instructions and the conditional branch instructions during the input phase of the machine. As shown in FIG. 9, the ROS addressing means comprises ARH 50B and ARL 50A, each with inputs from separate address generators. The next sequential partial address generator "1" includes PCL 51A, funnel 55D, the bus 200 connecting the output of ARL 50A to the input of PCL 51A, and the increment line to stage 0 of PCL 51A for incrementing the counter at T2 time. The connection (not shown) between PCL and PCH permits PCH to be incremented as the last stage of PCL cycles to provide the carry pulse as an incrementing signal to PCH.

The controls for the next sequential partial address generator comprises the gate 55D signal, the load program counter signal at T6, and the increment signal at T2. The ARL registers are actually latched by the trailing edge of the T2 timing pulse while stage 0 of PCL 51 is incremented at the beginning of T2. The output of the ARL 50A unit is loaded back into PCL 51A at a subsequent time which is shown as LT6.

The gate signals for the internal funnels were discussed in relation with FIG. 6, so will not be further described here. The gate funnel 55D signal is generated in response to decoding the op code portion of the instruction for non-branch type of instructions and conditional branch type of instructions where the branch is not taken.

The other portion of the next address for the non-branch instructions and the conditional branch instructions whether the branch is taken or not is generated by a second partial address generator "2" comprising PCH 51B, gate 54C and the bus 201 connecting the output of ARH 50B back to the input of PCH 51B. The control signals for the second partial address generator include the load program counter signal at LT6 and the gate funnel 54C signal.

Conditional branch instructions must also generate a complete branch address during the input phase. The partial address generator for the conditional branch type of instructions for generating the other portion of the branch address for the instruction will now be described. These addresses are generated by the first subsystem B which operates in parallel with the second subsystem during the input phase of the machine to provide the complete address for the next instruction.

With reference to FIG. 10, the third partial address generator "3" comprises the output bus labelled IRD 8-15 from IRD 52 to the input funnel 77G, funnel 77G, funnel 78B, the ALU 70 and the ALU register 71. The control signals for the third partial address generator include the gate funnel signals 77G and 78B, the LAUR signal at T1 and the ALU control signal 80C. The means for transferring partial addresses from subsystem B to subsystem C is gated driver 111 and funnels 55A and 72A and their separate control signals, gate driver 111, gate funnel 55A, and gate funnel 72A.

The third partial address generator "3" is used during a branch on condition instruction, the branch instruction and the branch and link instruction. The link portion of the branch and link instruction is explained later on in the specification.

The fourth partial address generator "4" is used during the branch on bit instruction and is selected when the branch is taken. The fourth generator, as shown in FIG. 10, comprises two address sources which are added together in the ALU 70 to form the partial address. The generator "4" includes the data flow paths between each source and the two inputs of the ALU, the ALU 70 and its control line 80C and the ALU register 71.

The first data path from the output of PCL includes gate 56A, gated driver 112, gate 77 and gate 77A. The second data path includes the IRD output labelled 5-7, gate 79F and gate 78B. The fourth partial address generator also includes the respective control signals to operate the two data flow paths. The generation of the partial addresses for the third type of instructions, the unconditional branch type, will now be described.

As shown in Table II, seven of the nine unconditional type of branch instructions employ the use of the same partial address generator indicated as partial address generator number "5". The generator, as shown in FIG. 9, comprises the IRD bus 3-7, funnel 54B, and the control signal for 54B. The other portion of the address for these instructions is generated by various other generators. As shown, partial address generator "3", FIG. 10 previously described, generates the other portion of the address for the branch and branch and link instruction. Since address generator "3" has been previously described, it is not repeated here. The link function is described later.

The remaining generators involve address sources located in RAM 38 or the input port 8, each of which require unique addresses to be selected. The system for addressing RAM and the external input port have been previously described, so will not be repeated in detail. The timing signals for transferring data from the input port to the ALU register is always at TO, regardless of whether the input port is supplying data involved in a portion of the next address or not.

As previously described, the input port and the output ports receive common address lines and one source and one destination from the ports are selected by the same address which is determined by a portion of the instruction being decoded.

With reference to FIG. 10, partial address generator "6" is involved in generating a portion of one of the next instruction addresses during the input phase of the machine cycle when it is executing one of the following instructions, execute immediate, branch on register, or branch on register and link. These instructions differ only in what occurs after the input phase in connection with the control of the two subsystems. The execute instruction inhibits the update of the program counter with the branch address at T6 to provide an automatic link back to the original status of the program counter which provides the next sequential instruction after executing the EXI instruction. The branch on register instruction permits the update of the program counter at T6 while the branch on register and link instruction stores away the contents of the program counter between the end of the input phase and the update at T6 time.

Partial address generator "6", therefore, comprises the input port 8, gate 77B, or RAM storage unit 38, gate 77C, the ALU and the ALU register 71, and the circuits for generating the address or select signal for the input port or RAM, and the various gating signals for the funnels.

Partial address generator "7", as shown in FIG. 10, is involved in generating a portion of the next instruction address during the input phase of the machine cycle when it is executing either an execute indirect instruction or a branch on register indirect instruction. The partial address is generated by adding the contents of the auxiliary register to either an internal or external register whose address is specified by a predetermined field of these two instructions.

Generator "7", therefore, comprises the auxiliary register 66, gate 79A, gate 78B, the control signals for these gates, and generator "6" and the control signals to selected generator "6" so that it operates concurrently with generator "7" to supply signals simultaneously to both inputs of the ALU during the input phase of the machine cycle. Generator "7" also includes control signals to inhibit the update of the program counter and the operation of the incrementing signal so as to provide the automatic link function of the execute indirect instruction.

Partial address generator "8", as shown in FIG. 9, is involved in transferring the address from the program stack which was placed in the stack as a result of executing some previous instruction which required the address to be saved, or as a result of the trap cycle. It is used for the input phase of an RAR or an SML instruction. Generator "8" comprises funnel 54A and 55B, the output bus from RAM connected to these funnels, the control signals for these funnels, and the circuitry for receiving an LARH signal at TO and a load LARL at T1 during the execution of these two instructions.

Partial address generator "9" is employed to generate the address for the next instruction when the trap request signal interrupts the operation of the microcontroller at the end of a machine cycle and causes the execution of the trap cycle. Trap address generator, as shown in FIG. 9, comprises the output of the priority encoder, funnel 77C, funnel 55C, and the various control signals for these units. Since all inputs to ARH and ARL from other address generators are off during the trap cycle, ARH is reset to an all zeros pattern by the LARH load signal at T2 and five stages of ARL, which do not receive inputs from the priority encoder pattern, are also reset to all zeros.

In summary, then, the two subsystems B and C of the microcontroller cooperate during the input phase of the controller whenever the type of current instruction being executed is a unconditional branch or conditional branch type instruction. The cooperation is either the actual generation of a new value or an address from the program stack or RAM when these units are used as address sources during the input phase.

During the following phase comprising a plurality of periods (T2 through T7), the second subsystem C transfers the addressed instruction to the instruction register decoder where it is loaded at the beginning of the last period (T7). It will be realized by those skilled in the art that the cost of the storage unit for storing the instructions is inversely proportionate to the length of the period T2-T7. Hence, the absolute machine cycle time can be reduced by using a faster and more expensive store for the instructions.

During the output phase of the machine, the next partial address generator 1 of the second subsystem is also updated during selected instructions at T6.

Lastly, on link type instructions where the address of the current instruction must be saved, the second subsystem C transfers the current address from the program counter to the first subsystem B where it is stored in the program stack. This requires the first subsystem B to address the appropriate stack register for storing the current address.

The operation of subsystem B will now be described in terms of the input phase and the output phase which comprise the execution cycle of non-branch type of instructions.

Figure 11:
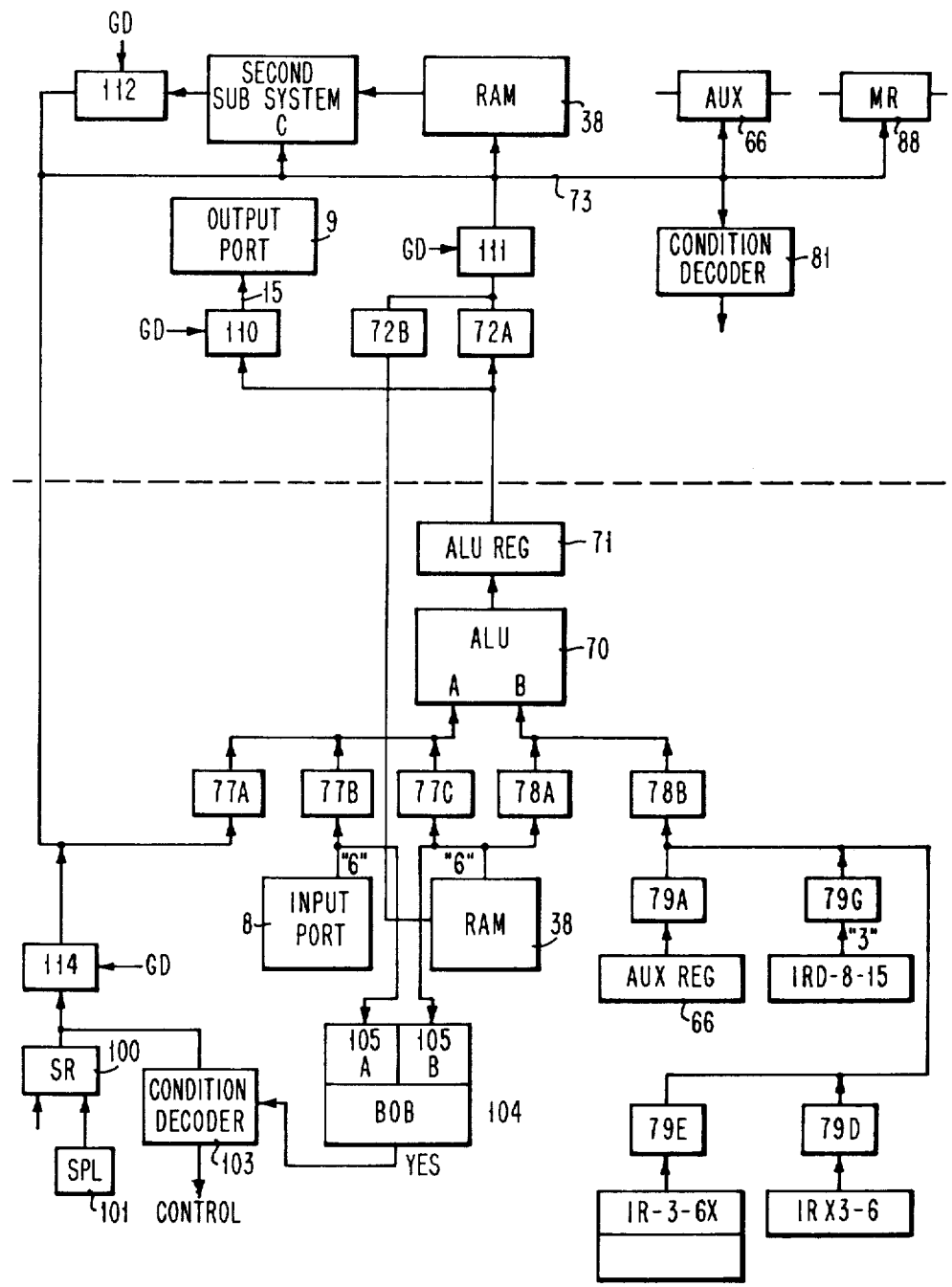
FIG. 11 illustrates the details of the machine during the output phase.

The portion of the microprocessor shown in FIGS. 2A and 2B, which is employed in the input and output phase of non-branch instructions is shown in FIG. 11. With reference to FIG. 11, the first subsystem during the output phase includes the input port 8, the output port 9, the ALU 70, the ALU register 71, the RAM 38 and its associated addressing circuitry 60, 64 and 65 and the read/write controls, the auxiliary register 66, the three separate bus connections from the instruction register decoder of the control system to funnel 79.

FIG. 11, below the dotted line, illustrates the first subsystem during the input phase where the contents of one or more sources are transferred through the ALU and loaded into the ALU register 71. It is similar to FIG. 9, in certain respects. During the output phase indicated above the dotted line, the data which was loaded into the ALU register during the input phase is transferred to one or more destinations.

Some of the units, like RAM 38 and the auxiliary register 66, serve both as sources and destinations of data and, hence, are shown once above the dotted line and once below the dotted line.

Other units like the input port and the three separate busses from IRD 52 serve only as sources, while still other units such as the output port and the mask register serve only as a destination. The second subsystem C is also a destination for the first subsystem B. Some of the source units such as the input port, RAM and the auxiliary register serve as either sources of data for generating address data for the second subsystem or sources of non-addressed data. Also, some of the units such as RAM, the input port and the output port include addressing circuitry which is responsive to a field of the instruction currently being executed.

In addition to the source and destination units, subsystem B includes two other units which are the decision units for conditional branch instructions, such as branch on bit and branch on condition, if these type of instructions are included in the repertoire of the microcontroller. The first unit is the branch on bit unit 104 connected to the input bus 15. The second unit is the condition decoder 81 connected to the ALU output bus 73.

The operation of subsystem B during the input phase of non-branch type of instructions will now be described. During the input phase, data from one source is transferred through the ALU unaltered to the ALU register 71 for certain instructions and for other instructions, data from one source and data from another source is transferred through the ALU, combined by some logical operation, and then the results placed in ALU register 71.

The following table defines the non-branch instructions where data from the source is merely transferred through the ALU to the ALU register 71.

TABLE III

| INST | SOURCE | GATES | DATA PATH |
|------|--------|-------|-----------|
| FIM  | RAM    | 77C   | 1 |
| SIM  | RAM    | 77C   | 1 |
|      | Input Port | 77B | 2 |
| RR   | RAM    | 77C   | 1 |
|      | Input Port | 77B | 2 |
| LRI  | IRD 8-15 | 79G | 3 |
| FID  | RAM    | 77C   | 1 |
| SID  | RAM    | 77C   | 1 |
|      | Input Port | 77B | 2 |
| STM  | RAM    | 77C   | 3 |
|      | Input Port | 77B | 2 |

An analysis of Table III, particularly the last column, indicates only three potential data paths from the sources to the ALU register 71. A further comparison with FIG. 9 shows that these same data paths are used for generating partial addresses during the input phase of certain of the branch type of instructions. For example, data path 3 is identical to the next addressed generator 3 shown in FIG. 7, and data paths 1 and 2 are similar to next addressed generator 6.

Table IV below defines the non-branch instructions where data from two sources is combined in the ALU and the result placed in ALU register 71 at T1 time.

TABLE IV

| INST | A SOURCE | A GATE | B SOURCE | B GATE |
|------|----------|--------|----------|--------|
| RIM  | RAM      | 77C    | IRD 3-6x | 79E-78B |
|      | Input Port | 77B  | IRD x3-6 | 79D-78B |
|      | RAM      | 77C    | IRD x3-6 | 79D-78B |
|      | Input Port | 77B  | IRD 3-6x | 79E-78B |
| RR   | RAM      | 78A    | Input Port | 77B |
|      | RAM      | 77C    | AUX      | 79A-78B |
|      | AUX      | 79A-78B | RAM     | 77C |

The individual paths from the RAM, input port and the auxiliary register are also used during the input phase of certain branch type of instructions as shown in FIG. 10. However, the data sources IR 3-6x and IR x3-6 are used exclusively for the register immediate instruction involving half byte ALU operations and are unique to those instructions.

The output phase of the machine for non-branch type of instructions will now be described with relation to FIG. 11, particularly that portion above the dotted line. The output phase of the subsystem of the machine begins at the end of T1 and functions to transfer the byte of data from the ALU register 71 to a selected destination connected to either the ALU output bus 73 or the bidirectional bus 15 by gated drivers 111 and 110, respectively. During the output phase, several other minor functions may occur involving interaction of the two subsystems, but these will be discussed separately. During the output phase of the subsystem B, subsystem C is reading out the addressed instruction from ROS for entry into the instruction register decoder 52 at T7 time.

As shown in FIG. 11, the output port 9 is the only destination which is connected to the ALU register 71 through gated driver 110 during the output phase. Data on bus 15 is loaded into the selected register by the load external register signal at T4 time provided gated driver 110 has been selected.

The other destinations are connected to the ALU output bus 13 which is driven selectively by gated drivers 111, 112 and 114, only one of which is gated at a time. The destinations connected to the ALU output bus and which can be loaded when gated driver 111 is selected include RAM 38, the auxiliary register 66, the mask register 88, and subsystem C. The mask register is loaded at T4 time during the execution of an STM instruction and at T5 time during execution of an SML instruction.

The auxiliary register 66 is loaded at T6 during the execution of an FID or SID instruction and at T7 during the execution of an SML instruction and at T4 during execution of the indirect instructions execute indirect or branch on register indirect.

The level register is loaded at T6 during the execution of an SML instruction directly from IRD 53 and at T6 of a trap cycle from the priority encoder.

RAM 38 may be written into at several different times during the output phase. However, transfer of data from the ALU register 71 occurs beginning at T2 during execution of most of the instructions.

The following table summarizes the data destinations for the non-branch type of instructions, the busses and the time of the load register signals or RAM write operations.

TABLE V

| SOURCE | BUS | DESTINATION | TIME | INST |
|---|---|---|---|---|
| ALU Reg 71 | Bus 73 | RAM 38 | T4 | FIM, SIM, RIM R to R, LRI, FID, SID |
| ALU Reg 71 | Bus 73 | MR 88 | T4 | STM |
| ALU Reg 71 | Bus 73 | Aux. 66 | T4 | FIM, SIM, RIM, R to R, LRI, FID, SID |
| ALU Reg 71 | M Bus 15 | Output port o | T4 | FIM, RIM, R to R, LRI, FID |

The link function, which occurs only during the output phase when the branch and link and branch on register and link instructions are being executed will now be described with reference to FIGS. 2A and 2B.

The function of the link operation, as previously described, is to transfer the contents of the program counter 51 during the period T2 through T6 when it reflects the address of the next instruction to a pair of link registers in the program stack at the current level. The stack pointer of status register 100 selects the pair of registers to be addressed by the two stage RAL counter. The transfer path is from PCH and PCL to the ALU output bus 73 through gated driver 112 and funnel 56. Gated driver 112 is turned on at T2 time of a link instruction. Gated driver 111 is turned off by the link decode at T2 time. Driver 112 is turned off at T7 time. Funnel 56A is turned on at T2 and turned off at T4. Funnel 56B is turned on at T4 time and off at T7 time during link type of instructions. PCH is read into the program stack during T3 time and PCL during T4 time. The RAL counter 89B is advanced one to select the second address of the register pair at T3+ time.

During the output phase of an SML instruction, the status register 100, mask register 88, and level register 87 must be updated since, during the input phase ARH and ARL were updated with the address of the next instruction. The operation involves five successive read operations from RAM which occur both in the input phase and the output phase. The five addresses are controlled by the setting and incrementing of the RAL counter. The first two read operations occur during the input phase and were completed at the end of T2. The succeeding three read operations begin at the end of T2 and involve loading the status register 100, the mask register 88 and the level register 87 from IRD 53. The ALU register 71 is not involved in this transfer. These three transfers during the output phase of the SML instruction are as shown in the timing chart of FIG. 5 and were discussed previously in connection with the operation of the SML instruction and the generation of the LSR, LMR and LAUX loading signals. The auxiliary register incrementing function for the FID and SID instructions during the output phase will now be described.

During the output phase of the execution of the FID and SID instructions, the auxiliary register is selectively incremented by transferring its contents through the ALU where one is added and then the results are returned to the auxiliary register and location 00 of memory with the new value.

The contents of the auxiliary register 66 are transferred to the ALU through funnel 79A, 78B and the ALU input bus and loaded into the ALU register 71 at T5 time. The auxiliary register is loaded from the ALU output bus at T6 time and RAM is updated from the ALU output bus beginning at T6 time. The control signal 80C determined by the value of bit 4 from IRD selects whether a 1 is added to the current value of the auxiliary register.

The last sub-function of the output phase to be described relates to the trap cycle. During the input phase of the trap cycle, the contents of the program counter were transferred to the program stack register pair 0 for the current level. During the output phase, the status register and mask register are transferred to the program stack. The trap cycle involves four consecutive write operations into memory which involves placing data on the ALU output bus by gating three separate drivers in the correct time sequence.

During the input phase, driver 112 is energized from T0 to the end of phase 1. Driver 114 is energized from the beginning of phase 2 to the beginning of T4 to transfer the status register to the program stack. Gated driver 111 is energized from T4 to the end of T7 to transfer the mask register to the program stack.

In summary, the output phase of the execution subsystem, when executing instructions, involves the primary function of transferring a byte of data from the ALU register 71 placed there during the input phase to a selected one of a plurality of destinations, one of these destinations being the second subsystem. The second subsystem is selected for certain branch type of instructions where, during the input phase of the first subsystem, potential partial addresses were transferred from a selected data source to the ALU register. Where the input phase of the first subsystem involves the transfer of non-address type data to the ALU register as during the execution of non-branch type of instructions, the data is stored in the selected destination register during T4 of the output phase and the remaining periods of the output phase are used for housekeeping functions such as incrementing the auxiliary register, inhibiting the program counter update for execute type of instructions, and updating the status register.

Trap To Interrupt Conversion

The manner in which a trap request signal can be converted to a full interrupt so that the program can be returned to the point of interruption caused by the trap request signal will now be described in connection with FIG. 12 and Tables VI and VII. As previously discussed, the trap hardware cycle performs three major functions. The first is to provide an address to ARL which is directly related to the priority level of the trap signal and also related to the machine level. The second function is to transfer the contents of four registers defining the machine address and status to the predetermined registers in the program stack, and the last function is to update the level register so that the machine operates at the new level.

If the trap system is to operate in the programmed return interrupt mode, several areas of RAM are initially set up to simplify the number of instructions employed in the return operation.

One area of memory, for example buffer address 00, is designated as the "level pointer register" LPR. In addition, register x"F" for each level is used to hold the address of the previous level. This register is referred to as the last level register LLR-N when N represents the current level. As previously described, the ROS address for the next instruction to be executed after the trap hardware cycle is also predefined so that the predefined addresses are at least four addresses apart, permitting the execution of three sequential instructions before a branch instruction must be executed. Table VI below shows the predefined ROS address and trap signals.

TABLE VI

| ROS ADDRESS | TRAP SIGNALS |
|---|---|
| 0 0 0 0 | 0 |
| 0 0 0 1 | 1 |
| 0 0 0 2 | 2 |
| 0 0 0 3 | |
| 0 0 0 4 | |
| 0 0 0 5 | |
| 0 0 0 6 | 3 |
| 0 0 0 7 | |
| 0 0 0 8 | |

TABLE VI-continued

| ROS ADDRESS | TRAP SIGNALS |
|---|---|
| 0 0 0 9 | |
| 0 0 0 A | 4 |
| 0 0 0 B | |
| 0 0 0 C | |
| 0 0 0 D | |
| 0 0 0 E | 5 |
| 0 0 0 F | |
| 0 0 0 0 | |
| 0 0 1 0 | |
| 0 0 1 1 | 6 |
| 0 0 1 2 | |
| 0 0 1 3 | |
| 0 0 1 4 | |
| 0 0 1 5 | 7 |

If a trap signal is to be converted to a full interrupt, the audit trail instruction must be executed prior to rearming the trap interrupt mechanism. The first instruction is a fetch immediate instruction which transfers the contents of the level pointer register (LPR) to register LLR at the new level. The second instruction is a load register immediate instruction which loads the auxiliary register with a hex value representing the new level. The last instruction is a store immediate instruction which transfers the auxiliary register back to the level pointer register (LPR) which now indicates the new current level. The fourth instruction is a branch instruction to the major subroutine for servicing that level of the trap request. It is, of course, possible to start the three instruction routine for the audit trail after executing quick trap instructions, provided the trap system is not rearmed by the STM instruction. The major subroutine for all levels except zero must end with a minor subroutine which allows a level change back to the last level. The major subroutine for level zero can end with a wait loop. The minor subroutine starts with a set mask instruction of x"00" which prevents any trap request signals from being honored. The next instruction is a FIM instruction which transfers register x"F" at the current level containing the previous level, to the level pointer register. A branch on register instruction is done involving register x"F" at the current level to generate an address for the SML table which selects an SML instruction for the level specified for register x"F". The SML table is shown below and indicates the ROS address and the instruction stored at that address.

TABLE VII

| ROS ADDRESS | INSTRUCTION |
|---|---|
| 0 F 0 0 | SML 0 R.P. 00 |
| 0 F 0 1 | SML 1 R.P. 00 |
| 0 F 0 2 | SML 2 R.P. 00 |
| 0 F 0 3 | SML 3 R.P. 00 |
| 0 F 0 4 | SML 4 R.P. 00 |
| 0 F 0 5 | SML 5 R.P. 00 |
| 0 F 0 6 | SML 6 R.P. 00 |
| 0 F 0 7 | SML 7 R.P. 00 |

The execution of the SML instruction returns the machine to the point at the new level where it was interrupted.

The above steps are repeated at the end of each major subroutine until level 0 is returned to and no trap requests are pending.

Figure 12:
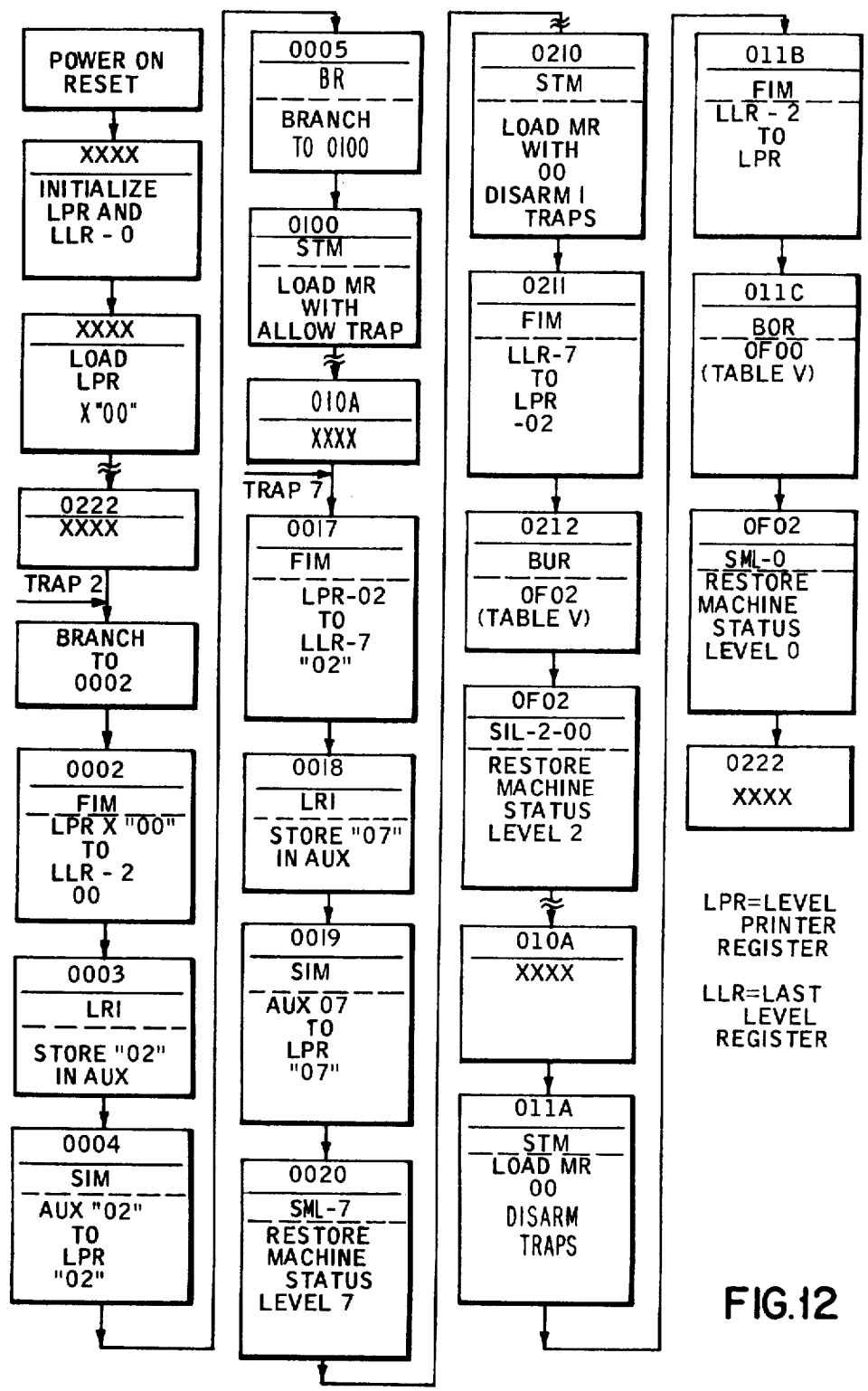
FIG. 12 is a flow chart illustrating an example of how the controller is returned to the point of interruption by use of selected instructions.

The flow chart of FIG. 12 is self-explanatory.

Data Transfer Control

The operation of the microcontroller to control the bidirectional transfer of data between the control unit 11 and the disk drives 12 will now be described. Three general types of operations occur: a select operation which connects the control unit to a specified controller and device, an immediate operation which transfers a single control instruction to the controller and a single byte of information to or from the controller, and an extended operation which starts a sequence of events in the controller that requires many transfers across the control and device interface.

Select Operation

Figure 13:
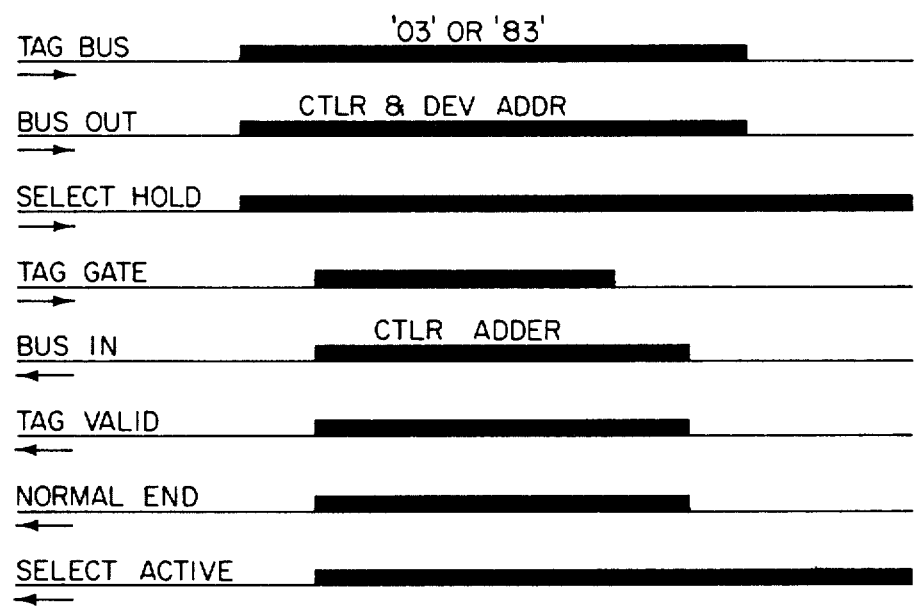
FIG. 13 is a chart illustrating the timings of interface lines for a select operation.

The select operation of the disk drives involves the control unit sending to the controller one byte of data on Bus Out containing the controller and device address, and on control Tag Bus the select tag "83". Select Hold and Tag Gate become active. When selection is complete, the controller responds with Tag Valid, Select Active and Normal End. When these signals are received, the control unit deactivates Tag Gate. Bus In returns the address of the selected controller. Select Active remains active until Select Hold falls. FIG. 13 is a chart which shows the above select operation.

With reference to FIGS. 1A and 1B, DCI Bus Out is connected to funnel 0, DCI Tag Bus is connected to funnel 1 with the high order tag bit 8 connected to the low order stage of funnel 1. DCI Select Hold is connected to funnel 2, stage 1 while DCI Tag Gate is connected to funnel 2, stage 0. DCI Tag Valid is connected to register 2, stage 1. DCI Bus In is connected to register 7, while Select Active and Normal End are connected to register 2, stages 0 and 2. Device Select Bus is connected to external register 9, Device Tag Bus to external register 11, stages 4-7, and Device Bus Out to register 0. Device Tag Gate is connected to external register 6, stage 0, while Device Select Hold is connected to register 6, stage 1. The Attention Select Bus is connected to funnel 10, Device Bus In is connected to funnel 7, and Device Tag Valid to funnel 12, stage 5.

The select operations begins with the control unit placing the address of the selected controller and drive on DCI Bus Out, a tag of "83" on DCI tag bus and issuing a DCI tag gate. Raising of the tag gate causes a trap 0 request signal which forces the trap cycle and causes the address register to address x03.

The instruction stored at address "003" is an R to R add instruction having a hex value 9061. The instruction transfers the contents of funnel 1 to internal register 0 which has previously been declared as the auxiliary register. The contents of the auxiliary register is stored as "13" not "83" because of the tag bus funnel 1 connection. During execution of this instruction, the program counter is advanced by 1 to "004" and loaded into the address register.

The instruction stored at address "004" is a BOR instruction having a hex code "C890". The function of this instruction is to generate the address of the next instruction by adding the contents of internal register 0 which is "13" to the page address which is "8", resulting in the new address of "813".

The instruction stored at address "813" is a BR instruction having a hex value of 026F. The Branch address is, therefore, 26F.

The instruction stored at address "026F" is a BOB instruction having a hex value "2262". The function of this instruction is to test the value of bit 3 of funnel 2 to see if it is a 1, and add an increment of 2 to the current address if the test is true. Bit 3 of funnel 2 results from a hardware comparison between a wired controller address and a controller address on DCI Bus Out. Bit 3 is a 0 if the compare is true. The current address "026F" is incremented by 2 so that the next address is "0271".

The instruction stored at address "0271" is a SIM instruction having a hex value 40A8. The function of this instruction is to store the value of funnel 0 (DCI Bus Out) at local storage address "28". The program counter is incremented by 1 so that the next address is "0272".

The instruction stored at "0272" is a BOB instruction having a hex value 2DAF. The function of this instruction is to test the value of bit 5 of funnel 15 which is an Error Alert signal. If bit 5 is a 1, there is no error, the test is true, and an increment of 5 is added to the current address to provide a new address of "0277".

The instruction stored at "0277" is an LRI instruction having a hex value B117. The function of this instruction is to load internal register 1 with a constant "17" to mask out the controller address bits on DCI Bus Out. Register 1 contains "17". The program counter is incremented so that the next address is "0278".

The instruction stored at "0278" is an R to R And instruction having a hex value 9100 involving funnel 0 and internal register 1. The result of the anding of "17" and "42" is "02" which is the assumed device address and is stored in internal register 1. The program counter is incremented so that the next address is "0279".

The instruction stored at "0279" is a BOR instruction having a hex value C991. This is an unconditional branch instruction to address page 09 specified by bits 4-8 of the instruction and the contents of internal register 1, which at this time is "02". The branch is to a table which converts the device address "02" to a bit significant address. The new address is "0902" and the program counter is incremented to 027A.

The instruction stored at address "0902" is an LRI instruction having a hex value B120. This instruction transfers a constant "20" to internal register 1. The program counter "027A" is transferred to the address register so that the next instruction is located at "027A" as a result of the auto link feature of the BOR instruction stored at "0279".

The instruction stored at "027A" is an R to R Move instruction with a hex value 89D1. This instruction transfers the contents of internal register 1 ("20") to external register 9. The program counter is incremented by 1 so that the next address is "027B".

The instruction stored at "027B" is an LRI instruction having a hex value A640. The function of this instruction is to load external register 6 with the constant "40". This turns on Device Select Hold. With Select Hold on and the device address "20" in external register 9, results in the selection of device 2. The program counter is incremented so that the next address is "027C".

The instruction stored at "027C" is an R to R Move instruction having a hex value 87CA. The function of this instruction is to transfer the data on the Device Selection Bus connected to external funnel 10 to external register 7 over the micro data bus in order to check if all 8 bits are 0 by means of the condition code logic. If all bits are 0, then no device responded and CC1 is set to a 1. If a device responded, CC1 is set to a 0. The program counter is advanced to address "027D".

The instruction stored at "027D" is a BOC instruction having a hex value "3490". If no device had been selected, the program would branch to an appropriate subroutine to handle the situation. However, since device 2 responded, the test is false and no branch is taken. The next instruction is, therefore, stored at "027E".

The instruction stored at "027E" is a Fetch Immediate instruction having a hex value 4730. The function of this instruction is to take the controller address which was stored in internal storage location "30" and place it in external register 7 which is connected tp DCI Bus In. The program counter is incremented by 1 so the next instruction is at "027F".

The instruction stored at "027F" is a Load Register Immediate instruction having a hex value A197. The function of this instruction is to load external register 1 with a constant "97". External register 1 is connected to DCI control lines which cause external register 7 to be gated to DCI Bus In, Enable DCI Tag Valid to be gated and Normal End to turn off when Tag Valid is turned off. The program counter is incremented to "0280".

The instruction stored at "0280" is a Load Register Immediate instruction having a hex value A2EO. The function of this instruction is to load external register 2 with the constant "EO". This turns on DCI Select Active, DCI Tag Valid and DCI Normal End. The program counter is advanced to "0281" for the next instruction.

The instruction stored at "0281" is a Load Register Immediate instruction having a hex value BF40. The function of this instruction is to load internal register 15 with a new sequence byte of 40. The constant "40" defining the new sequence byte is a constant which arbitrarily defines a reference point "Selected Status" in the microprogram. The program counter is incremented by 1 to "0282".

The instruction stored at address "0282" is an R to R Exclusive Or instruction having a hex value 914A. The function of this instruction is to Exclusive OR the output of funnel 10 which is supplied with the bit significant address of the selected drive with the contents of internal register 1 which contains the bit significant device address generated from DCI Bus Out by the instruction located at "902". Since both values should be equal, the result should be all 0's and CCI is set. The program counter is incremented to "0283".

The instruction stored at address "0283" is a Branch on Condition instruction having a hex value "34A1. The condition being tested in CCI. If CCI is off, a branch is taken to an appropriate subroutine because the previous instruction indicated an error by not turning CCI on. Since CCI is on, the test is true and no branch is taken. The next instruction is "0284".

The instruction stored at address "0284" is a BOB instruction having a hex value 2506. The function of this instruction is to check if bit 0 of funnel 6 is on. Bit 0 of funnel 6 is a line indicating a service test is being conducted. Bit 0 is, therefore, 0 so an increment of 5 is added to the current program counter value. The next address is, therefore, "0289".

The instruction stored at address "0289" is an LRI instruction. The function of this instruction is to rearm the trap system and drop Device Tag Gate. Program counter is incremented to 027C.

The instruction stored at "0289" is an R to R Move Instruction having a hex value 90DF. The function of this instruction is to transfer the contents of internal register 15 to internal register 0 or the auxiliary register.

Register 15 contains "40" so that the auxiliary register will be used for the Branch on Register instruction stored at address 003 which is addressed in response to the next trap. The program counter is advanced to "028A".

The instruction stored at "028A" is a Set Mask instruction having a hex value of C1A2. The function of this instruction is to transfer the constant of internal register 2 "FF" to the Mask register 88. The constant "FF" allows all traps and rearms the trap register 85. The program counter is advanced to "027B".

The instruction stored at "027B" is a Branch Instruction having a hex value 02B1. The next address is 02B1.

The instruction stored at 02B1 is a BOB instruction having a hex value 2046. The function of this instruction is to test bit 1 of funnel 6 for a 0 condition and add an increment of 0 if the test is true. Bit 1 of funnel 6 is a 1 only when a service test is being conducted. Therefore, the microcontroller waits at address 02B1 until a DCI Tag Gate causes a trap to force the microcontroller to address 003. This is effectively an idle loop for the microcontroller.

Transmit ID

The "Transmit ID" command is issued by the control unit to the controller prior to each read or write command. The Transmit ID command is an example of an extended type of operation in which five bytes of data are transferred from the control unit to the controller so that on the subsequent read or write operation the address of the record stored on the disk can be compared by the controller with the ID information stored as a result of the Transmit ID command prior to reading or writing the selected record.

The Transmit ID command in the preferred embodiment may also be employed to calibrate the signal propagation time in terms of bits and bytes for the cable connecting the control unit to the controller. This allows the first byte of data that is to be recorded on the subsequent write operation to be requested at an appropriate time to insure that it arrives at the controller at the correct time relative to when that segment of the record is passing under the magnetic transducer. This calibration technique prevents cables of different lengths in different installations from causing timing errors, and is disclosed in detail in copending application Ser. No. 921,150, filed June 30, 1978. It is assumed in the following discussion of the Transmit ID command that the Sync In lead times have been stored in local store address 35 and internal register 4.

The transfer of data between the control unit and the disk drives involves two major data paths. The prior discussions have been directed to just the parallel by bit data path through the microcontroller to the second device. The second data path is the serial read-write channel which extends from the control unit to the disk drive's recording circuits. The function of the channel is to convert a byte of data from the control unit to an encoded serial by bit input to the disk drive so that the recording circuits of the disk drive can record the serial by bit data along a track which has been selected by the parallel by bit data supplied to the drive through the output port of the microcontroller.

The serial read-write channel also operates in the read transfer mode to convert the encoded serial by bit data read from the file to parallel by bit data to be supplied to the control unit. Two major data paths can be operated independently under the control of the control unit or the disk drive controller can be used to control the connection of the serial channel to the common interface to the control unit during a read or write operation.

However, in these arrangements, data cannot be transferred between the controller and the serial channel which is desirable since the formatting of a data byte to be recorded can then be achieved under the direct control of the disk drive controller rather than the control unit or some special hardware system built into the disk drive controller or the control unit. A system for controlling a serial read-write channel to the disk drive employing the microcontroller of the present invention is described in copending application Ser. No. 921,146, filed June 30, 1978. In that system, data from the control unit can be sent selectively to either the microprocessor or to the serial channel and then to the microprocessor. Data in the microprocessor can also be sent directly to the output port or to the output port through the serial channel. The interface between the microcontroller and the serial read-write channel comprises the data register of the serial read-write channel and the input and output ports of the microcontroller.

During the Transmit ID operation to be described, the five data bytes are transferred to the internal registers of the microcontroller through the data register of the serial read-write channel and funnel 3.

The serial read-write channel is used as an entry into the microprocessor when a block of data is being sent to the microcontroller. As will be seen when the Transmit ID tag is decoded, it selects the connection to the data register for the DCI Out Bus and causes the block of data to be sent under the control of the Sync In-Sync Out pulse synchronizing system.

The operation of the microcontroller during a Transmit ID operation begins at the point where the Transmit ID tag has been decoded and the Tag Valid signal is being returned to the control unit. The first instruction stored at address "0489" is a Load Register Immediate instruction (LRI) having a hex value A240. The function of the instruction is to load external register 2 with the constant "40". This presents Tag Valid to the control unit. The program counter is incremented by one to address "0499".

The instruction stored at address "0499" is a Fetch Immediate instruction (FIM) with a hex value of 5135. The function of this instruction is to transfer the contents of local storage address 35 to register 1. Local store address 35 contains the Sync In lead time previously referred to which was stored there during an earlier operation. The program counter is advanced to "049A".

The instruction stored at "049A" is a Branch on Bit instruction (BOB) having a hex value of 233D. The function of this instruction is to test a bit in internal register 13, which was stored previously. This bit indicates a previous error condition. The program counter is advanced to "049D" since it is assumed the bit is off and the branch to "049D" is taken.

The instruction stored at "049D" is an LRI instruction having a hex value of AFF0. The function of this instruction is to control the ECC hardware. The program counter is advanced to "049E".

The instruction stored at "049E" is an LRI instruction having a hex value of A402. The function of this instruction is related to the control of the Sync In signal. The program counter is advanced to "049F".

The instruction stored at "049F" is an R to R Move instruction having a hex value of 8FD1. The function of this instruction is to issue the Sync In signal to the control unit. This instruction is providing the function performed by register 22 in FIG. 2 of copening application Ser. No. 921,150, referred to earlier. The program counter is advanced to "04A1".

The instruction stored at "04A1" is a LRI instruction having a hex value of A380. The function of this instruction is to load external register 3 with a constant "80" which controls the ECC addressing hardware. The program counter is advanced to "04A2".

The instruction stored at "04A2" is an LRI instruction having a hex value of A343. The function of this instruction is to load external register 3 with the constant "43". The output of register 3 allows the data buffer to be gated to the data register, sets up the Sync Out timing error logic in anticipation of receiving a Sync Out signal from the control unit, and enables the ECC hardware. The program counter is advanced to the next address "04A3".

The instruction stored at "04A3" is an LRI instruction having a hex value A808. The instruction transfers a constant "08" to external register 8. This loads a counter to control the data transfer by turning off the Sync In generation circuits after the correct number of Sync In signals have been issued on a Transmit ID tag. This will be either five or six Sync Ins, depending on the bit time of the cycle that the Sync In is issued. If the Sync In is issued at either 0, 1, 2 or 3 bit times, an end data control signal will be issued after six Sync In signals because the Sync In signal cannot be issued during the same instruction cycle as the instruction cycle which turns on the Sync In generating hardware. In this case, the counter is increased by one. If Sync In is issued at bit times 5–7, the first Sync In can be generated during the same instruction cycle as the instruction cycle that turned on the Sync In generator, so the counter remains at 8. The program counter is advanced to "04A4".

The instruction stored at "04A4" is a BOB instruction having a hex value 2251. The function of this instruction is to test the value of bit 2 in internal register 1 for a zero condition. Internal register 1 contains the Sync In lead time and a 0 indicates a Sync In lead time of less than four bit times. It is assumed that bit 2 is a 0 so the branch is not taken and the program counter is advanced to address "04A5" for the next instruction.

The instruction stored at "04A5" is an LRI instruction having a hex value A809. The function of this instruction is to transfer the constant "09" to external funnel 8 which sets up a counter to activate an end data control signal after 9 counts. The program counter is advanced to "A406".

The instruction stored at "A406" is a BOB instruction having a hex value 2082. This instruction tests bit 4 of external funnel 2 (DCI Tag Valid) for a zero condition. The instruction is repeated until a zero condition is detected. That is, the microprocessor waits at this point until DCI Tag Valid drops. On the following cycle, the program counter is advanced to the next instruction, "A407".

The instruction stored at "A407" is an LRI instruction having a hex value A6C0. The instruction stores the constant "C0" into external register 6, which raises "Device Select Hold" and "Device Tag Gate". The program counter is advanced to "A408".

The instruction stored at "A408" is an LRI instruction having a hex value A820. This instruction loads external register 8 with a constant "20". This causes the counter to be loaded with a count of 9 which was supplied to funnel 8 by the instruction stored at "04A5". It also enables the end data control logic and the counter carry trap. The program counter is advanced to "04A9".

The instruction stored at "04A9" is a BOB instruction having a hex value 2CD4. The function of this instruction is to test bit 3 of internal register 4 for a one condition. Internal register 4 contains the Sync In lead times in terms of byte times. If the Sync In lead time is two bytes, which is assumed in the present example, the program counter is incremented by four to address "04AD".

The instruction stored at "04AD" is a BOC instruction having a hex value 3800. This instruction results in no operation and is used for timing purposes. The program counter is advanced to "04AE".

The instruction stored at "04AE" is an LRI instruction having a hex value A401. This instruction loads external register 4 with the constant "01" which causes the first Sync In pulse to be issued by the controller to the control unit. The program counter is advanced to "04AF".

The instruction stored at "04AF" is an LRI instruction having a hex value A421. This instruction loads register 4 with a constant "21" which issues the second Sync In pulse. The program counter is advanced to "04B0".

The instruction stored at "04B0" is an LRI instruction having ahex value A461. This instruction loads external register 4 with a constant "61" which issues the third Sync In signal and turns on "Expect Sync Out". The first Sync Out signal arrives during the execution of this instruction with the first ID byte being gated into the data register from the data buffer register. The program counter advances to "04B1".

The instruction stored at "04B1" is an R to R instruction which transfers external funnel 3, which is supplied with the output of the data register to internal register 6. The first ID byte is, therefore, stored in internal register 6 and the program counter is advanced to address "04B2".

The instruction stored at "04B2" is an R to R instruction which causes ID byte 2 to be stored in internal register 7, as described above. The next address is "04B3".

The instruction stored at "04B3" is an R to R instruction which causes ID byte 3 to be stored in internal register 8. The next instruction is "04B4".

The instruction stored at "04B4" is a Store Immediate instruction with a hex value 43AE. This instruction stores the output of funnel 3 ID byte 4 in local stoage address "2D". The program counter is advanced to "04B5".

The instruction stored at "04B5" is an LRI instruction having a hex value A302. This instruction places the constant "02" in external register 3, which stops the ECC hardware and gates the last ID byte from external register 15 to the data register.

The Transmit ID operations is concluded by several other instructions which involve general housekeeping functions.

While the invention has been particularly shown and described with reference to a preferred embodiment thereof, it will be understood by those skilled in the art that various chnges in the form and details may be made therein without departing from the spirit and scope of the invention.

Having thus described our invention, what we claim as new, and desire to secure by Letters Patent is:

1. A microcontroller comprising:
    means for storing a plurality of microinstructions at individually addressable storage locations; means for executing each of said microinstructions in a fixed time period comprising an input phase and an output phase, means for transferring the next microinstruction from said storing means to a control means during the executing of a current microinstruction;
    said executing means including an ALU unit having first and second input terminals and an output terminal;
    an ALU register connnected to said output terminal;
    a memory for storing data at a plurality of addresses;
    an auxiliary register for storing the same data supplied to one predetermined address of said memory;
    a first bus connecting the output of said memory to said one ALU input;
    a second bus connecting the output of said auxiliary register to said second ALU input;
    a third bus connecting the output of said ALU register to the input of said memory and said auxiliary register;
    said control means connected to said storing means and responsive to one instruction for generating (A) first and second gating signals to simultaneously gate the output of said memory and said auxiliary register to the inputs of said ALU during said input phase; (B) a load register signal to store the output of said ALU unit into said ALU register; and (C) a write memory signal during said output phase of said executing means whereby the byte of data transferred from said ALU register to said memory represents the results of a logical operation by said ALU unit on two operands stored in different locations of said memory.

2. In a microcontroller having memory means for storing a plurality of microinstructions at individually addressable storage locations, means for executing each of said microinstructions in a fixed length machine cycle, the improvement comprising:
    storage means for storing data involved in the execution of said microinstruction at a plurality of individually addressable storage locations including storage addressing means for addressing a plurality of storage locations in response to storage address signals supplied thereto and one predefined storage location automatically whenever said storage address signals are not applied;
    means for writing data into said storage means storage locations including a data input terminal and means for reading data out of said storage means storage locations including a data output terminal;
    an auxiliary register for storing data involved in the execution of said microinstructions including a load auxiliary register control terminal;
    a source of data connected to said input terminal of said storage means and the input of said auxiliary register; and
    control means connected to said memory means, said auxiliary register, and said storage means and responsive to certain selected microinstructions to cause transfer of data from said source to both said auxiliary register and said one predefined storage location in one said fixed length machine cycle.

3. The microcontroller recited in claim 2 in which said microcontroller includes an ALU unit and said source of data comprises an ALU register having an input connected to the output of said ALU unit.

4. The microcontroller recited in claim 3 in which said output terminal of said storage means is connected to one input terminal of said ALU unit and means are provided for connecting the output of said auxiliary register to a second input terminal of said ALU unit.

5. The microcontroller recited in claim 4 in which said control means further includes means responsive to one specific microinstruction for combining the contents of said auxiliary register with the contents of one of said plurality of storage locations and storing the results in said one predetermined location and said auxiliary register in one fixed machine cycle.

6. The microcontroller recited in claim 5 in which means are provided for supplying address signals to said storage addressing means from said auxiliary register to cause the contents of the corresponding storage location to be read out to said ALU unit and subsequently, during the same fixed period machine cycle, to transfer the contents of said auxiliary register through said ALU unit back to said auxiliary register to increment by one the initial value of the contents of said auxiliary register.

* * * * *